United States Patent
Perlman

(10) Patent No.: US 10,488,535 B2
(45) Date of Patent: Nov. 26, 2019

(54) APPARATUS AND METHOD FOR CAPTURING STILL IMAGES AND VIDEO USING DIFFRACTION CODED IMAGING TECHNIQUES

(71) Applicant: REARDEN, LLC, San Francisco, CA (US)

(72) Inventor: Stephen G. Perlman, Palo Alto, CA (US)

(73) Assignee: REARDEN, LLC, Mountain View, CA (US)

(*) Notice: Subject to any disclaimer, the term of this patent is extended or adjusted under 35 U.S.C. 154(b) by 0 days.

(21) Appl. No.: 13/798,004

(22) Filed: Mar. 12, 2013

(65) Prior Publication Data

US 2014/0267818 A1   Sep. 18, 2014

(51) Int. Cl.
*G01T 1/29* (2006.01)
*H04N 5/225* (2006.01)
*H04N 5/378* (2011.01)

(52) U.S. Cl.
CPC .......... *G01T 1/295* (2013.01); *H04N 5/2254* (2013.01); *H04N 5/378* (2013.01)

(58) Field of Classification Search
CPC ...... H04N 5/2254; H04N 5/378; G01T 1/295; G02B 5/18–1895; G02B 2207/129
USPC .... 348/222.1, 289, 290, 291, 335, 342, 345; 359/10, 560, 564, 619, 566–576; 250/237 R, 237 G, 363.06
See application file for complete search history.

(56) References Cited

U.S. PATENT DOCUMENTS

| | | |
|---|---|---|
| 2,127,656 A | 8/1938 | Terry |
| 3,085,877 A | 4/1963 | Reid |
| 3,335,716 A | 8/1967 | Alt et al. |
| 3,699,856 A | 10/1972 | Ronald et al. |
| 3,805,238 A | 4/1974 | Rothfjell |

(Continued)

FOREIGN PATENT DOCUMENTS

| | | |
|---|---|---|
| CA | 1307842 C | 9/1992 |
| CA | 1309769 C | 11/1992 |

(Continued)

OTHER PUBLICATIONS

Notification of Transmittal of the ISR and the Written Opinion of the International Searching Authority from foreign counterpart PCT/US2014/025109 dated Jul. 14, 2014, 6 pages.

(Continued)

*Primary Examiner* — Lin Ye
*Assistant Examiner* — Chriss S Yoder, III
(74) *Attorney, Agent, or Firm* — Nicholson De Vos Webster & Elliott LLP

(57) ABSTRACT

An apparatus and method are described for capturing images in visible light as well as other radiation wavelengths. In one embodiment, the apparatus comprises: a diffraction coded imaging system including a plurality of apertures arranged in a diffraction coded array pattern with opaque material blocking array elements not containing apertures; and a light- or radiation-sensitive sensor coupled to the diffraction coded imaging system array and positioned at a specified distance behind the diffraction coded imaging system array, the radiation-sensitive sensor configured to sense light or radiation transmitted and diffracted through the apertures in the diffraction coded imaging system array.

14 Claims, 11 Drawing Sheets

(56) References Cited

U.S. PATENT DOCUMENTS

| | | |
|---|---|---|
| 3,887,906 A | 6/1975 | Minnaja |
| 3,887,925 A | 6/1975 | Ranghelli et al. |
| 4,003,016 A | 1/1977 | Remley |
| 4,075,097 A | 2/1978 | Paul |
| 4,076,097 A | 2/1978 | Clarke |
| 4,209,780 A | 6/1980 | Fenimore et al. |
| 4,253,193 A | 2/1981 | Kennard et al. |
| 4,331,225 A | 5/1982 | Bolger |
| 4,360,797 A * | 11/1982 | Fenimore et al. ............ 382/278 |
| 4,389,670 A | 6/1983 | Davidson et al. |
| 4,417,791 A | 11/1983 | Erland et al. |
| 4,564,935 A | 1/1986 | Kaplan |
| 4,688,246 A | 8/1987 | Eilers et al. |
| 4,771,289 A | 9/1988 | Masak |
| 4,855,061 A | 8/1989 | Martin |
| 4,943,811 A | 7/1990 | Alden et al. |
| 4,955,562 A | 9/1990 | Martin et al. |
| 5,045,862 A | 9/1991 | Alden et al. |
| 5,076,687 A | 12/1991 | Adelson |
| 5,088,091 A | 2/1992 | Schroeder et al. |
| 5,095,500 A | 3/1992 | Tayloe et al. |
| 5,097,485 A | 3/1992 | O'Connor et al. |
| 5,227,985 A | 7/1993 | Dementhon |
| 5,235,416 A | 8/1993 | Stanhope |
| 5,304,809 A | 4/1994 | Wickersheim |
| 5,305,124 A | 4/1994 | Chern et al. |
| 5,315,309 A | 5/1994 | Rudow et al. |
| 5,321,414 A | 6/1994 | Alden et al. |
| 5,400,037 A | 3/1995 | East |
| 5,420,622 A | 5/1995 | Faroudja |
| 5,424,533 A | 6/1995 | Schmutz |
| 5,440,428 A | 8/1995 | Hegg et al. |
| 5,467,104 A | 11/1995 | Furness, III et al. |
| 5,472,467 A | 12/1995 | Pfeffer |
| 5,479,026 A | 12/1995 | Schumtz et al. |
| 5,480,341 A | 1/1996 | Plakos |
| 5,483,667 A | 1/1996 | Faruque |
| 5,503,350 A | 4/1996 | Foote |
| 5,519,826 A | 5/1996 | Harper et al. |
| 5,563,614 A | 10/1996 | Alden et al. |
| 5,569,317 A | 10/1996 | Sarada et al. |
| 5,573,090 A | 11/1996 | Ross |
| 5,575,719 A | 11/1996 | Gobush et al. |
| 5,596,339 A | 1/1997 | Furness, III et al. |
| 5,600,326 A | 2/1997 | Yu et al. |
| 5,644,207 A | 7/1997 | Lew et al. |
| 5,653,751 A | 8/1997 | Samiy et al. |
| 5,659,327 A | 8/1997 | Furness, III et al. |
| 5,689,577 A | 11/1997 | Arata |
| 5,699,798 A | 12/1997 | Hochman et al. |
| 5,701,132 A | 12/1997 | Kollin et al. |
| 5,712,649 A | 1/1998 | Tosaki |
| 5,742,229 A | 4/1998 | Smith |
| 5,742,253 A | 4/1998 | Conroy et al. |
| 5,756,026 A | 5/1998 | Sanchez et al. |
| 5,757,005 A | 5/1998 | Callas et al. |
| 5,809,422 A | 9/1998 | Raleigh et al. |
| 5,821,989 A | 10/1998 | Lazzaro et al. |
| 5,838,671 A | 11/1998 | Ishikawa et al. |
| 5,852,672 A | 12/1998 | Lu |
| 5,864,384 A | 1/1999 | McClure et al. |
| 5,872,814 A | 2/1999 | McMeekin |
| 5,878,283 A | 3/1999 | House et al. |
| 5,883,606 A | 3/1999 | Smoot |
| 5,903,397 A | 5/1999 | Melville et al. |
| 5,910,834 A | 6/1999 | McClure et al. |
| 5,930,379 A | 7/1999 | Rehg et al. |
| 5,940,166 A | 8/1999 | Miller |
| 5,950,124 A | 9/1999 | Trompower et al. |
| 5,966,129 A | 10/1999 | Matsukuma et al. |
| 5,969,822 A | 10/1999 | Fright et al. |
| 5,982,139 A | 11/1999 | Parise |
| 5,983,104 A | 11/1999 | Wickman et al. |
| 6,005,856 A | 12/1999 | Jensen et al. |
| 6,020,892 A | 2/2000 | Dillon |
| 6,041,365 A | 3/2000 | Kleinerman |
| 6,043,799 A | 3/2000 | Tidwell |
| 6,052,582 A | 4/2000 | Blasing et al. |
| 6,061,021 A | 5/2000 | Zibell |
| 6,061,023 A | 5/2000 | Daniel et al. |
| 6,067,290 A | 5/2000 | Paulraj et al. |
| 6,072,496 A | 6/2000 | Guenter et al. |
| 6,097,353 A | 8/2000 | Melville et al. |
| 6,114,834 A | 9/2000 | Parise |
| 6,141,104 A | 10/2000 | Schulz et al. |
| 6,148,280 A | 11/2000 | Kramer |
| 6,151,118 A | 11/2000 | Norita et al. |
| 6,154,321 A | 11/2000 | Melville et al. |
| 6,205,195 B1 | 3/2001 | Lanza |
| 6,229,503 B1 | 5/2001 | Mays, Jr. et al. |
| 6,241,622 B1 | 6/2001 | Gobush et al. |
| 6,243,198 B1 | 6/2001 | Sedlmayr |
| 6,252,912 B1 | 6/2001 | Salinger |
| 6,271,900 B1 | 8/2001 | Li |
| 6,308,080 B1 | 10/2001 | Burt et al. |
| 6,364,253 B1 | 4/2002 | Cavanagh |
| 6,400,761 B1 | 6/2002 | Smee et al. |
| 6,411,612 B1 | 6/2002 | Halford et al. |
| 6,421,600 B1 | 7/2002 | Ross |
| 6,442,151 B1 | 8/2002 | H'mimy et al. |
| 6,445,910 B1 | 9/2002 | Oestreich |
| 6,454,414 B1 | 9/2002 | Ting |
| 6,459,900 B1 | 10/2002 | Scheinert |
| 6,473,467 B1 | 10/2002 | Wallace et al. |
| 6,473,717 B1 | 10/2002 | Claussen et al. |
| 6,484,030 B1 | 11/2002 | Antoine et al. |
| 6,487,516 B1 | 11/2002 | Amorai-Moriya |
| 6,509,970 B1 | 1/2003 | Seki et al. |
| 6,513,921 B1 | 2/2003 | Houle |
| 6,533,674 B1 | 3/2003 | Gobush |
| 6,554,706 B2 | 4/2003 | Kim et al. |
| 6,592,465 B2 | 7/2003 | Lutz et al. |
| 6,633,294 B1 | 10/2003 | Rosenthal et al. |
| 6,643,386 B1 | 11/2003 | Foster |
| 6,685,326 B2 | 2/2004 | Debevec et al. |
| 6,710,797 B1 | 3/2004 | McNelley et al. |
| 6,718,180 B1 | 4/2004 | Lundh et al. |
| 6,737,652 B2 | 5/2004 | Lanza et al. |
| 6,758,759 B2 | 7/2004 | Gobush et al. |
| 6,760,388 B2 | 7/2004 | Ketchum et al. |
| 6,763,225 B1 | 7/2004 | Farmine et al. |
| 6,771,706 B2 | 8/2004 | Ling et al. |
| 6,785,341 B2 | 8/2004 | Walton et al. |
| 6,791,508 B2 | 9/2004 | Berry et al. |
| 6,792,259 B1 | 9/2004 | Parise |
| 6,801,580 B2 | 10/2004 | Kadous |
| 6,804,311 B1 | 10/2004 | Dabak et al. |
| 6,834,043 B1 | 12/2004 | Vook et al. |
| 6,836,673 B1 | 12/2004 | Trott |
| 6,850,872 B1 | 2/2005 | Marschner et al. |
| 6,862,271 B2 | 3/2005 | Medvedev et al. |
| 6,888,809 B1 | 5/2005 | Foschini et al. |
| 6,919,847 B2 | 7/2005 | Caplan et al. |
| 6,919,857 B2 | 7/2005 | Shamblin et al. |
| 6,920,192 B1 | 7/2005 | Laroia et al. |
| 6,943,949 B2 | 9/2005 | Sedlmayr |
| 6,978,150 B2 | 12/2005 | Hamabe |
| 6,982,653 B2 | 1/2006 | Voeller et al. |
| 7,006,043 B1 | 2/2006 | Nalbandian |
| 7,009,652 B1 | 3/2006 | Tanida et al. |
| 7,013,144 B2 | 3/2006 | Yamashita et al. |
| 7,044,613 B2 | 5/2006 | Debevec |
| 7,068,277 B2 | 6/2006 | Menache |
| 7,068,704 B1 | 6/2006 | Orr |
| 7,068,991 B2 | 6/2006 | Parise |
| 7,072,413 B2 | 7/2006 | Walton et al. |
| 7,072,693 B2 | 7/2006 | Farlow et al. |
| 7,075,254 B2 | 7/2006 | Chitta et al. |
| 7,075,438 B2 | 7/2006 | Kent et al. |
| 7,081,997 B2 | 7/2006 | Sedlmayr |
| 7,086,954 B2 | 8/2006 | Gobush et al. |
| 7,089,319 B2 | 8/2006 | Lysenko et al. |
| 7,116,723 B2 | 10/2006 | Kim et al. |
| 7,120,440 B2 | 10/2006 | Cho et al. |

(56) References Cited

U.S. PATENT DOCUMENTS

| | | |
|---|---|---|
| 7,127,081 B1 | 10/2006 | Erdem |
| 7,139,527 B2 | 11/2006 | Tamaki et al. |
| 7,142,154 B2 | 11/2006 | Quilter et al. |
| 7,152,984 B1 | 12/2006 | Hayes |
| 7,154,671 B2 | 12/2006 | Sedlmayr |
| 7,154,936 B2 | 12/2006 | Bjerke et al. |
| 7,154,960 B2 | 12/2006 | Liu et al. |
| 7,167,684 B2 | 1/2007 | Kadous et al. |
| 7,184,047 B1 | 2/2007 | Crampton |
| 7,193,991 B2 | 3/2007 | Melpignano et al. |
| 7,197,082 B2 | 3/2007 | Alexiou et al. |
| 7,197,084 B2 | 3/2007 | Ketchum et al. |
| 7,218,320 B2 | 5/2007 | Gordon et al. |
| 7,242,724 B2 | 7/2007 | Alexiou et al. |
| 7,248,879 B1 | 7/2007 | Walton et al. |
| 7,257,237 B1 | 8/2007 | Luck et al. |
| 7,272,294 B2 | 9/2007 | Zhou et al. |
| 7,310,680 B1 | 12/2007 | Graham |
| 7,324,110 B2 | 1/2008 | Edwards et al. |
| 7,327,362 B2 | 2/2008 | Grau |
| 7,333,113 B2 | 2/2008 | Gordon |
| 7,333,540 B2 | 2/2008 | Yee |
| 7,356,164 B2 | 4/2008 | Aliaga et al. |
| 7,358,972 B2 | 4/2008 | Echegaray et al. |
| 7,369,681 B2 | 5/2008 | Foth et al. |
| 7,369,876 B2 | 5/2008 | Lee et al. |
| 7,373,133 B2 | 5/2008 | Mickle et al. |
| 7,412,212 B2 | 8/2008 | Hottinen |
| 7,418,053 B2 | 8/2008 | Perlman et al. |
| 7,426,422 B2 | 9/2008 | Carman et al. |
| 7,436,403 B2 | 10/2008 | Debevec |
| 7,437,177 B2 | 10/2008 | Ozluturk et al. |
| 7,486,931 B2 | 2/2009 | Cho et al. |
| 7,502,420 B2 | 3/2009 | Ketchum |
| 7,548,272 B2 | 6/2009 | Perlman et al. |
| 7,548,752 B2 | 6/2009 | Sampath et al. |
| 7,554,549 B2 | 6/2009 | Sagar et al. |
| 7,558,575 B2 | 7/2009 | Losh et al. |
| 7,587,520 B1 | 9/2009 | Kent et al. |
| 7,599,420 B2 | 10/2009 | Forenza et al. |
| 7,630,337 B2 | 12/2009 | Zheng et al. |
| 7,633,944 B1 | 12/2009 | Chang et al. |
| 7,633,994 B2 | 12/2009 | Forenza et al. |
| 7,636,381 B2 | 12/2009 | Forenza et al. |
| 7,671,321 B2 * | 3/2010 | Perlman et al. ............ 250/216 |
| 7,688,789 B2 | 3/2010 | Pan et al. |
| 7,720,259 B2 | 5/2010 | Gordon et al. |
| 7,729,433 B2 | 6/2010 | Jalloul et al. |
| 7,729,443 B2 | 6/2010 | Fukuoka et al. |
| 7,751,368 B2 | 7/2010 | Li et al. |
| 7,751,843 B2 | 7/2010 | Butala |
| 7,756,222 B2 | 7/2010 | Chen et al. |
| 7,767,950 B2 * | 8/2010 | Perlman et al. ........... 250/208.1 |
| 7,792,423 B2 * | 9/2010 | Raskar et al. ............... 396/268 |
| 7,923,677 B2 * | 4/2011 | Slinger ................... G01T 1/295 250/208.1 |
| 7,986,742 B2 | 7/2011 | Ketchum et al. |
| 8,013,285 B2 * | 9/2011 | Perlman et al. ........... 250/208.1 |
| 8,041,362 B2 | 10/2011 | Li et al. |
| 8,054,312 B2 | 11/2011 | Gordon |
| 8,081,944 B2 | 12/2011 | Li |
| 8,126,510 B1 | 2/2012 | Samson et al. |
| 8,144,153 B1 | 3/2012 | Sullivan et al. |
| 8,243,353 B1 * | 8/2012 | Gutin et al. ..................... 359/21 |
| 8,288,704 B2 * | 10/2012 | Perlman et al. ............. 250/216 |
| 8,320,432 B1 | 11/2012 | Chockalingam et al. |
| 8,428,177 B2 | 4/2013 | Tsai et al. |
| 8,451,764 B2 | 5/2013 | Chao et al. |
| 8,482,462 B2 | 7/2013 | Komijani et al. |
| 8,638,880 B2 | 1/2014 | Baldemair et al. |
| 8,654,815 B1 | 2/2014 | Forenza et al. |
| 8,675,768 B2 | 3/2014 | Xu et al. |
| 8,705,484 B2 | 4/2014 | Caire et al. |
| 8,731,480 B2 | 5/2014 | Kim et al. |
| 8,797,970 B2 | 8/2014 | Xing et al. |
| 8,849,339 B2 | 9/2014 | Anto et al. |
| 8,902,862 B2 | 12/2014 | Yu et al. |
| 8,971,380 B2 | 3/2015 | Forenza et al. |
| 9,177,387 B2 | 11/2015 | Marks |
| 9,252,858 B2 | 2/2016 | Abbasfar et al. |
| 9,331,882 B2 | 5/2016 | Fehri et al. |
| 9,698,881 B2 | 7/2017 | Nammi et al. |
| 2001/0031647 A1 | 10/2001 | Scherzer et al. |
| 2002/0027985 A1 | 3/2002 | Rashid-Farrokhi |
| 2002/0051433 A1 | 5/2002 | Affes et al. |
| 2002/0060649 A1 | 5/2002 | Perlman |
| 2002/0114526 A1 | 8/2002 | Dennis |
| 2002/0130867 A1 | 9/2002 | Yang et al. |
| 2002/0132933 A1 | 9/2002 | Dingemans et al. |
| 2002/0138581 A1 | 9/2002 | MacIntosh et al. |
| 2002/0142723 A1 | 10/2002 | Foschini et al. |
| 2002/0168017 A1 | 11/2002 | Berthet et al. |
| 2002/0181444 A1 | 12/2002 | Acampora |
| 2002/0193146 A1 | 12/2002 | Wallace et al. |
| 2003/0003863 A1 | 1/2003 | Thielecke et al. |
| 2003/0012315 A1 | 1/2003 | Fan |
| 2003/0027655 A1 | 2/2003 | Lutz et al. |
| 2003/0036359 A1 | 2/2003 | Dent et al. |
| 2003/0043929 A1 | 3/2003 | Sampath |
| 2003/0048753 A1 | 3/2003 | Jalali |
| 2003/0095186 A1 | 5/2003 | Aman et al. |
| 2003/0114165 A1 | 6/2003 | Mills |
| 2003/0125026 A1 | 7/2003 | Tsunehara et al. |
| 2003/0125040 A1 | 7/2003 | Walton et al. |
| 2003/0138206 A1 * | 7/2003 | Sheng ................. G02B 6/02138 385/37 |
| 2003/0139196 A1 | 7/2003 | Medvedev et al. |
| 2003/0147362 A1 | 8/2003 | Dick et al. |
| 2003/0148738 A1 | 8/2003 | Das et al. |
| 2003/0149726 A1 | 8/2003 | Spear |
| 2003/0156056 A1 | 8/2003 | Perry |
| 2003/0161282 A1 | 8/2003 | Medvedev et al. |
| 2003/0193599 A1 | 10/2003 | Campbell et al. |
| 2003/0200227 A1 | 10/2003 | Ressler |
| 2003/0211843 A1 | 11/2003 | Song et al. |
| 2003/0214431 A1 | 11/2003 | Hager et al. |
| 2003/0220112 A1 | 11/2003 | Bugeja |
| 2003/0222820 A1 | 12/2003 | Karr et al. |
| 2003/0223391 A1 | 12/2003 | Malaender et al. |
| 2003/0235146 A1 | 12/2003 | Wu et al. |
| 2004/0002835 A1 | 1/2004 | Nelson |
| 2004/0008650 A1 | 1/2004 | Le et al. |
| 2004/0009755 A1 | 1/2004 | Yoshida |
| 2004/0017313 A1 | 1/2004 | Menache |
| 2004/0042556 A1 | 3/2004 | Medvedev et al. |
| 2004/0043784 A1 | 3/2004 | Czaja et al. |
| 2004/0045031 A1 | 3/2004 | Gautier |
| 2004/0072091 A1 | 4/2004 | Mochizuki et al. |
| 2004/0082356 A1 | 4/2004 | Walton et al. |
| 2004/0097197 A1 | 5/2004 | Juncker et al. |
| 2004/0104935 A1 | 6/2004 | Williamson et al. |
| 2004/0119716 A1 | 6/2004 | Park et al. |
| 2004/0136349 A1 | 7/2004 | Walton et al. |
| 2004/0152480 A1 | 8/2004 | Willars et al. |
| 2004/0153512 A1 | 8/2004 | Friend |
| 2004/0155962 A1 | 8/2004 | Marks |
| 2004/0170430 A1 | 9/2004 | Gorokhov |
| 2004/0176097 A1 | 9/2004 | Wilson et al. |
| 2004/0179627 A1 | 9/2004 | Ketchum et al. |
| 2004/0185909 A1 | 9/2004 | Alexiou et al. |
| 2004/0190636 A1 | 9/2004 | Oprea |
| 2004/0203347 A1 | 10/2004 | Nguyen |
| 2004/0203987 A1 | 10/2004 | Butala |
| 2004/0205173 A1 | 10/2004 | Hall |
| 2004/0209579 A1 | 10/2004 | Vaidyanathan |
| 2004/0252632 A1 | 12/2004 | Bourdoux et al. |
| 2005/0003865 A1 | 1/2005 | Lastinger et al. |
| 2005/0020237 A1 | 1/2005 | Alexiou et al. |
| 2005/0030625 A1 | 2/2005 | Cattin-Liebl |
| 2005/0031047 A1 | 2/2005 | Maltsev et al. |
| 2005/0040085 A1 | 2/2005 | Carman et al. |
| 2005/0041750 A1 | 2/2005 | Lau |
| 2005/0041751 A1 | 2/2005 | Nir et al. |
| 2005/0043031 A1 | 2/2005 | Cho et al. |

(56) References Cited

U.S. PATENT DOCUMENTS

| | | |
|---|---|---|
| 2005/0047515 A1 | 3/2005 | Walton et al. |
| 2005/0058217 A1 | 3/2005 | Sandhu et al. |
| 2005/0075110 A1 | 4/2005 | Posti et al. |
| 2005/0096058 A1 | 5/2005 | Warner et al. |
| 2005/0101259 A1 | 5/2005 | Tong et al. |
| 2005/0104543 A1 | 5/2005 | Kazanov et al. |
| 2005/0105772 A1 | 5/2005 | Voronka et al. |
| 2005/0111406 A1 | 5/2005 | Pasanen et al. |
| 2005/0111599 A1 | 5/2005 | Walton et al. |
| 2005/0114073 A1 | 5/2005 | Gobush |
| 2005/0119868 A1 | 6/2005 | Scheidemann et al. |
| 2005/0143183 A1 | 6/2005 | Shirai et al. |
| 2005/0157683 A1 | 7/2005 | Ylitalo et al. |
| 2005/0161118 A1 | 7/2005 | Carman et al. |
| 2005/0168578 A1 | 8/2005 | Gobush |
| 2005/0169396 A1 | 8/2005 | Baier et al. |
| 2005/0174771 A1 | 8/2005 | Conner |
| 2005/0174977 A1 | 8/2005 | Pedlar et al. |
| 2005/0215336 A1 | 9/2005 | Ueda et al. |
| 2005/0215337 A1 | 9/2005 | Shirai et al. |
| 2005/0230597 A1 | 10/2005 | Hsieh et al. |
| 2005/0232135 A1 | 10/2005 | Mukai et al. |
| 2005/0239406 A1 | 10/2005 | Shattil |
| 2005/0259627 A1 | 11/2005 | Song et al. |
| 2005/0271009 A1 | 12/2005 | Shirakabe et al. |
| 2005/0287962 A1 | 12/2005 | Mehta et al. |
| 2006/0023803 A1 | 2/2006 | Perlman et al. |
| 2006/0046658 A1 | 3/2006 | Cruz et al. |
| 2006/0050804 A1 | 3/2006 | Leclair |
| 2006/0055706 A1 | 3/2006 | Perlman et al. |
| 2006/0061680 A1 | 3/2006 | Madhavan et al. |
| 2006/0077258 A1 | 4/2006 | Allen et al. |
| 2006/0098568 A1 | 5/2006 | Oh et al. |
| 2006/0098754 A1 | 5/2006 | Kim et al. |
| 2006/0127836 A1 | 6/2006 | Wen |
| 2006/0146755 A1 | 7/2006 | Pan et al. |
| 2006/0159160 A1 | 7/2006 | Kim et al. |
| 2006/0165120 A1 | 7/2006 | Karabinis |
| 2006/0184209 A1 | 8/2006 | John et al. |
| 2006/0192785 A1 | 8/2006 | Marschner et al. |
| 2006/0198461 A1 | 9/2006 | Hayase |
| 2006/0199620 A1 | 9/2006 | Greene et al. |
| 2006/0203096 A1 | 9/2006 | Lasalle et al. |
| 2006/0203708 A1 | 9/2006 | Sampath et al. |
| 2006/0209979 A1 | 9/2006 | Sandell et al. |
| 2006/0266564 A1 | 11/2006 | Perlman |
| 2006/0270359 A1 | 11/2006 | Karmi et al. |
| 2006/0281421 A1 | 12/2006 | Pan et al. |
| 2006/0287743 A1 | 12/2006 | Sampath et al. |
| 2006/0292990 A1 | 12/2006 | Karabinis et al. |
| 2007/0004337 A1 | 1/2007 | Biswas et al. |
| 2007/0024946 A1 | 2/2007 | Panasyuk et al. |
| 2007/0025464 A1 | 2/2007 | Perlman |
| 2007/0054633 A1 | 3/2007 | Piirainen |
| 2007/0058590 A1 | 3/2007 | Wang et al. |
| 2007/0058839 A1 | 3/2007 | Echegaray et al. |
| 2007/0060410 A1 | 3/2007 | Gobush |
| 2007/0064823 A1 | 3/2007 | Hwang et al. |
| 2007/0082674 A1 | 4/2007 | Pedersen et al. |
| 2007/0091085 A1 | 4/2007 | Wang et al. |
| 2007/0091178 A1 | 4/2007 | Cotter et al. |
| 2007/0093273 A1 | 4/2007 | Cai |
| 2007/0093274 A1 | 4/2007 | Jafarkhani et al. |
| 2007/0099665 A1 | 5/2007 | Kim et al. |
| 2007/0135125 A1 | 6/2007 | Kim et al. |
| 2007/0183362 A1 | 8/2007 | Mondal et al. |
| 2007/0200930 A1 | 8/2007 | Gordon |
| 2007/0206504 A1 | 9/2007 | Koo et al. |
| 2007/0206832 A1 | 9/2007 | Gordon et al. |
| 2007/0211747 A1 | 9/2007 | Kim |
| 2007/0242782 A1 | 10/2007 | Han et al. |
| 2007/0249380 A1 | 10/2007 | Stewart et al. |
| 2007/0253508 A1 | 11/2007 | Zhou et al. |
| 2007/0254602 A1 | 11/2007 | Li et al. |
| 2007/0258531 A1 | 11/2007 | Chen et al. |
| 2007/0263736 A1 | 11/2007 | Yuda et al. |
| 2007/0273951 A1 | 11/2007 | Ribi |
| 2007/0279494 A1 | 12/2007 | Aman et al. |
| 2007/0280116 A1 | 12/2007 | Wang et al. |
| 2007/0285559 A1 | 12/2007 | Perlman et al. |
| 2008/0013644 A1 | 1/2008 | Hugl et al. |
| 2008/0051150 A1 | 2/2008 | Tsutsui |
| 2008/0080631 A1 | 4/2008 | Forenza et al. |
| 2008/0080635 A1 | 4/2008 | Hugl et al. |
| 2008/0089396 A1 | 4/2008 | Zhang et al. |
| 2008/0100622 A1 | 5/2008 | Gordon |
| 2008/0102881 A1 | 5/2008 | Han et al. |
| 2008/0107135 A1 | 5/2008 | Ibrahim |
| 2008/0117961 A1 | 5/2008 | Han et al. |
| 2008/0118004 A1 | 5/2008 | Forenza et al. |
| 2008/0125051 A1 | 5/2008 | Kim et al. |
| 2008/0130790 A1 | 6/2008 | Forenza et al. |
| 2008/0132281 A1 | 6/2008 | Kim et al. |
| 2008/0181285 A1 | 7/2008 | Hwang et al. |
| 2008/0192683 A1 | 8/2008 | Han et al. |
| 2008/0192697 A1 | 8/2008 | Shaheen |
| 2008/0205538 A1 | 8/2008 | Han et al. |
| 2008/0214185 A1 | 9/2008 | Cho et al. |
| 2008/0227422 A1 | 9/2008 | Hwang et al. |
| 2008/0232394 A1 | 9/2008 | Kozek et al. |
| 2008/0233902 A1 | 9/2008 | Pan et al. |
| 2008/0239938 A1 | 10/2008 | Jalloul et al. |
| 2008/0260054 A1 | 10/2008 | Myung et al. |
| 2008/0261587 A1 | 10/2008 | Lennartson et al. |
| 2008/0268833 A1 | 10/2008 | Huang et al. |
| 2008/0292011 A1 | 11/2008 | Yang |
| 2008/0317014 A1 | 12/2008 | Veselinovic et al. |
| 2009/0016463 A1 | 1/2009 | Roh |
| 2009/0028451 A1 | 1/2009 | Slinger et al. |
| 2009/0034636 A1 | 2/2009 | Kotecha et al. |
| 2009/0041151 A1 | 2/2009 | Khan et al. |
| 2009/0046678 A1 | 2/2009 | Lee et al. |
| 2009/0046800 A1 | 2/2009 | Xu et al. |
| 2009/0060013 A1 | 3/2009 | Ashikhmin et al. |
| 2009/0067198 A1 | 3/2009 | Graham et al. |
| 2009/0067402 A1 | 3/2009 | Forenza et al. |
| 2009/0075686 A1 | 3/2009 | Gomadam et al. |
| 2009/0086648 A1 | 4/2009 | Xu et al. |
| 2009/0086855 A1 | 4/2009 | Jin et al. |
| 2009/0090868 A1 | 4/2009 | Payne |
| 2009/0135944 A1 | 5/2009 | Dyer et al. |
| 2009/0151987 A1 | 6/2009 | Yang et al. |
| 2009/0168914 A1 | 7/2009 | Chance et al. |
| 2009/0195355 A1 | 8/2009 | Mitchell |
| 2009/0202016 A1 | 8/2009 | Seong et al. |
| 2009/0207822 A1 | 8/2009 | Kim et al. |
| 2009/0209206 A1 | 8/2009 | Zou et al. |
| 2009/0227249 A1 | 9/2009 | Ylitalo |
| 2009/0227292 A1 | 9/2009 | Laroia et al. |
| 2009/0262695 A1 | 10/2009 | Chen et al. |
| 2009/0268675 A1 | 10/2009 | Choi |
| 2009/0274196 A1 | 11/2009 | Black et al. |
| 2009/0283466 A1 | 11/2009 | Martin et al. |
| 2009/0285156 A1 | 11/2009 | Huang et al. |
| 2009/0296650 A1 | 12/2009 | Venturino et al. |
| 2009/0316014 A1* | 12/2009 | Lim et al. ............. 348/222.1 |
| 2009/0316807 A1 | 12/2009 | Kim et al. |
| 2009/0318183 A1 | 12/2009 | Hugl et al. |
| 2010/0002934 A1 | 1/2010 | Sullivan et al. |
| 2010/0008331 A1 | 1/2010 | Li et al. |
| 2010/0034151 A1 | 2/2010 | Alexiou et al. |
| 2010/0068999 A1 | 3/2010 | Bangs et al. |
| 2010/0098030 A1 | 4/2010 | Wang et al. |
| 2010/0099428 A1 | 4/2010 | Bhushan et al. |
| 2010/0119001 A1 | 5/2010 | Walton et al. |
| 2010/0150013 A1 | 6/2010 | Hara et al. |
| 2010/0157861 A1 | 6/2010 | Na et al. |
| 2010/0164802 A1 | 7/2010 | Li et al. |
| 2010/0172309 A1 | 7/2010 | Forenza et al. |
| 2010/0178934 A1 | 7/2010 | Moeglein et al. |
| 2010/0189191 A1 | 7/2010 | Taoka et al. |
| 2010/0195527 A1 | 8/2010 | Gorokhov et al. |
| 2010/0220679 A1 | 9/2010 | Abraham et al. |
| 2010/0224725 A1 | 9/2010 | Perlman et al. |

(56) References Cited

U.S. PATENT DOCUMENTS

| | | |
|---|---|---|
| 2010/0227562 A1 | 9/2010 | Shim et al. |
| 2010/0234071 A1 | 9/2010 | Shabtay et al. |
| 2010/0238984 A1 | 9/2010 | Sayana et al. |
| 2010/0260060 A1 | 10/2010 | Abraham et al. |
| 2010/0260103 A1 | 10/2010 | Guey et al. |
| 2010/0260115 A1 | 10/2010 | Frederiksen et al. |
| 2010/0265842 A1 | 10/2010 | Khandekar et al. |
| 2010/0279625 A1 | 11/2010 | Ko et al. |
| 2010/0290369 A1 | 11/2010 | Hui et al. |
| 2010/0290382 A1 | 11/2010 | Hui et al. |
| 2010/0315966 A1 | 12/2010 | Weigand |
| 2010/0316154 A1 | 12/2010 | Park et al. |
| 2010/0316163 A1 | 12/2010 | Forenza et al. |
| 2011/0002371 A1 | 1/2011 | Forenza et al. |
| 2011/0002410 A1 | 1/2011 | Forenza et al. |
| 2011/0002411 A1 | 1/2011 | Forenza et al. |
| 2011/0003606 A1 | 1/2011 | Forenza et al. |
| 2011/0003607 A1 | 1/2011 | Forenza et al. |
| 2011/0003608 A1 | 1/2011 | Forenza et al. |
| 2011/0007856 A1 | 1/2011 | Jang et al. |
| 2011/0019715 A1 | 1/2011 | Brisebois |
| 2011/0038436 A1 | 2/2011 | Kim et al. |
| 2011/0044193 A1 | 2/2011 | Forenza et al. |
| 2011/0051832 A1 | 3/2011 | Mergen et al. |
| 2011/0069638 A1 | 3/2011 | Ishizu et al. |
| 2011/0086611 A1 | 4/2011 | Klein et al. |
| 2011/0090840 A1 | 4/2011 | Lee et al. |
| 2011/0090885 A1 | 4/2011 | Safavi |
| 2011/0105174 A1 | 5/2011 | Pelletier et al. |
| 2011/0111781 A1 | 5/2011 | Chen et al. |
| 2011/0135308 A1 | 6/2011 | Tarlazzi et al. |
| 2011/0142020 A1 | 6/2011 | Kang et al. |
| 2011/0142104 A1 | 6/2011 | Coldrey et al. |
| 2011/0164597 A1 | 7/2011 | Amini et al. |
| 2011/0164697 A1 | 7/2011 | Liao et al. |
| 2011/0195670 A1 | 8/2011 | Dakshinamurthy et al. |
| 2011/0199946 A1 | 8/2011 | Breit et al. |
| 2011/0205963 A1 | 8/2011 | Tang et al. |
| 2011/0207416 A1 | 8/2011 | Doi |
| 2011/0211485 A1 | 9/2011 | Xu et al. |
| 2011/0216662 A1 | 9/2011 | Nie et al. |
| 2011/0228895 A1* | 9/2011 | Ridley et al. ............... 378/2 |
| 2011/0261769 A1 | 10/2011 | Ji et al. |
| 2011/0305195 A1 | 12/2011 | Forck et al. |
| 2011/0306381 A1 | 12/2011 | Jia et al. |
| 2011/0310987 A1 | 12/2011 | Lee et al. |
| 2011/0310994 A1 | 12/2011 | Ko et al. |
| 2011/0315855 A1 | 12/2011 | Perlman et al. |
| 2012/0002743 A1 | 1/2012 | Cavalcante et al. |
| 2012/0014415 A1 | 1/2012 | Su et al. |
| 2012/0014477 A1 | 1/2012 | Ko et al. |
| 2012/0046039 A1 | 2/2012 | Hagerman et al. |
| 2012/0051257 A1 | 3/2012 | Kim et al. |
| 2012/0076028 A1 | 3/2012 | Ko et al. |
| 2012/0076042 A1 | 3/2012 | Chun et al. |
| 2012/0076236 A1 | 3/2012 | Ko et al. |
| 2012/0087261 A1 | 4/2012 | Yoo et al. |
| 2012/0087430 A1 | 4/2012 | Forenza et al. |
| 2012/0093078 A1 | 4/2012 | Perlman et al. |
| 2012/0108278 A1 | 5/2012 | Kim et al. |
| 2012/0114021 A1 | 5/2012 | Chung et al. |
| 2012/0151305 A1 | 6/2012 | Zhang et al. |
| 2012/0188988 A1 | 7/2012 | Chung et al. |
| 2012/0218968 A1 | 8/2012 | Kim et al. |
| 2012/0224528 A1 | 9/2012 | Tapia et al. |
| 2012/0230691 A1 | 9/2012 | Hui et al. |
| 2012/0236741 A1 | 9/2012 | Xu et al. |
| 2012/0236840 A1 | 9/2012 | Kim et al. |
| 2012/0252470 A1 | 10/2012 | Wong et al. |
| 2012/0258657 A1 | 10/2012 | Scheinert |
| 2012/0281555 A1 | 11/2012 | Gao et al. |
| 2012/0288022 A1 | 11/2012 | Guey et al. |
| 2012/0300717 A1 | 11/2012 | Cepeda et al. |
| 2012/0314570 A1 | 12/2012 | Forenza et al. |
| 2012/0314649 A1 | 12/2012 | Forenza et al. |
| 2013/0010840 A1 | 1/2013 | Maddah-Ali et al. |
| 2013/0033998 A1 | 2/2013 | Seo et al. |
| 2013/0038766 A1* | 2/2013 | Perlman et al. ............... 348/294 |
| 2013/0039168 A1 | 2/2013 | Forenza et al. |
| 2013/0039332 A1 | 2/2013 | Nazar et al. |
| 2013/0039349 A1 | 2/2013 | Ebrahimi et al. |
| 2013/0039387 A1 | 2/2013 | Qu |
| 2013/0077514 A1 | 3/2013 | Dinan |
| 2013/0077569 A1 | 3/2013 | Nam et al. |
| 2013/0083681 A1 | 4/2013 | Ebrahimi et al. |
| 2013/0089009 A1 | 4/2013 | Li et al. |
| 2013/0094548 A1 | 4/2013 | Park |
| 2013/0114437 A1 | 5/2013 | Yoo et al. |
| 2013/0114763 A1 | 5/2013 | Park |
| 2013/0115986 A1 | 5/2013 | Mueck et al. |
| 2013/0128821 A1 | 5/2013 | Hooli et al. |
| 2013/0188567 A1 | 7/2013 | Wang et al. |
| 2013/0195047 A1 | 8/2013 | Koivisto et al. |
| 2013/0195086 A1 | 8/2013 | Xu et al. |
| 2013/0195467 A1 | 8/2013 | Schmid et al. |
| 2013/0208604 A1 | 8/2013 | Lee et al. |
| 2013/0242890 A1 | 9/2013 | He et al. |
| 2013/0242956 A1 | 9/2013 | Hall |
| 2013/0315211 A1 | 11/2013 | Balan et al. |
| 2014/0038619 A1 | 2/2014 | Moulsley |
| 2014/0064206 A1 | 3/2014 | Bao et al. |
| 2014/0086296 A1 | 3/2014 | Badic et al. |
| 2014/0087680 A1 | 3/2014 | Luukkala et al. |
| 2014/0112216 A1 | 4/2014 | Seo et al. |
| 2014/0146756 A1 | 5/2014 | Sahin et al. |
| 2014/0185700 A1 | 7/2014 | Dong et al. |
| 2014/0198744 A1 | 7/2014 | Wang et al. |
| 2014/0206280 A1 | 7/2014 | Nilsson et al. |
| 2014/0219202 A1 | 8/2014 | Kim et al. |
| 2014/0219267 A1 | 8/2014 | Eyuboglu et al. |
| 2014/0241209 A1 | 8/2014 | Pollakowski et al. |
| 2014/0241218 A1 | 8/2014 | Moshfeghi |
| 2014/0241240 A1 | 8/2014 | Kloper et al. |
| 2014/0245095 A1 | 8/2014 | Nammi et al. |
| 2014/0295758 A1 | 10/2014 | Pedersen |
| 2014/0301345 A1 | 10/2014 | Kim et al. |
| 2014/0341143 A1 | 11/2014 | Yang et al. |
| 2014/0348077 A1 | 11/2014 | Chen et al. |
| 2014/0348090 A1 | 11/2014 | Nguyen et al. |
| 2014/0348131 A1 | 11/2014 | Duan et al. |
| 2015/0003311 A1 | 1/2015 | Feuersaenger et al. |
| 2015/0011197 A1 | 1/2015 | Tarraf et al. |
| 2015/0016317 A1 | 1/2015 | Park et al. |
| 2015/0098410 A1 | 4/2015 | Jöngren et al. |
| 2015/0270882 A1 | 9/2015 | Shattil |
| 2015/0296533 A1 | 10/2015 | Park et al. |
| 2015/0304855 A1 | 10/2015 | Perlman et al. |
| 2015/0305010 A1 | 10/2015 | Guan et al. |
| 2016/0013855 A1 | 1/2016 | Campos et al. |
| 2016/0094318 A1 | 3/2016 | Shattil et al. |
| 2016/0157146 A1 | 6/2016 | Karabinis |
| 2016/0248559 A1 | 8/2016 | Guo et al. |
| 2016/0353290 A1 | 12/2016 | Nammi et al. |

FOREIGN PATENT DOCUMENTS

| | | |
|---|---|---|
| CA | 2011298 C | 5/1999 |
| CA | 2006481 C | 9/1999 |
| CN | 1256803 A | 6/2000 |
| CN | 1516370 A | 7/2004 |
| CN | 1538636 A | 10/2004 |
| CN | 1703113 A | 11/2005 |
| CN | 1734972 A | 2/2006 |
| CN | 1820424 A | 8/2006 |
| CN | 101238648 A | 8/2008 |
| CN | 101405965 A | 4/2009 |
| CN | 101536320 A | 9/2009 |
| CN | 101542938 A | 9/2009 |
| CN | 101981826 A | 2/2011 |
| CN | 102007707 A | 4/2011 |
| CN | 102185641 A | 9/2011 |
| EP | 1359683 A1 | 11/2003 |
| EP | 1392029 A1 | 2/2004 |
| EP | 1775937 A2 | 4/2007 |

(56) References Cited

FOREIGN PATENT DOCUMENTS

| | | |
|---|---|---|
| EP | 2244390 A2 | 10/2010 |
| JP | H05231858 A | 9/1993 |
| JP | H05333398 A | 12/1993 |
| JP | 2000503393 A | 3/2000 |
| JP | 2001217759 A | 8/2001 |
| JP | 2002152995 A | 5/2002 |
| JP | 2002281551 A | 9/2002 |
| JP | 2002374224 A | 12/2002 |
| JP | 2003018054 A | 1/2003 |
| JP | 2003179948 A | 6/2003 |
| JP | 2003284128 A | 10/2003 |
| JP | 2004502376 A | 1/2004 |
| JP | 2004104206 A | 4/2004 |
| JP | 2004229425 A | 8/2004 |
| JP | 2004242380 A | 8/2004 |
| JP | 2005039822 A | 2/2005 |
| JP | 2005073313 A | 3/2005 |
| JP | 2006081162 A | 3/2006 |
| JP | 2006245871 A | 9/2006 |
| JP | 2007060106 A | 3/2007 |
| JP | 2007116686 A | 5/2007 |
| JP | 2009213052 A | 9/2009 |
| JP | 2009273167 A | 11/2009 |
| JP | 2009540692 A | 11/2009 |
| JP | 2010016674 A | 1/2010 |
| JP | 2010021999 A | 1/2010 |
| JP | 2010068496 A | 3/2010 |
| JP | 2010193189 A | 9/2010 |
| JP | 2011035912 A | 2/2011 |
| JP | 2011517393 A | 6/2011 |
| JP | 2013502117 A | 1/2013 |
| KR | 20120003781 A | 1/2012 |
| RU | 2143775 C1 | 12/1999 |
| RU | 2010110620 A | 9/2011 |
| TW | 201031243 A | 8/2010 |
| TW | 201212570 A | 3/2012 |
| TW | 201220741 A | 5/2012 |
| WO | WO-9923767 A1 | 5/1999 |
| WO | WO-0201732 A2 | 1/2002 |
| WO | WO-0208785 A1 | 1/2002 |
| WO | WO-02054626 A1 | 7/2002 |
| WO | WO-02093784 A1 | 11/2002 |
| WO | WO-02099995 A2 | 12/2002 |
| WO | WO-03003604 A1 | 1/2003 |
| WO | WO-03071569 A2 | 8/2003 |
| WO | WO-03084092 A2 | 10/2003 |
| WO | WO-03094460 A2 | 11/2003 |
| WO | WO-03107582 A2 | 12/2003 |
| WO | WO-2004017586 A1 | 2/2004 |
| WO | WO-2004045884 A1 | 6/2004 |
| WO | WO-2004077550 A1 | 9/2004 |
| WO | WO-2005046081 A1 | 5/2005 |
| WO | WO-2005064871 A1 | 7/2005 |
| WO | WO-2006049417 A1 | 5/2006 |
| WO | WO-2006078019 A1 | 7/2006 |
| WO | WO-2006110737 A2 | 10/2006 |
| WO | WO-2006113872 A1 | 10/2006 |
| WO | WO-2007024913 A1 | 3/2007 |
| WO | WO-2007027825 A2 | 3/2007 |
| WO | WO-2007114654 A1 | 10/2007 |
| WO | WO-2009099752 A1 | 8/2009 |
| WO | WO-2009125962 A2 | 10/2009 |
| WO | WO-2010017482 A1 | 2/2010 |
| WO | WO-2010067419 A1 | 6/2010 |
| WO | WO-2011018121 A1 | 2/2011 |
| WO | WO-2011099802 A2 | 8/2011 |
| WO | WO-2011100492 A1 | 8/2011 |
| WO | WO-2012001086 A1 | 1/2012 |
| WO | WO-2012044969 A1 | 4/2012 |
| WO | WO-2012058600 A2 | 5/2012 |
| WO | WO-2012061325 A1 | 5/2012 |
| WO | 2012127246 A1 | 9/2012 |
| WO | WO-2012130071 A1 | 10/2012 |
| WO | WO-2013040089 A2 | 3/2013 |
| WO | WO-2013166464 A1 | 11/2013 |
| WO | WO-2013173809 A1 | 11/2013 |

OTHER PUBLICATIONS

3GPP, "LTE", downloaded from http://www.3gpp.org/LTE on Aug. 14, 2014, 4 pages.

3GPP Technical Specification Group, "Spatial channel model, SCM-134 text V6.0", Spatial Channel Model AHG (Combined ad-hoc from 3GPP and 3GPP2), Apr. 2003, pp. 1-45.

3GPP TR 25.876 V7.0.0 (Mar. 2007)., "Technical Report 3rd Generation Partnership Project; Technical Specification Group Radio Access Network; Multiple Input Multiple Output in UTRA; (Release 7)3GPP TR 25.876 v7.0.0 (Mar. 2007)," Mar. 2007, pp. 2-76.

3GPP TR 25.912, "Feasibility Study for Evolved UTRA and UTRAN", V9.0.0 (Oct. 2009), Oct. 2009, pp. 1-66.

3GPP TR 25.913, "Requirements for Evolved UTRA (E-UTRA) and Evolved UTRAN (E- UTRAN)", V8.0.0 (Jan. 2009), Jan. 2009, pp. 1-20.

3GPP TR 36.819, "3rd Generation Partnership Project; Technical Specification Group Radio Access Network; Coordinated multi-point operation for LTE physical layer aspects (Release 11)," Dec. 20, 2011, 69 pages.

3GPP, TS 36.201, "Evolved Universal Terrestrial Radio Access (E-UTRA); LTE Physical Layer—General Description (Release 11)," Oct. 2012, pp. 1-14.

3GPP, TS 36.211, "Evolved Universal Terrestrial Radio Access (E-UTRA); Physical Channels and Modulation (Release 11)," Oct. 2012, pp. 1-107.

3GPP TS 36.211 V8.7.0 (May 2009), "Technical Specification 3rd Generation Partnership Project; Technical Specification Group Radio Access Network; Evolved Universal Terrestrial Radio Access (E-UTRA); Physical Channels and Modulation (Release 8) 3GPP TS 36.211 V8.7.0 (May 2009)," May 2009, pp. 1-83.

3GPP, TS 36.212, "Evolved Universal Terrestrial Radio Access (E-UTRA); Multiplexing and channel coding (Release 11)," Oct. 2012, pp. 1-80.

3GPP TS 36.212 V9.1.0 Release 9, LTE; Evolved Universal Terrestrial Radio Access (E-UTRA); Multiplexing and channel coding, ETSI TS 136 212 (Apr. 2010), Technical Specification, Apr. 2010, pp. 1-63.

3GPP, TS 36.212.V8.7.0 (May 2009), "Technical Specification 3rd Generation Partnership Project; Technical Specification Group Radio Access Network; Evolved Universal Terrestrial Radio Access (E-UTRA); Multiplexing and channel Coding (Release 8) 3GPP, TS 36.212.V8.7.0 (May 2009)," May 2009, 60 pages.

3GPP, TS 36.213, "Evolved Universal Terrestrial Radio Access (E-UTRA); Physical layer procedures (Release 11)," Oct. 2012, 145 pages.

3GPP, TS 36.808, "Evolved Universal Terrestrial Radio Access (E-UTRA); Carrier Aggregation (Release 10)", v10.0.0, Jun. 2012, 28 pages.

3GPP, "UMTS", Universal Mobile Telecommunications System, downloaded from www.3gpp.org/articleumts on Nov. 17, 2014, 2 pages.

A bill, 112th congress, 1st session, Jul. 12, 2011 [online]. Retrieved from the Internet: http://republicans.energycommerce.house.govMediafileHearingsTelecom071511DiscussionDraft.pdf.

Abandonment from U.S. Appl. No. 13/475,598, dated Feb. 8, 2016, 1 page.

Abbasi N., "Capacity estimation of HF-MIMO systems," International Conference on Ionospheric Systems and Techniques, 2009, 5 pages.

Adrian K., et al., "Quantum Tagging: Authenticating Location via Quantum Information and Relativistic Signalling Constraints," 2010, Phys. Rev. A84, 012326 (2011), DOI: 10.1103/PhysRevA.84.012326, arXiv: 1008.2147, 9 pages.

Advisory Action for U.S. Appl. No. 10/758,475, dated Oct. 1, 2008, 3 pages.

Advisory Action for U.S. Appl. No. 12/802,989, dated May 4, 2017, 3 pages.

(56) References Cited

OTHER PUBLICATIONS

Aggarwal R., et al., "On the Design of Large Scale Wireless Systems," IEEE Journal of Selected Areas Communications, Jun. 2012, vol. 31 (2), pp. 1-50.
AIRGO—Wireless without Limits—Homepage, http:www.airgonetworks.com, printed on Apr. 9, 2004, 1 page.
Aktas D., et al., "Scaling Results on the Sum Capacity of Cellular Networks with MIMO Links", IEEE Transactions on Information Theory, 2006, vol. 52, pp. 3264-3274.
Akyildiz I.F., et al., "The Evolution to 4G Cellular Systems: LTE-Advanced," Physical Communication, Elsevier, 2010, vol. 3 (2010), pp. 217-244.
Alamouti S.M., et al., "A simple transmit diversity technique for wireless communications," IEEE Journal on Selected Areas in Communications, 1998, vol. 16(8), pp. 1451-1458.
Alrabadi O.N., et al., "Beamforming via Large and Dense Antenna Arrays above a Clutter," Institute of Electrical and Electronics Engineers Journal on Selected Areas in Communications, 2013, vol. 31 (2), pp. 314-325.
Andersen J. B., et al., "The MIMO Cube—a Compact MIMO Antenna," IEEE Proceedings of Wireless Personal Multimedia Communications International Symposium, vol. 1, Oct. 2002, pp. 112-114.
Andersen J.B., "Antenna Arrays in Mobile Communications: Gain, diversity, and Channel Capacity.1", IEEE Antennas and Propagation Magazine, vol. 42 (2), Apr. 2000, pp. 12-16.
Anderson A.L., et al., "Beamforming in large-scale MIMO Multiuser Links Under a Per-node Power Constraint," Proceedings in International Symposium on Wireless Communication Systems, Aug. 2012, pp. 821-825.
Andrews J.G., "Seven Ways That Hetnet are a Cellular Paradigm Shift," IEEE Communications Magazine, Mar. 2013, [online], Retrieved from the Internet: http://users.ece.utexas.edu/-jandrews/pubs/And HetNet CommMag2012v3.pdf, pp. 136-144.
Andrews M.R., et al., "Tripling the Capacity of Wireless Communications using Electromagnetic Polarization," Nature, 2001, vol. 409, pp. 316-318.
Anritsu, "LTE resource guide", 18 pages, 2009, www.us.anritsu.com.
Araujo D. C., et al., "Channel Estimation for Millimeter-Wave Very-Large MIMO Systems," EUSPICO 2014, in proceedings, 5 pages.
Arnau J., et al., "Dissection of Multibeam Satellite Communications with a Large-scale Antenna System Toolbox," European Wireless 2014 (EW2014), pp. 548-553.
ArrayComm, "Field-Proven Results," Improving wireless economics through MAS software, printed on Mar. 28, 2011, www.arraycomm.comserve.phppage=proof, 3 pages.
Artigue C., et al.,"On the Precoder Design of Flat Fading MIMO Systems Equipped with MMSE Receivers: A Large System Approach", IEEE Trans. Inform. Theory, 2011, vol. 57 (7), pp. 4138-4155.
AT&T, "1946: First Mobile Telephone Call" 1 page, Jun. 17, 1946 [online]. Retrieved from the Internet: http:www.corp.att.comattlabsreputationtimeline46mobile.html.
Baker M., "L TE-Advanced Physical Layer," Alcatel-Lucent, Dec. 2009, 48 pages.
Barbieri A., et al., "Coordinated Downlink Multi-point Communications in Heterogeneous Cellular Networks", (Qualcomm), Information Theory and App. Workshop, Feb. 2012, pp. 7-16.
BelAir Networks, "Small cells", 4 pages, 2007 [online], retrieved from the Internet: http:www.belairnetworks.comsitesdefaultfilesVVP SmallCells.pdf.
Benedetto M.D., et al., "Analysis of the effect of the I/Q baseband Filter mismatch in an OFDM modem," Wireless personal communications, 2000, pp. 175-186.
Bengtsson E.L., "UE Antenna Properties and Their Influence on Massive MIMO System Performance," 2002, 5 pages.
Bengtsson M., "A Pragmatic Approach to Multi-User Spatial Multiplexing," IEEE, 2002, pp. 130-134.

Bernstein D.J., et al., "Post-quantum cryptography", 2009, 248 Pages.
Besson O., et al., "On parameter estimation of MIMO flat-fading channels with frequency offsets," IEEE Transactions on Transaction, Signal Processing, see also Acoustics, Speech, and Signal Processing, vol. 51 (3), 2003, pp. 602-613.
Bhagavatula R., et al., "Sizing up MIMO Arrays," IEEE Vehicular Technology Magazine, 2008, vol. 3 (4), pp. 31-38.
Bjornson E, et al., Designing Multi-User MIMO for Energy Efficiency: When is Massive MIMO the Answer?, IEEE Wireless Communications and Networking Conference (WCNC), Istanbul, Turkey, Apr. 2014, 6 pages.
Bjornson E, et al., Massive MIMO and Small Cells: Improving Energy Efficiency by Optimal Soft-Cell Coordination, ICT, 2013, Wireless Communications Symposium, pp. 5442-5447.
Blelloch G.E., "Introduction to Data Compression", Jan. 31, 2013, pp. 1-55.
Bloomberg BusinessWeek, "Steve Perlman's Wireless Fix", Aug. 14, 2014, 7 pages [online], Retrieved from the Internet: http://www.businessweek.commagazinethe-edison-of-silicon-valley-07272011.html.
Boche H., et al., "A General Duality Theory for Uplink and Downlink Beamforming", 2002, vol. 1, pp. 87-91.
Boche H., et al., "Analysis of Different Precoding decoding Strategies for Multiuser Beamforming", IEEE Vehicular Technology Conference, 2003, vol. 1, pp. 39-43.
Bourdoux A., et al., "Non-reciprocal Transceivers in OFDMSDMA Systems: Impact and Mitigation", IEEE, 2003, pp. 183-186.
Brassard G., et al., "A Quantum Bit Commitment Scheme Provably Unbreakable by both Parties", 1993, pp. 362-371.
Brodersen R. et al., "Degrees of Freedom in Multiple Antenna Channels: A Signal Space Approach," IEEE Transactions on Information Theory, 2005, vol. 51 (2), pp. 523-536.
Buhrman H., et al., "Position-Based Quantum Cryptography: Impossibility and Constructions," 2010, 27 pages.
Bydon, "Silicon Valley Inventor's Radical Rewrite of Wireless", The Wall Street Journal [online]. [retrieved on Jul. 28, 2011] Retrieved from the Internet: URL: http:blogs.wsj.comdigits20110728silicon-valley-inventors-radical-rewrite-of-wireless, 2 pages.
C. Guthy, W. Utschick, and M.L. Honig, Large System Analysis of Projection Based Algorithms for the MIMO Broadcast Channel, in Proc. of the IEEE Intl Symp. Inform. Theory, Austin, U.S.A., Jun. 2010, 5 pages.
Caire, "On Achivable Rates in a Multi-Antenna Broadcast Downlink," IEEE Transactions on Information Theory, 2003, vol. 49, pp. 1691-1706.
Catreux S., et al., "Adaptive Modulation and MIMO Coding for Broadband Wireless Data Networks," IEEE Communications Magazine, 2002, vol. 2, pp. 108-115.
Cerato B., et al., Hardware implementation of low-complexity detector for large MIMO, in Proc. IEEE ISCAS'2009, Taipei, May 2009, pp. 593-596.
Cetiner B.A., et al., "Multifunctional Reconfigurable MEMS Integrated Antennas for Adaptive MIMO Systems", Adaptive Antennas and MIMO Systems for Wireless Systems, IEEE Communications Magazine, vol. 42 (12), Dec. 2004, pp. 62-70.
Cetiner et al., "A Reconfigurable Spiral Antenna for Adaptive MIMO Systems", EURASIP Journal on Wireless Communications and Networking 2005:3, 382-389, plus International Journal of Digital Multimedia Broadcasting, Special Issue on: Audio Coding, Indexing, and Effects for Broadcasting Applications, Call for Papers Hindawi Publishing Corporation, http://www.hindawi.com, pp. 1, and Special Issue on: Advances in 3DTV: Theory and Practice, Call for Papers Hindawi Publishing Corporation, http://www.hindawi.com, pp. 1.
Chae C B., et al., "Adaptive MIMO Transmission Techniques for Broadband Wireless Communication Systems", IEEE Communications Magazine, 2010, vol. 48 (5), pp. 112-118.
Chae C B., et al., "Coordinated Beamforming with Limited Feedback in the MIMO Broadcast Channel," Special Issue on Exploiting

(56) References Cited

OTHER PUBLICATIONS

Limited Feedback in Tomorrow's Wireless Comm. Networks, IEEE Journal on Selected Areas in Communications, 2008, vol. 26 (8), pp. 1505-1515.
Chandran N., et al., "Position-Based Cryptography", Department of Computer Science, UCLA, 2009, 50 pages.
Chandrasekaran S., et al., "Near-Optimal Large-MIMO Detection Using Randomized MCMC and Randomized Search Algorithms," Proceeding in Institute of Electrical and Electronics Engineers International Conference on Communications, 2011, 5 pages.
Chapter 26—Electromagnetic-Wave Propagation, 1973, pp. 1-32, Reference Data for Radio Engineers, 5th Edition, Howard W. Sams & Co., Inc.
Chen R., et al., "Transmit selection diversity for unitary precoded multiuser spatial multiplexing systems with linear receivers," IEEE Trans. on Signal Processing, 2005, pp. 1-30.
Chen R., et al., "Transmit Selection Diversity for Unitary Precoded Multiuser Spatial Multiplexing Systems with Linear Receivers," IEEE Trans. on Signal Processing, 2007, vol. 55 (3), pp. 1159-1171.
Chen R., "Multiuser Space-Time Block Coded MIMO System with Downlink," IEEE Communications Society, 2004, pp. 2689-2693.
Chockalingam A., "Low-Complexity Algorithms for Large-MIMO Detection," International Symposium on Communications, Control and Signal Processing, 2010, 6 pages.
Choi J., et al., "Downlink Training Techniques for FDD Massive MIMO Systems: Open-Loop and Closed-Loop Training with Memory," IEEE Journal of Selected Topics in Signal Processing on Signal Processing for Large-Scale MIMO Communications, 2013, 13 pages.
Choi J., et al., "Interpolation Based Transmit Beamforming for MIMO-OFDM with Limited Feedback," IEEE Transactions on Signal Processing, 2005, vol. 53 (11), pp. 4125-4135.
Choi J., et al., "Noncoherent Trellis Coded Quantization: A Practical Limited Feedback Technique for Massive MIMO Systems," Nov. 8, 2013, pp. 1-14.
Choi L.U., et al., "A transmit preprocessing technique for multiuser MIMO systems using a decomposition approach," IEEE Trans. Wireless Comm, 2004, vol. 3 (1), pp. 20-24.
Choi W., et al., "Opportunistic space division multiple access with beam selection," IEEE Trans. on Communications, 2006, pp. 1-23.
Christian C., et al., "Oblivious Transfer with a Memory-Bounded Receiver", IEEE, 1998, pp. 493-502.
Chu D., et al., "Polyphase codes with good periodic correlation properties (corresp.)," IEEE Trans. Inform. Theory, 1972, vol. 18 (4), pp. 531-532.
Chuah C N., et al., "Capacity Scaling in MIMO Wireless Systems under Correlated Fading", IEEE Trans. Inform. Theory, 2002, vol. 48 (3), pp. 637-650.
Cohn H., et al., "Group-theoretic Algorithms for Matrix Multiplication", IEEE Symposium on Foundations of Computer Science, 2005, pp. 379-388.
Communication pursuant to Article 94(3) EPC for European Application No. 08798313.6, dated May 2, 2017, 7 pages.
Communication pursuant to Article 94(3) EPC for European Application No. 10156950.7, dated May 9, 2017, 9 pages.
Communication pursuant to Article 94(3) EPC for European Application No. 10156954, dated Jan. 25, 2017, 5 pages.
Coopersmith D., et al., "Matrix Multiplication via Arithmetic Progression", Journal of Symbolic Computation, 1990, vol. 9, pp. 251-280.
Costa, "Writing on Dirty Paper," IEEE Transactions on Information Theory, 1983, vol. IT-29 (3), pp. 439-441.
Couillet R., et al., "A Deterministic Equivalent for the Analysis of Correlated MIMO Multiple Access Channels," IEEE Trans. Inform. Theory, 2011, vol. 57 (6), pp. 3493-3514.
Coulson J., et al., "Maximum likelihood synchronization for OFDM using a pilot symbol: analysis," IEEE Journal on Selected Areas in Communications, 2001, vol. 19 (12), pp. 2495-2503.

Dahlman E., et al., "4G: LTE/LTE-Advanced for Mobile Broadband", Elsevier, 2011, Cover page, Title page, Copyright page, Table of Contents, 21 pages.
Dai et al., "Reduced-complexity performance-lossless (quasi-)maximum-likelihood detectors for S-QAM modulated MIMO systems," Electronics Letters, 2013, vol. 49(11), pp. 724-725.
Dai et al., "Reducing the Complexity of Quasi-ML Detectors for MIMO Systems Through Simplified Branch Metric and Accumulated Branch Metric Based Detection," Communications Letters, 2013, vol. 17(5), pp. 916-919.
Dai X., et al., "Carrier frequency offset estimation for OFDM/SDMA systems using consecutive pilots," IEEE Proceedings Communications, 2005, vol. 152, pp. 624-632.
Damgard I., et al., "Cryptography in the Bounded Quantum-Storage Model", IEEE, 2005, pp. 24-27.
Daniel J., "Introduction to public safety: RF Signal Distribution Using Fiber Optics," 2009, 13 pages, http://www.rfsolutions.com/fiber.pdf.
Datta, et al., "A Hybrid RTS-BP Algorithm for Improved Detection of Large-MIMO M-QAM Signals," in Proc. IEEE National Conference on Communication, 2011, 6 pages.
Datta et al., "Random-Restart Reactive Tabu Search Algorithm for Detection in Large-MIMO Systems," IEEE Communications Letters, 2010, vol. 14(12), pp. 1107-1109.
Datta T., et al., "A Novel MCMC Based Receiver for Large-Scale Uplink Multiuser MIMO Systems" Jan. 2012, 37 pages.
Debbah M., et al., "MIMO Channel Modelling and the Principle of Maximum Entropy," IEEE Transactions on Information Theory, 2005, vol. 51 (5), pp. 1667-1690.
Decision of Grant a Patent for Japanese Application No. 2016120928, dated Apr. 10, 2017, 6 pages.
Decision of Grant from foreign counterpart Japanese Patent Application No. 2015-510498, dated Jun. 14, 2017, 6 pages.
Decision of Grant from foreign counterpart Russian Patent Application No. 2014151216, dated Jan. 31, 2017, 18 pages.
Decision of Refusal from foreign counterpart Japanese Patent Application No. 2014530763, dated Dec. 19, 2016, 6 pages.
Decision of Refusal from foreign counterpart Korean Patent Application No. 2010-7006265, dated Apr. 23, 2015, 2 pages.
Decision of Rejection office action for Japan Patent Application No. 2008-513486 dated Jul. 19, 2011, 2 pages.
Degen C., et al., "Performance evaluation of MIMO systems using dual-polarized antennas," International Conference on Telecommunications, 2003, vol. 2, pp. 1520-1525.
Delfas N., "Mobile Data Wave: Who Dares to Invest, Wins," Morgan Stanley Research Global, Jun. 13, 2012, pp. 1-62.
Demirodoeven N., et al., "Hybrid Cars Now, Fuel Cell Cars Later", Aug. 13, 2004, vol. 305 Science, pp. 974-976, www.sciencemag.org.
Derrick W K et al., "Energy-Efficient Resource Allocation in OFDMA Systems with Large Numbers of Base Station Antennas", 2011, 30 pages.
Devasirvatham, "Radio Propagation Measurements at 850MHz. 1.7GHz and 4GHz Inside Two Dissimilar Office Buildings," Electronics Letter, 1990, vol. 26 (7), pp. 445-447.
Devasirvatham, "Time Delay Spread and Signal Level Measurements of 850 MHz Radio Waves in Building Environments," IEEE Transactions on Antennas and Propagation, 1986, vol. AP-34 (11), pp. 1300-1305.
Devasirvatham, "Time Delay Spread Measurements at 850 MHz and 1 7 GHz Inside a Metropolitan Office Building," Electronics Letters, 1989, vol. 25 (3), pp. 194-196.
Devillers B., et al. Mutual coupling effects in multiuser massive MIMO base stations, IEEE Antennas and Propagation Society International Symposium (APSURSI), Jul. 2012, 2 pages.
Dietrich C B., et al., "Spatial, polarization, and pattern diversity for wireless handheld terminals," Proc. IEEE Antennas and Prop. Symp, 2001, vol. 49, pp. 1271-1281.
Dighe et al., "Analysis of Transmit-Receive Diversity in Rayleigh Fading", IEEE Transactions on Communications, vol. 51 (4), Apr. 2003, pp. 694-703.
DigitalAir wireless, GeoDesy Laser Links 1.25Gbps Full Duplex, downloaded from URL: http:www.digitalairwireless.comoutdoor-

(56) References Cited

OTHER PUBLICATIONS wireless-networkspoint-to-point-wirelesslaser-fso-linksgeodesy-fso-laser-links.html on Oct. 2, 2015, 4 pages.
DigitalAir wireless, Outdoor Wireless, 5 pages, downloaded from http:www.digitalairwireless.com/outdoor-wireless-networks.html on Sep. 29, 2015 on 5 pages.
Ding P., et al., "On the sum rate of channel subspace feedback for multi-antenna broadcast channels," IEEE Globecom, 2005 vol. 5, pp. 2699-2703.
Discussion Draft, a bill, 112th congress, 1st session, Jul. 12, 2011, House Republicans, Spectrum Innovation Act of 2011, 2011, 55 pages.
Dohler M., et al., "A Step towards MIMO: Virtual Antenna Arrays," European Cooperation in the Field of Scientific and Technical Research, 2003, 9 pages.
Dong L., et al., "Multiple-input multiple-output wireless communication systems using antenna pattern diversity," Proceedings of IEEE Globe Telecommunications Conference, 2002, vol. 1, pp. 997-1001.
Dumont J., et al. "On the Capacity Achieving Transmit Covariance Matrices for MIMO Rician Channels: An Asymptotic Approach," IEEE Transactions on Information Theory, 2010, vol. 56 (3), pp. 1048-1069.
Duplicity J., et al., "MU-MIMO in LTE Systems," EURASIP Journal on Wireless Communications and Networking, 2011, 10 pages.
Dupuy, et al., On the Capacity Achieving Covariance Matrix for Frequency Selective MIMO Channels Using the Asymptotic Approach, IEEE Trans. Inform. Theory, 2010, pp. 2153-2157.
Dupuy, et al., On the Capacity Achieving Covariance Matrix for Frequency Selective MIMO Channels Using the Asymptotic Approach, IEEE Trans. Inform. Theory, 2011, vol. 57 (9), pp. 5737-5753.
Durgin, "Space-Time Wireless Channels", Prentice Hall Communications Engineering and Emerging Technologies Series, 2003, Upper Saddle River, NJ, Cover page, Title pages, Copyright page, Table of Contents, Preface, 16 pages, USA.
Dziembowski Stefan, et al., "On Generating the Initial Key in the Bounded-Storage Model", Springer, LNCS 3027, EUROCRYPT 2004, pp. 126-137.
Eklund C., et al., "IEEE Standard 802.16: A Technical Overview of the WirelessMAN Air Interface for Broadband Wireless Access," IEEE Communications Magazine, Jun. 2002, 12 pages, http://ieee802.org/16/docs/02/C80216-02_05.pdf.
Ekstrom H., et al., "Technical Solutions for the 3G Long-Term Evolution", IEEE Communications Magazine, 2006, pp. 38-45.
Erceg V., et al., "TGn Channel Models," IEEE 802.11-03940r4, May 2004, 45 pages.
Ericsson, The evolution of EDGE, Feb. 2007, 18 pages, downloaded from http:www.ericsson.com/res/docs/whitepapersevolution_to_edge.pdf.
ETSI, Mobile Technologies GSM, Retrieved from the Internet: URL: http://www.etsi.org/WebSite/Technologies/gsm.asp on Aug. 14, 2014, 2 pages.
ETSI Reconfigurable Radio Systems: Status and Future Directions on Software Defined Radio and Cognitive Radio Standards, IEEE Communications Magazine, IEEE Service Center, Sep. 2010, vol. 48 (9), pp. 78-86.
European Search Report for Application No. 10156954.9-2411, dated Sep. 2, 2010, 5 pages.
Examination Report from counterpart Australian Patent Application No. AU2014200745, dated Sep. 25, 2015, 3 pages.
Examination Report from foreign counterpart Australian Patent Application No. 2016219662, dated Sep. 9, 2016, 2 pages.
Examination Report from foreign counterpart New Zealand Patent Application No. 622137, dated Dec. 21, 2016, 3 pages.
Examination Report No. 1 from Foreign Counterpart Patent Application No. 2012308632, dated Oct. 11, 2016, 3 pages.
Examination Report No. 2 from Foreign Counterpart Patent Application No. 2012308632, dated Jun. 6, 2017, 5 pages.
Examiner's Report for Canadian Patent Application No. 2539333, dated Dec. 4, 2012, 15 pages.
Examiner's Report from counterpart Australian Patent Application No. 2013256044, dated May 9, 2016, 2 pages.
Examiner's Report from counterpart Canadian Patent Application No. 28656772, dated Jan. 7, 2016, 3 pages.
Examiner's Report from foreign counterpart Canadian Patent Application No. CN2695799, dated Apr. 1, 2015, 4 pages.
Extended European Search Report for Application No. 06750805.1, dated Dec. 1, 2016, 12 pages.
Extended European search report for Application No. 08798313.6, dated Nov. 14, 2012, 10 pages.
Extended European Search Report for Application No. 11838640.8, dated May 31, 2017, 15 pages.
Extended European Search Report for Application No. 14770916.6, dated Jan. 24, 2017, 12 pages.
Extended European Search Report for Application No. EP05254757, dated Sep. 13, 2005, 9 pages.
Extended European Search Report from EP Application No. 10156950.7, dated Jun. 11, 2012, 10 pages.
Extended European Search Report from EP Application No. 10184659.0, dated Nov. 29, 2012, 8 pages.
Extended European Search Report from EP Application No. 13843203.4, dated Feb. 15, 2016, 8 pages.
Extended European Search Report from EP Application No. 13856705.2, dated Mar. 2, 2016, 10 pages.
Extended European Search Report from European Patent Application No. 14779084.4, dated Sep. 29, 2016, 8 pages.
Extended Search Report from counterpart European Patent Application No. EP13784690.3, dated Nov. 23, 2015, 4 pages.
Extended Search Report Office Action from counterpart European Patent Application No. EP13790935.4, dated Dec. 1, 2015, 9 pages.
Fakhereddin M.J., et al., "Combined effect of polarization diversity and mutual coupling on MIMO capacity," Proc. IEEE Antennas and Prop. Symp, 2003, vol. 2, pp. 495-498.
FCC, Broadband action agenda, National Broadband Plan, 2010, pp. 1-8, Retrieved from the Internet: http://www.broadband.gov/plan/national-broadband-plan-action-agenda.pdf.
FCC, Open commission meeting, Sep. 23, 2010, Retrieved from the Internet: http:reboot.fcc.govopen-meetings2010september, 3 pages.
Federal Communications Commission, "Authorization of Spread Spectrum Systems under Parts 15 and 90 of the FCC Rules and Regulations", Jun. 1985, 18 pages.
Fella A., "Adaptive WiMAX Antennas: The promise of higher ROI," http:www.wimax.comcommentaryspotlightspotlight8-08-2005searchterm=Adlane Fella, printed May 9, 2008, Aug. 8, 2005, 3 pages.
Feng S., et al., "Self-organizing networks (SON) in 3GPP LTE", Nom or Research, May 2008, pp. 1-15.
Final Office Action for Japanese Application No. 2005223345, dated May 12, 2011, 9 Pages.
Final Office Action from U.S. Appl. No. 14/086,700, dated Oct. 14, 2016, 11 pages.
Final Office Action from U.S. Appl. No. 10/758,475, dated Jul. 8, 2008, 8 pages.
Final Office Action from U.S. Appl. No. 10/817,731, dated Jul. 9, 2008, 21 pages.
Final Office Action from U.S. Appl. No. 10/817,731, dated Sep. 11, 2009, 36 pages.
Final Office Action from U.S. Appl. No. 12/291,856, dated Sep. 15, 2011, 16 pages.
Final Office Action from U.S. Appl. No. 12/291,858, dated Sep. 15, 2011, 15 pages.
Final Office Action from U.S. Appl. No. 12/630,627, dated Apr. 2, 2013, 23 pages.
Final Office Action from U.S. Appl. No. 12/630,627, dated Oct. 20, 2011, 13 pages.
Final Office Action from U.S. Appl. No. 12/802,958, dated Apr. 15, 2015, 24 pages.
Final Office Action from U.S. Appl. No. 12/802,958, dated Apr. 29, 2016, 33 pages.
Final Office Action from U.S. Appl. No. 12/802,958, dated Jun. 7, 2017, 18 pages.

(56) References Cited

OTHER PUBLICATIONS

Final Office Action from U.S. Appl. No. 12/802,958, dated Jun. 25, 2013, 48 pages.
Final Office Action from U.S. Appl. No. 12/802,974, dated Aug. 1, 2014, 23 pages.
Final Office Action from U.S. Appl. No. 12/802,974, dated Nov. 30, 2015, 22 pages.
Final Office Action from U.S. Appl. No. 12/802,975, dated Aug. 4, 2014, 40 pages.
Final Office Action from U.S. Appl. No. 12/802,975, dated Dec. 14, 2015, 26 pages.
Final Office Action from U.S. Appl. No. 12/802,975, dated Dec. 22, 2016, 29 pages.
Final Office Action from U.S. Appl. No. 12/802,988, dated Aug. 2, 2013, 13 pages.
Final Office Action from U.S. Appl. No. 12/802,988, dated Feb. 8, 2017, 13 pages.
Final Office Action from U.S. Appl. No. 12/802,988, dated Jan. 13, 2016, 11 pages.
Final Office Action from U.S. Appl. No. 12/802,988, dated Oct. 21, 2014, 13 pages.
Final Office Action from U.S. Appl. No. 12/802,988, dated Sep. 5, 2012, 8 pages.
Final Office Action from U.S. Appl. No. 12/802,989, dated Aug. 25, 2015, 24 pages.
Final Office Action from U.S. Appl. No. 12/802,989, dated Jun. 12, 2014, 17 pages.
Final Office Action from U.S. Appl. No. 12/802,989, dated Nov. 2, 2016, 14 pages.
Final Office Action from U.S. Appl. No. 12/802,989, dated Nov. 27, 2012, 12 pages.
Final Office Action from U.S. Appl. No. 13/232,996, dated Apr. 11, 2017, 149 pages.
Final Office Action from U.S. Appl. No. 13/232,996, dated Jul. 31, 2013, 12 pages.
Final Office Action from U.S. Appl. No. 13/232,996, dated Nov. 12, 2015, 14 pages.
Final Office Action from U.S. Appl. No. 13/232,996, dated Oct. 23, 2014, 15 pages.
Final Office Action from U.S. Appl. No. 13/233,006, dated Feb. 18, 2014, 18 pages.
Final Office Action from U.S. Appl. No. 13/233,006, dated Nov. 5, 2015, 10 pages.
Final Office Action from U.S. Appl. No. 13/233,006, dated Oct. 12, 2016, 10 pages.
Final Office Action from U.S. Appl. No. 13/464,648, dated Aug. 1, 2013, 10 pages.
Final Office Action from U.S. Appl. No. 13/475,598, dated Aug. 27, 2014, 30 pages.
Final Office Action from U.S. Appl. No. 13/797,950, dated Aug. 24, 2017, 74 pages.
Final Office Action from U.S. Appl. No. 13/797,950, dated Feb. 2, 2016, 65 pages.
Final Office Action from U.S. Appl. No. 13/797,971, dated Oct. 9, 2015, 52 pages.
Final Office Action from U.S. Appl. No. 13/797,984, dated Sep. 29, 2016, 13 pages.
Final Office Action from U.S. Appl. No. 13/797,984, dated Aug. 20, 2015, 15 pages.
Final Office Action from U.S. Appl. No. 13/844,355, dated Aug. 12, 2015, 20 pages.
Final Office Action from U.S. Appl. No. 13/844,355, dated Dec. 15, 2016, 23 pages.
Final Office Action from U.S. Appl. No. 14/023,302, dated Mar. 2, 2015, 5 pages.
Final Office Action from U.S. Appl. No. 14/086,700, dated Sep. 2, 2015, 9 pages.
Final Office Action from U.S. Appl. No. 14/611,565, dated Jun. 16, 2016, 22 pages.
Final Office Action from U.S. Appl. No. 14/611,565, dated Oct. 25, 2017, 25 pages.
Final Office Action from U.S. Appl. No. 14/672,014, dated Oct. 16, 2017, 9 pages.
Final Office Action with partial English translation for Japanese Patent Application No. 2005223345, dated Feb. 18, 2014, 23 pages.
First Exam Report from counterpart New Zealand Application No. 701567, dated Feb. 3, 2016, 4 pages.
First Exam Report from counterpart New Zealand Application No. 701691, dated Feb. 10, 2016, 4 pages.
First Exam Report from counterpart New Zealand Patent Application No. 717370, dated Apr. 8, 2016, 2 pages.
First Examination Report for foreign counterpart New Zealand Patent Application No. 728719, dated May 31, 2017, 4 pages.
First Examination Report from counterpart Australian Patent Application No. 2014248533, dated Mar. 1, 2017, 5 pages.
First Examination Report from counterpart New Zealand Application No. 729017, dated Jun. 30, 2017, 3 pages.
First Examination Report mailed for counterpart Australian Patent Application No. AU2011323559, dated Sep. 30, 2015, 3 pages.
First Examination Report mailed for foreign counterpart New Zealand Patent Application No. 622137, dated Aug. 28, 2014, 2 pages.
First Office Action and Search Report from counterpart Taiwan Application No. 100139880, dated Feb. 26, 2016, 27 pages.
First Office Action and Search report from foreign counterpart China Patent Application No. 201380026522.2, dated Mar. 27, 2017, 20 pages.
First Office Action and Search Report from foreign counterpart Chinese Patent Application No. 201210466082X, dated Apr. 3, 2015, 26 pages.
First Office Action for counterpart Japan Patent Application No. JP2014264325, dated Nov. 12, 2015, 4 pages.
First office action for foreign counterpart China Patent Application No. 200680021909.9, dated Feb. 25, 2011, 4 pages.
First Office Action for Foreign counterpart Russian Patent Application No. 2007148006/11(052608), dated Nov. 17, 2009, 7 pages.
First Office Action from counterpart China Patent Application No. 200880102933.4, dated Dec. 7, 2012, 20 pages.
First Office Action from counterpart European Patent Application No. 201380035543.0, dated Feb. 15, 2016, 8 pages.
First Office Action from counterpart Korean Patent Application No. 10-2015-7033311, dated Feb. 16, 2016, 12 pages.
First Office Action from counterpart Taiwan Patent Application No. 102117728, dated Aug. 9, 2016, 11 pages.
First Office Action from European Patent Application No. 05254757.7, dated Dec. 3, 2012, 6 pages.
First Office Action from foreign counterpart Mexican Patent Application No. MXa2014013795, dated Nov. 1, 2016, 3 pages.
First Office Action from foreign counterpart Mexican Patent Application No. MXa2014013795, dated Oct. 30, 2015, 7 pages.
First Office Action from foreign counterpart Russian Patent Application No. 2011131821, dated Jun. 26, 2015, 8 pages.
First Office Action mailed Apr. 24, 2015 for foreign counterpart Mexican Patent Application No. MX/a/2014/002900, dated Apr. 24, 2015, 3 pages.
First Office Action mailed for counterpart European Patent Application No. 12762167.0, dated Jan. 4, 2016, 4 pages.
First Office Action Report for counterpart Chinese Patent Application No. 201310407419.4, dated Nov. 20, 2015, 8 pages.
Fletcher P.N., et al., "Mutual coupling in multi-element array antennas and its influence on MIMO channel capacity," IEEE Electronics Letters, 2003, vol. 39 (4), pp. 342-344.
Forax RF-over-fiber Communications Systems, Syntonics, 2011, 2 pages, http://www.syntonicscorp.com/products/products-foraxRF.html.
Foreign counterpart Final Rejection for Korean Patent Application No. 10-2007-7028402, dated Nov. 15, 2012, 8 pages.
Foreign counterpart Inquiry Japan Patent Application No. 2008-513486, dated Mar. 26, 2012, 2 pages.
Forenza A., et al., "Adaptive MIMO Transmission for Exploiting the Capacity of Spatially Correlated Channels," IEEE Trans. on Veh. Tech, 2007, vol. 56 (2), pp. 619-630.

(56) References Cited

OTHER PUBLICATIONS

Forenza A., et al., "Adaptive MIMO transmission scheme: Exploiting the spatial selectivity of wireless channels", Proceedings Institute of Electrical and Electronics Engineers Vehicular Technology Conference, 2005, vol. 5, pp. 3188-3192.
Forenza A., et al., "Benefit of Pattern Diversity Via 2-element Array of Circular Patch Antennas in Indoor Clustered MIMO Channels," IEEE Trans. on Communications, 2006, vol. 54 (5), pp. 943-954.
Forenza A., et al., "Impact of Antenna Geometry on MIMO Communication in Indoor Clustered Channels," Proc. IEEE Antennas and Prop. Symp, 2004, vol. 2, pp. 1700-1703.
Forenza A., et al., "Link Adaptation and Channel Prediction in Wireless OFDM Systems," Proceeding of IEEE International Midwest Symposium on Circuits and Systems, 2002, pp. 211-214.
Forenza A., et al., "Optimization Methodology for Designing 2-CPAs Exploiting Pattern Diversity in Clustered MIMO Channels", Institute of Electrical and Electronics Engineers Transactions on Communications, 2008, vol. 56(10), pp. 1748 -1759.
Forenza A., et al., "Switching Between OSTBC and Spatial Multiplexing with Linear Receivers in Spatially Correlated MIMO Channels," IEEE Configuration Guide: Unified Model, 2006, pp. 1-5.
Foschin, et al., "Coordinating multiple antenna cellular networks to achieve enormous spectral efficiency", Proceedings of the IEEE, Aug. 2006, vol. 153 (4), pp. 548-555.
Foschini, et al., The Value of Coherent Base Station Coordination, Conference on In-formation Sciences and Systems (CISS 2005), Mar. 16-18, 2005, 6 pages.
Foschini G.J., et al., "Simplified processing for high spectral efficiency wireless communication employing multi-element arrays," IEEE Jour. Select. Areas in Comm, 1999, vol. 17 (11), pp. 1841-1852.
Fradella R.B., "Electric Highway Vehicles: A Way to Save Our Mobility, Air, Energy, and Fortunes" Technology Assessment of Future Intercity Passenger Transportation Systems, vol. 2, Mar. 1976, pages cover p. iii, v, vi, title p., and XIX3-XIX-27.
Friends of CRC, SHARP (Stationary High Altitude Relay Platform), http://www.friendsofcrc.ca/Projects/SHARP.html, page created on Jun. 25, 1996 by Cynthia Boyko, pp. 1-5.
Friends of CRC, "The Friends of CRC Association", Home page, printed on May 14, 2008, 3 pages, http://www.friendsofcrc.ca/.
Further Examination Report for foreign counterpart New Zealand Patent Application No. 717370, dated Aug. 3, 2017, 4 pages.
Further Examination Report from counterpart New Zealand Application No. 701567, dated Aug. 24, 2016, 6 pages.
Further Examination Report from counterpart New Zealand Application No. 701691, dated Sep. 26, 2016, 3 pages.
Fusco T., et al., "Blind Frequency-offset Estimation for OFDM/OQAM Systems," IEEE Transactions on [see also Acoustics, Speech, and Signal Processing, IEEE Transactions on], 2007, vol. 55, pp. 1828-1838.
G. Caire, et al., "On the Achievable Throughput of a Multiantenna Gaussian Broadcast Channel," IEEE Transactions on Information Theory, Jul. 23, 2001, vol. 49, pp. 1-46.
Gao X., et al., "Linear Pre-Coding Performance in Measured Very-Large MIMO Channels," IEEE Vehicular Technology, 2011, pp. 1-5.
Garcia C.R., "Channel Model for Train to Train Communication Using the 400 MHz Band," in Proc. of IEEE Vehicular Technology Conference, 2008, pp. 3082-3086.
Gesbert D., et al., "From Theory to Practice: An Overview of MIMO Space—Time Coded Wireless Systems," IEEE Journal on Selected Areas in Communications, 2003, vol. 21 (3), pp. 281-302.
Gesbert D., et al., "Multi-Cell MIMO Cooperative Networks: A New Look at Interference," IEEE Journal on Selected Areas in Communications, 2010, vol. 28 (9), pp. 1380-1408.
Gesbert D., et al., "Outdoor MIMO Wireless Channels: Models and Performance Prediction," IEEE Transactions on Communications, 2002, vol. 50 (12), pp. 1926-1934.

Ghogho M., et al., "Training design for multipath channel and frequency offset estimation in MIMO systems," IEEE Transactions on Signal Processing, 2006, vol. 54 (10), pp. 3957-3965.
Glazunov A.A., et al., "Experimental Characterization of the Propagation Channel along a Very Large Virtual Array in a Reverberation Chamber", Progress in Electromagnetics Research B, 2014, vol. 59, pp. 205-217.
Gopalakrishnan B., et al., "An Analysis of Pilot Contamination on Multi-User MIMO Cellular Systems with Many Antennas," Proceedings in Signal Processing Advances in Wireless Communications, 2011, pp. 381-385.
Govindasamy S., et al., "Asymptotic Spectral Efficiency of the Uplink in Spatially Distributed Wireless Networks with Multi-Antenna Base Stations," IEEE Transactions on Communications, 2013, vol. 61(7), pp. 1-13.
GSMA, GSM technology, 2014, 1 page [online]. Retrieved from the Internet: URL: http:www.gsmworld.comtechnologyindex.html.
Guey J.C., et al., "Modeling and Evaluation of MIMO Systems Exploiting Channel Reciprocity in TDD Mode," VTC 2004-Fall, IEEE 60th, 2004, pp. 4265-4269.
Guillaud M., et al., "A Practical Method for Wireless Channel Reciprocity Exploitation Through Relative Calibration", IEEE Proceedings of Sign Processing, Aug. 2005, vol. 1, pp. 403-406.
Guillaud M., et al., "A Specular Approach to MIMO Frequency selective Channel Tracking and Prediction," in Proceedings IEEE Signal Processing Advances in Wireless Communications, Jul. 2004, pp. 59-63.
Gunashekar G., "Investigations into the Feasibility of MIMO Techniques within the HF Band: Preliminary Results," Radio Science, 2009, 33 pages.
Guthy C., et al., "Large System Analysis of Sum Capacity in the Gaussian MIMO Broadcast Channel", IEEE J. Sel. Areas Communication, 2013, vol. 31 (2), pp. 149-159.
Guthy, et al., Large System Analysis of the Successive Encoding Successive Allocation Method for the MIMO BC, Proc. of the International ITG Workshop on Smart Antennas, Bremen, Germany, Feb. 2010.
Hachem W., et al., "A New Approach for Mutual Information Analysis of Large Dimensional Multi-Antenna Channels," IEEE Transactions on Information Theory, 2008, vol. 54(9), pp. 3987-4004.
Hakkarainen A., et al., "Widely-Linear Beamforming and RF Impairment Suppression in Massive Antenna Arrays", Journal of Communications and Networks, 2013, vol. 15 (4), pp. 383-397.
Hallen H., "Long-Range Prediction of Fading Signals", Institute of Electrical and Electronics Engineers Signal Processing Magazine, 2000, vol. 17 (3), pp. 62-75.
Haring L., "Residual carrier and sampling frequency synchronization in multiuser OFDM systems," IEEE 63rd Vehicular Technology Conference, 2006, vol. 4, pp. 1937-1941.
Hazlett et al., "Radio Spectrum for a Hungry Wireless World", Sep. 22, 2011, 41 pages.
Heath R W., et al., "Antenna Selection for Spatial Multiplexing Systems with Linear Receivers," IEEE Trans. Comm, 2001, vol. 5, pp. 142-144.
Heath R W., et al., "Switching between diversity and multiplexing in MIMO systems," IEEE Trans. Comm, 2005, vol. 53 (6), pp. 962-968.
Heath R.W., et al., "Exploiting Limited Feedback in Tomorrow's Wireless Communication Networks," IEEE Journal on Sel. Areas in Comm., Special Issue on Exploiting Limited Feedback in Tomorrow's Wireless Communication Networks, 2008, vol. 26 (8), pp. 1337-1340.
Heath R.W., et al., "Switching between Multiplexing and Diversity Based on Constellation Distance," Proc. of Allerton Conf on 208, Comm. Control and Comp, Oct. 4-6, 2000, pp. 212-221.
Hendriks B., et al., "Through a Lens Sharply," IEEE Spectrum, 2004, pp. 32-36.
Hewlett Packard., "GPS and Precision Timing Applications," Application Note 1272, May 1996, pp. 1-28.
High Frequency Active Auroroal Research Program—Homepage, printed Apr. 9, 2004, http:www.haarp.alaska.edu, 1 page.

(56) References Cited

OTHER PUBLICATIONS

Hochwald B., et al., "Multi-Antenna Channel Hardening and its Implications for Rate Feedback and Scheduling", Institute of Electrical and Electronics Engineers Transactions on Information Theory, 2004, vol. 50 (9), pp. 1893-1909.

Hochwald B.M., et al., "A Vector-Perturbation Technique for Near-Capacity Multiantenna Multiuser Communication—Part I: Channel Inversion and Regularization", Institute of Electrical and Electronics Engineers Transactions on Communications, 2005, vol. 53 (1), pp. 195-202.

Hochwald B.M., et al., "A Vector-Perturbation Technique for Near-Capacity Multiantenna Multiuser Communication—Part II: Perturbation", Institute of Electrical and Electronics Engineers Transactions on Communications, 2005, vol. 53 (3), pp. 537-544.

Hoeffert M., et al., "Climate Change and Energy, Overview", Encyclopedia of Energy, vol. 1, Copyright 2004, Elsevier, Article No. NRGY: 00396, 23 pages.

Hong M., et al., "Joint Base Station Clustering and Beamformer Design for Partial Coordinated Transmission in Heterogeneous Networks," IEEE Journal on Selected Areas in Communications, Nov. 2012, vol. 31 (2), pp. 1-20.

Hosseini K., et al., "Massive MIMO and Small Cells: How to Densify Heterogeneous Networks," Wireless Communications Symposium, IEEE ICC, 2013, pp. 5442-5447.

Hoydis J., et al., "Iterative Deterministic Equivalents for the Performance Analysis of Communication Systems," Dec. 18, 2011, pp. 1-43.

Huang Y., et al., "Joint Beamforming and Power Control in Coordinated Multicell: Max-Min Duality, Effective Network and Large System Transition," IEEE Transactions on Wireless Communications, 2013, pp. 1-14.

Huff G.H., et al., "A Novel Radiation Pattern and Frequency Reconfigurable Single Turn Square Spiral Microstrip Antenna", IEEE Microwave and Wireless Components Letters, vol. 13 (2), Feb. 2003, pp. 57-59.

Huh H., et al., Achieving "Massive MIMO" Spectral Efficiency with a Not-so-Large Number of Antennas. IEEE Transactions on Wireless Communications, Sep. 2012, vol. 11 (9), pp. 3226-3239.

Huh H., et al., Multi-cell MIMO Downlink with Cell Cooperation and Fair Scheduling: A Large-System Limit Analysis, IEEE Transactions on Information Theory, 2010, vol. 57 (12), pp. 1-29.

IEEE 802.22, "IEEE 802.22 Working Group on Wireless Regional Area Networks", [online], [retrieved on Aug. 14, 2014], Retrieved from the Internet: URL:http:www.ieee802.org/22/, 1 page.

IntelliCell: A Fully Adaptive Approach to Smart Antennas, ArrayComm, Incorporated, WP-ISA-031502-2.0, 2002, pp. 1-18.

International Preliminary Report on Patentability and Written Opinion for Application No. PCT/US2009/063932, dated May 17, 2011, 8 pages.

International Preliminary Report on Patentability and Written Opinion for Application No. PCT/US2009/063935, dated May 17, 2011, 8 pages.

International Preliminary Report on Patentability and Written Opinion for Application No. PCT/US2013/071749, dated Jun. 4, 2015, 7 pages.

International Preliminary Report on Patentability and Written Opinion for Application No. PCT/US2014/025102, dated Sep. 24, 2015, 10 pages.

International Preliminary Report on Patentability and Written Opinion for Application No. PCT/US2014/025108, dated Sep. 24, 2015, 8 pages.

International Preliminary Report on Patentability and Written Opinion for Application No. PCT/US2014/025123, dated Sep. 24, 2015, 10 pages.

International Preliminary Report on Patentability and Written Opinion for Application No. PCT/US2015/014511, dated Aug. 18, 2016, 5 pages.

International Preliminary Report on Patentability for Application No. PCT/US06/41009, dated Apr. 23, 2008, 4 pages.

International Preliminary Report on Patentability for Application No. PCT/US11/58663, dated May 7, 2013, 26 pages.

International Preliminary Report on Patentability for Application No. PCT/US2005/11033, dated Jun. 3, 2008, 7 pages.

International Preliminary Report on Patentability for Application No. PCT/US2006/14854, dated Mar. 17, 2009, 4 pages.

International Preliminary Report on Patentability for Application No. PCT/US2008/073780, dated Mar. 4, 2010, 10 pages.

International Preliminary Report on Patentability for Application No. PCT/US2012/054937, dated Mar. 27, 2014, 13 pages.

International Preliminary Report on Patentability for Application No. PCT/US2013/039580, dated Nov. 4, 2014, 7 pages.

International Preliminary Report on Patentability for Application No. PCT/US2013/041726, dated Nov. 18, 2014, 6 pages.

International Preliminary Report on Patentability for Application No. PCT/US2015/023436, dated Oct. 27, 2016, 6 pages.

International Preliminary Report on Patentability from foreign counterpart PCT/US2013/061493, dated Apr. 16, 2015, 7 pages.

International Search Report and the Written Opinion for Application No. PCT/US15/14511, dated May 18, 2015, 7 pages.

International Search Report and the Written Opinion for Application No. PCT/US2013/039580, dated Aug. 20, 2013, 12 pages.

International Search Report and the Written Opinion for Application No. PCT/US2013/061493, dated Dec. 6, 2013, 9 pages.

International Search Report and Written opinion for Application No. PCT/US06/41009, dated May 24, 2007, 6 Pages.

International Search Report and Written opinion for Application No. PCT/US05/11033, dated May 2, 2008, 10 pages.

International Search Report and Written Opinion for Application No. PCT/US2008/073780, dated Nov. 19, 2008.

International Search Report and Written Opinion for Application No. PCT/US2009/063932, dated Jan. 7, 2010, 12 pages.

International Search Report and Written Opinion for Application No. PCT/US2009/063935, dated Feb. 3, 2010, 11 pages.

International Search Report and Written Opinion for Application No. PCT/US2012/054937, dated Apr. 2, 2013, 17 pages.

International Search Report and Written opinion for Application No. PCT/US2014/025105, dated Jul. 14, 2014, 12 pages.

International Search Report and Written Opinion for Application No. PCT/US2014/025108, dated Sep. 19, 2014, 10 Pages.

International Search Report and Written Opinion for Application No. PCT/US2015/023436, dated Aug. 19, 2015, 10 pages.

International Search Report and Written opinion for International Application No. PCT/US2013/071749, dated Apr. 8, 2014, 9 pages.

International Search Report and Written opinion for International Application No. PCT/US2014/025102, dated Jul. 18, 2014, 11 pages.

International Search Report and Written opinion for International Application No. PCT/US2014/025123, dated Jul. 18, 2014, 11 pages.

International Search Report and Written Opinion for PCT Application No. PCT/US11/58663, dated Mar. 29, 2012, 33 pages.

International Search Report and Written Opinion from foreign counterpart PCT Application No. PCT/US13/41726, dated Jul. 16, 2013, 7 pages.

International Search Report for Application No. PCT/US06/14854, dated May 8, 2008, 1 page.

ITU, "ISM Band," [online], Aug. 14, 2014. Retrieved from the Internet: http://www.itu.int/ITUR/terrestrial/faq/index.html#g013, pp. 1-8.

Jafar S.A., et al., "Channel Capacity and Beamforming for Multiple Transmit and Receive Antennas with Covariance Feedback," Proc. IEEE Int. Conf. on Comm, Jun. 2001, vol. 7, pp. 2266-2270.

Jafar S.A., et al., "Transmitter Optimization and Optimality of Beamforming for Multiple Antenna Systems," IEEE Trans Wireless Comm, Jul. 2004, vol. 3, No. 4, pp. 1165-1175.

Jakes W.C., Microwave Mobile Communications, IEEE Press, 1974, Table of Contents, 4 pages.

Jindal N., et al., "Dirty Paper Coding vs. TDMA for MIMO Broadcast Channels", IEEE Trans. on Information Theory, vol. 51, May 2005, pp. 1783-1794.

(56) References Cited

OTHER PUBLICATIONS

Jindal N., et al., "Multi-Antenna Broadcast Channels with Limited Feedback and User Selection," IEEE Journal on Selected Areas in Communications, 2007, vol. 25(7), pp. 1478-1491.
Jindal N., "MIMO Broadcast Channels with Finite-Rate Feedback," IEEE Trans. on Info. Theory, 2006, vol. 52, pp. 5045-5060.
Jing J., et al. "A Downlink Max-SINR Precoding for Massive MIMO System," International Journal of Future Generation Communication and Networking, 2014, vol. 7 (3), pp. 107-116.
Joho D., et al., "Articles of the Electronic Information and Communication Society", vol. J87-C (5), May 2004, pp. 1-19.
Jorswieck E.A., et al., "Channel Capacity and Capacity-Range of Beamforming in MIMO Wireless Systems under Correlated Fading with Covariance Feedback," IEEE Transactions on Wireless Communications, 2004, vol. 3, pp. 1543-1553.
Jose J., "Channel Estimation and Linear Precoding in Multiuser Multiple-Antenna TDD Systems," IEEE Transactions on Vehicular Technology, 2011, vol. 60 (5), pp. 2102-2116.
Jose J., et al. "Pilot Contamination and Precoding in Multi-cell TDD Systems," IEEE Transactions on Wireless Communications, 2011, vol. 10 (8), pp. 2640-2651.
Judge P., "GreenTouch Shows Low Power Wireless," TechWeekEurope UK, [online], Feb. 1, 2011, Retrieved from the Internet: http://www.techweekeruope.co.uk/workspace/greentouch-showslow, 3 pages.
Jungnickel V., et al., "Capacity of MIMO systems with closely spaced antennas," IEEE, 2003, vol. 7 (8), pp. 361-363.
Kamata H, et. al, "Effects of IQ Imbalance and an Effective Compensation Scheme in the MIMO-OFDM Communication System", Proceedings of the 2005 Institute of Electronics, Information and Communication General Conference, Mar. 7, 2005, B-5-90, 5 pages.
Kang M., et al., "Water-Filling Capacity and Beamforming Performance of MIMO Systems With Covariance Feedback," IEEE Workshop on Signal Processing Advances in Wireless Communications, Jun. 2003, pp. 556-560.
Kannan T.P., et al., "Separation of Cochannel Signals Under Imperfect Timing and Carrier Synchronization," IEEE Trans. Veh. Technol, 2001, vol. 50 (1), pp. 79-96.
Karakayali M.K., et al. "Network Coordination for Spectrally Efficient Communications in Cellular Systems," IEEE Wireless Communications Magazine, 2006, vol. 13 (4), pp. 56-61.
Karakayali M.K., et al., "On the Maximum Common Rate Achievable in a Coordinated Network," Proceedings of the International Conference on Communications (ICC'06), Mar. 3, 2006, vol. 9, pp. 1-6.
Kayama H., et al., "Demodulation Reference Signal Design and Channel Estimation for LTE-Advanced Uplink," Advances in Vehicular Networking Technologies, 2011, pp. 418-432.
Kellerman F C., "LDPC OFDM Space-Time Multipath Fading Channel Results," Proceedings SPIE, Digital Wireless Communications, XP-002672064, 2003, vol. 5100, pp. 19-30.
Kermoal J.P., et al., "A Stochastic MIMO Radio Channel Model with Experimental Validation," IEEE Journal on Selected Areas in Communications, 2002, vol. 20 (6), pp. 1211-1226.
Knievel C., et al., "On Particle Swarm Optimization for MIMO Channel Estimation", Article ID 614384, Journal of Electrical and Computer Engineering, 2012, vol. 2012, 10 pages.
Knievel C, Low Complexity Receiver for Large-MIMO Space Time Coded Systems, in Proc. IEEE VTC-Fall'2011, Sep. 2011, 5 pages.
Kouassi B. et al., "Reciprocity-Based Cognitive Transmissions using a MU Massive MIMO Approach", 2013, pp. 1331-1335.
Kountouris M., et al., "HetNets and Massive MIMO: Modeling, Potential Gains, and Performance Analysis," in Proc. IEEE-APS Topical Conference on Antennas and Propagation in Wireless Communications, Sep. 2013, 5 pages.
Kreith F., et al., "Efficiency of Advanced Ground Transportation Technologies", Journal of Energy Resources Technology, Copyright 2002 by ASME, Sep. 2002, vol. 124, pp. 173-179.
Krim H., et al., "Two Decades of Array Signal Processing Research," IEEE Signal Proceedings Magazine, 1996, pp. 67-94.
Krishnan N., et al., "Cellular Systems with Many Antennas: Large System Analysis under Pilot Contamination," in Proceedings of the 50th Annual Allerton Conference on Communication, Control, and Computing, 2012, pp. 1220-1224.
Kumagawa S., et al., "A Study of Introducing Distributed Transmit Power Control to Distributed Antenna System," 2011, 30 pages.
Kumar K.R., et al. "Asymptotic Performance of Linear Receivers in MIMO Fading Channels," IEEE Information Theory Workshop, Feb. 19, 2009, 48 pages.
Lang S., et al., "Design and development of a 5.25 GHz software defined wireless OFDM communication platform," IEEE Communications Magazine, 2004, vol. 42 (6), 7 pages.
Lau H.K., et al., "Insecurity of Position-Based Quantum-cryptography Protocols against Entanglement Attacks," Physical Review A, 2010, vol. 83, 13 pages.
Lee C, Network Massive MIMO for Cell-Boundary Users: From a Precoding Normalization Perspective, IEEE Goblecom Workshops, 2012, 5 pages.
Lee J., et al., "A Compressed Analog Feedback Strategy for Spatially Correlated Massive MIMO Systems," in Proceedings IEEE Vehicular Technology Conference (VTC), Quebec, Canada, Sep. 2012, pp. 1-6.
Lee J., et al., "MIMO Technologies in 3GPP LTE and LTE-Advanced," EURASIP Journal on Wireless Communications and Networking, 2009, 10 pages.
Lee J., "Introduction of LTE-Advanced DL/UL MIMO," Samsung Electronics, Sep. 2009, 18 pages.
Lee K., et al., "Frequency-offset estimation for MIMO and OFDM systems using orthogonal training sequences," IEEE Trans. Veh. Technol, 2007, vol. 56 (1), pp. 146-156.
Letter Restarting Period for Response from U.S. Appl. No. 13/233,006, dated Apr. 15, 2016, 9 pages.
Li P., et al., Multiple Output Selection-LAS Algorithm in Large MIMO Systems, IEEE Commun., 2010, vol. 14 (5), pp. 399-401.
Liang et al., "Asymptotic Performance of MMSE Receivers for Large Systems Using Random Matrix Theory," IEEE Transactions on Information Theory, 2007, vol. 53(11), pp. 4173-4190.
Liang Y., et al., "Interference Suppression in Wireless Cellular Networks through Picocells," Annual Conference on Social Studies Communication and Education, 2007, vol. 2007, pp. 1041-1045.
Liang Y., et al., "On the Relationship Between MMSE-SIC and BI-GDFE Receivers for Large Multiple-Input Multiple-Output Channels," IEEE Transactions on Signal Processing, 2008, vol. 56 (8), pp. 3627-3637.
Liang Y.C., et al., "Block-iterative Generalized Decision Feedback Equalizers (BI-GDFE) for Large MIMO Systems: Algorithm Design and Asymptotic Performance Analysis," IEEE Transactions on Signal Processing, 2006, vol. 54(6), pp. 2035-2048.
Like deck chairs on the Titanic: why spectrum reallocation won't avert the coming data crunch but technology might keep the wireless industry afloat, Feb. 2012, pp. 705-719.
Lin I., et al., "Mirror MoCap: Automatic and efficient capture of dense 3D facial motion parameters from video," International Journal of Computer Graphics, The Visual Computer, Springer Berlin, DE, XP019339114, ISSN: 14328726, DOI: 10.1007S00371-005-0291, 2005, vol. 21 (6), pp. 355-372.
Lindstrom M., (Ericsson), "LTE-Advanced Radio Layer 2 and RRC Aspects," 3GPP TSG-RAN WG2, Dec. 17-18, 2009, 38 pages.
Liu G., "Time and frequency offset estimation for distributed multiple-input multiple-output orthogonal frequency division multiplexing system," Institute of Engineering and Technology Communications, 2010, vol. 4 (6), pp. 708-715.
Love D J., et al., "An Overview of Limited Feedback in Wireless Communication Systems," Special Issue on Exploiting Limited Feedback in Tomorrow's Wireless Communication Networks, IEEE Journal on Sel. Areas in Comm., 2008, vol. 26 (8), pp. 1341-1365.
Love D J., et al.,"Grassmannian Beamforming for Multiple-Input Multiple-Output Wireless Systems", IEEE Trans. on Info. Theory special issue on MIMO Communication, 2003, vol. 49, pp. 2735-2747.
Lozano A., et al., "Fundamental Limits of Cooperation", Mar. 2012, 27 pages.

(56) References Cited

OTHER PUBLICATIONS

Luise M., et al., "Carrier frequency acquisition and tracking for OFDM systems," IEEE, 1996, vol. 44 (11), pp. 1590-1598.

Luise M., et al., "Low-complexity blind carrier frequency recovery for OFDM signals over frequency-selective radio channels," IEEE Transactions. Communications, 2002, vol. 50 (7), pp. 1182-1188.

Lunghi T., et al., "Experimental Bit Commitment Based on Quantum Communication and Special Relativity," Physical review letters, 2013, vol. 111 (18), pp. 1-16.

Malaney R.A., et al. "Location-Dependent Communications Using Quantum Entanglement," Physical Review A, 2010, vol. 81 (4), 11 pages.

Marek S., "AT&T's Rinne talks about carrier aggregation trials, small cells and more", Retrieved from the Internet: URL: http:www.fiercebroadbandwireless.comstoryatts-rinne-talks-about-carrieraggregation-trials-small-cells-and-moreNov. 8, 2012, 3 pages.

Martinez A.O., et al., "Energy Detection Using Very Large Antenna Array Receivers", 48th Asilomar Conference on Signals, Systems, and Computers Proceedings, 2014, 5 pages.

Martinez A.O., et al "Very Large Aperture Massive MIMO: a Measurement Based Study", 2014, 6 pages.

Marzetta L.A., et al., "Noncooperative Cellular Wireless with Unlimited Numbers of Base Station Antennas," IEEE Transactions on Wireless Communications, 2010, vol. 9(11), pp. 3590-3600.

Masouros C., et al., "Large-Scale MIMO Transmitters in Fixed Physical Spaces: The Effect of Transmit Correlation and Mutual Coupling", IEEE Trans. Commun., 2013, vol. 61 (7), pp. 2794-2804.

Matthaiou M., et al. "Sum Rate Analysis of ZF Receivers in Distributed MIMO Systems," IEEE Journal on Selected Areas in Communications, 2013, vol. 31 (2), pp. 180-191.

Matthaiou M., et al., "Sum Rate Analysis of ZF Receivers in Distributed MIMO Systems with Rayleigh/Lognormal Fading," 2012 IEEE International Conference on Communications, ICC 2012, Ottawa, Jun. 10-15, pp. 3857-3861.

Mattheijssen P., "Antenna-Pattern Diversity versus Space Diversity for use at Handhelds," IEEE Trans. on Veh. Technol, 2004, vol. 53 (4), pp. 1035-1042.

Mayers D., "Unconditionally Secure Quantum Bit Commitment is Impossible," Physical Review Letters, APS, 1997, vol. 78 (17), pp. 1-5.

Mazrouei-Sebdani M., "Vector Perturbation Precoding and User Scheduling for Network MIMO," IEEE WCNC, ISBN 978-1-61284-254-7, 2011, pp. 203-208.

McKay M R., et al., "A throughput-based adaptive MIMO BICM approach for spatially-correlated channels," IEEE to appear in Proc. ICC, 2006, 5 pages.

McKay M R., et al., "Multiplexing/beamforming switching for coded MIMO in spatially correlated channels based on Closed-Form BER Approximations," IEEE Transactions on Vehicular Technology, 2007, vol. 56 (5), pp. 2555-2567.

McLean J S., et al., "A re-examination of the fundamental limits on the radiation Q of electrically small antennas," IEEE Transactions on Antennas and Propagation, 1996, vol. 44 (5), pp. 672-676.

MikroTik, "Routerboard," [online], 2015, 30 pages, Retrieved from the Internet: URL: http:routerboard.com.

MIMO System uses SDMA for IEEE802.11n, Electronicstalk, 2004, pp. 1-3, http://www.electronicstalk.com/news/ime/ime149.html.

Minn., et al., "A robust timing and frequency synchronization for OFDM systems," IEEE Trans. Wireless Commun, 2003, vol. 2 (4), pp. 822-839.

MIT Media Lab, "Wireless Power—from Wirelessly Powered Car to Wirelessly Powered Fabrication", MAS 863, Final Project Webpage, 2002, pp. 1-5. http://www.media.mit.edu/physics/pedagogy/fab/fab_2002/personal_pages/akshay/mit.edu/index42.html.

Miyakawa H., et al., "A Method of Code Conversion for Digital Communication Channels with Intersymbol Interference," Transactions of the Institute of Engineers of Japan, vol. 52-A (6), 1969, pp. 272-273.

Mohammed S.K., et al., "A Low-Complexity Precoder for Large Multiuser MISO Systems", IEEE Vehicular Technology Conference, 2008, pp. 797-801.

Mohammed S.K., et al., "Constant-Envelope Multi-User Precoding for Frequency-Selective Massive MIMO Systems," IEEE Wireless Communications Letters, 2013, vol. 2(5), pp. 1-10.

Mohammed S.K., et al., "Single-User Beamforming in Large-Scale MISO Systems with Per-Antenna Constant-Envelope Constraints," IEEE Transactions on Wireless Communications, Sep. 2012, vol. 2012, pp. 3992-4005.

Mohammed S.K., et al., "Per-Antenna Constant Envelope Precoding for Large Multi-User MIMO Systems," IEEE Transactions on Communications, Jan. 2012, vol. 61(3), pp. 1-24.

Molisch et al., "MIMO Systems with Antenna Selection", IEEE Microwave Magazine, vol. 5 (1), Mar. 2004, pp. 46-56.

Montgomery B.G., "Analog RF-over-fiber technology, Syntonics LLC," 2008, pp. 2-51, http:chesapeakebayaoc.orgdocumentsSyntonics_AOC_RF_over-Fiber_19_Jan_08.pdf.

Monziano R. A., et al., "Introduction to Adaptive Arrays," New York, Wiley, 1980, Table of Contents 21 pages.

Moose P H., et al., "A technique for orthogonal frequency division multiplexing frequency offset correction," IEEE Trans. Commun, 1994, vol. 42 (10), pp. 2908-2914.

Morelli M., et al., "An improved frequency offset estimator for OFDM applications," IEEE Commun. Lett., 1999, vol. 3 (3), pp. 106-109.

Morelli M., et al., "Frequency ambiguity resolution in OFDM systems," IEEE Commun. Lett, 2000, vol. 4 (4), pp. 134-136.

Morris M. L., et al., "The Impact of Array Configuration on MIMO Wireless Channel Capacity," Proc. IEEE Antennas and Propagation Symposium, Jun. 2002, vol. 3, pp. 214-217.

Morris M.L., et al., "Network model for MIMO systems with coupled antennas and noisy amplifiers," IEEE Transactions on Antennas and Propagation, 2005, vol. 53, pp. 545-552.

Motorola, "Long Term Evolution (LTE): A Technical Overview," 2007, Retrieved from the Internet: http:business.motorola.comexperienceltepdfLTETechnicalOverview.pdf, 15 pages.

Moustakas A., et al., "MIMO Capacity through Correlated Channels in the Presence of Correlated Interferers and Noise: A (Not so) Large N Analysis", Institute of Electrical and Electronics Engineers Transformations and Information Theory, 2003, vol. 49 (10), pp. 2545-2561.

Moustakas A.L., et al., "Optimizing Multiple-Input Single-Output (MISO) Communication Systems with General Gaussian channels: Nontrivial Covariance and Nonzero Mean", Institute of Electrical and Electronics Engineers Transactions on Information Theory, 2003, vol. 49, pp. 2770-2780.

Muharar R., et al., "Downlink Beamforming with Transmit-Side Channel Correlation: A Large System Analysis," in Proc. IEEE International Conference on Communications (ICC), Kyoto, Japan, Jun. 2011, 5 pages.

Muller R., et al., "Vector Precoding for Wireless MIMO Systems and its Replica Analysis," IEEE J. Sel. Areas Commun, 2008, vol. 26 (3), pp. 530-540.

Muller R.R., et al., "Blind Pilot Decontamination," IEEE Journal of Selected Topics in Signal Processing on Signal Processing for Large-Scale MIMO Communications, 2013, 31 pages.

Nam J., et al., "Joint Spatial Division and Multiplexing: Realizing Massive MIMO Gains with Limited Channel State Information," in Proceedings Conference on Information Sciences and Systems, IEEE, Mar. 2012, 6 pages.

Narasimhan, et al., "M-ary Detection and q-ary Decoding in Large-Scale MIMO: A Non-Binary Belief Propagation Approach," Oct. 16, 2013, 7 pages.

NEC, "Self organizing networks", White paper, Feb. 2009, 5 pages.

Netsukuku, 8 pages, printed on Sep. 30, 2015, [online], Retrieved from the Internet: URL: http:netsukuku.freaknet.org.

Ngo H.Q., et al., Energy and Spectral Efficiency of Very Large Multiuser MIMO Systems, IEEE Transactions on Communications, May 21, 2012, vol. 61 (4), pp. 1436-1449.

Ngo H.Q., et al., EVD-Based Channel Estimations for Multicell Multiuser MIMO with Very Large Antenna Arrays, IEEE Interna-

(56) References Cited

OTHER PUBLICATIONS tional Conference on Acoustics, Speed and Signal Processing (ICASSP), Kyoto, Japan, Mar. 2012, 5 pages.
Ngo H.Q., et al., Massive MU-MIMO Downlink TDD Systems with Linear Precoding and Downlink Pilots, Proceedings in Allerton Conference on Communication, Control, and Computing, Urbana-Champaign, Illinois, Oct. 2013, 6 pages.
Ngo H.Q., et al., The multicell multiuser MIMO uplink with very large antenna arrays and a finite-dimensional channel, IEEE Transactions Communications, 2013, vol. 61 (6), pp. 2350-2361.
Ngo H.Q., et al., Uplink Performance Analysis of Multicell MU-MIMO Systems with ZF Receivers, Jun. 2012, pp. 1-32.
Nguyen, et al., "Multiuser Transmit Beamforming via Regularized Channel Inversion: A Large System Analysis" IEEE Global Communications Conference, New Orleans, LO, US, Dec. 2008, pp. 1-4.
Nguyen S., et al., "Compressive Sensing-Based Channel Estimation for Massive Multiuser MIMO Systems" in proceeding IEEE WCNC, 2013, 6 pages.
Nguyen S., et al., "Precoding for Multicell Massive MIMO Systems With Compressive Rank-Q Channel Approximation," 24th IEEE International Symposium, 2013, pp. 1227-1232.
NICTA, "InterfereX", downloaded Jun. 22, 2015, 3 pages, http://www.interfereX.com.
Nokia Siemens Networks, "2020: Beyond 4g, Radio Evolution for the Gigabit Experience", White Paper, 2011, www.nokiasiemensnetworks.com, 16 pages.
Non Final Office Action from U.S. Appl. No. 13/797,984, dated Feb. 28, 2017, 13 pages.
Non-Final Office Action from U.S. Appl. No. 10/758,475, dated Nov. 24, 2008, 8 pages.
Non-Final Office Action from U.S. Appl. No. 10/758,475, dated Oct. 16, 2007, 8 pages.
Non-Final Office Action from U.S. Appl. No. 10/817,731, dated Jan. 4, 2008, 14 pages.
Non-Final Office Action from U.S. Appl. No. 10/817,731, dated Jan. 21, 2009, 23 pages.
Non-Final Office Action from U.S. Appl. No. 10/817,731, dated Mar. 15, 2010, 26 pages.
Non-Final Office Action from U.S. Appl. No. 10/817,731, dated May 18, 2007, 16 pages.
Non-Final Office Action from U.S. Appl. No. 10/902,978, dated Apr. 10, 2008, 8 pages.
Non-Final Office Action from U.S. Appl. No. 10/902,978, dated Nov. 6, 2007, 11 pages.
Non-Final Office Action from U.S. Appl. No. 11/136,946, dated Nov. 14, 2007, 9 pages.
Non-Final Office Action from U.S. Appl. No. 11/256,478, dated Sep. 19, 2008, 14 pages.
Non-Final Office Action from U.S. Appl. No. 11/894,362, dated Oct. 29, 2008, 17 pages.
Non-Final Office Action from U.S. Appl. No. 11/894,394, dated Oct. 28, 2008, 13 pages.
Non-Final Office Action from U.S. Appl. No. 11/894,540, dated Apr. 29, 2009, 8 pages.
Non-Final Office Action from U.S. Appl. No. 11/894,540, dated Oct. 29, 2008, 13 pages.
Non-Final Office Action from U.S. Appl. No. 12/143,503, dated Dec. 9, 2010, 15 pages.
Non-Final Office Action from U.S. Appl. No. 12/291,856, dated Dec. 7, 2010, 12 pages.
Non-Final Office Action from U.S. Appl. No. 12/291,858, dated Dec. 7, 2010, 12 pages.
Non-Final Office Action from U.S. Appl. No. 12/291,858, dated Jun. 28, 2012, 5 pages.
Non-Final Office Action from U.S. Appl. No. 12/630,627, dated Aug. 22, 2012, 23 pages.
Non-Final Office Action from U.S. Appl. No. 12/630,627, dated Mar. 16, 2011, 5 pages.
Non-Final Office Action from U.S. Appl. No. 12/637,643, dated Jun. 7, 2012, 25 pages.
Non-Final Office Action from U.S. Appl. No. 12/637,643, dated Sep. 23, 2011, 18 pages.
Non-Final Office Action from U.S. Appl. No. 12/802,958, dated Aug. 13, 2015, 22 pages.
Non-Final Office Action from U.S. Appl. No. 12/802,958, dated Jun. 23, 2014, 24 pages.
Non-Final Office Action from U.S. Appl. No. 12/802,958, dated Nov. 4, 2016, 19 pages.
Non-Final Office Action from U.S. Appl. No. 12/802,958, dated Nov. 21, 2012, 17 pages.
Non-Final Office Action from U.S. Appl. No. 12/802,974, dated Apr. 24, 2015, 27 pages.
Non-Final Office Action from U.S. Appl. No. 12/802,974, dated Aug. 1, 2013, 35 pages.
Non-Final Office Action from U.S. Appl. No. 12/802,974, dated Dec. 19, 2012, 7 pages.
Non-Final Office Action from U.S. Appl. No. 12/802,975, dated Aug. 1, 2013, 27 pages.
Non-Final Office Action from U.S. Appl. No. 12/802,975, dated Aug. 14, 2013, 26 pages.
Non-Final Office Action from U.S. Appl. No. 12/802,975, dated Dec. 19, 2012, 16 pages.
Non-Final Office Action from U.S. Appl. No. 12/802,975, dated Jul. 1, 2016, 21 pages.
Non-Final Office Action from U.S. Appl. No. 12/802,975, dated May 7, 2015, 25 pages.
Non-Final Office Action from U.S. Appl. No. 12/802,975, dated Sep. 14, 2017, 23 pages.
Non-Final Office Action from U.S. Appl. No. 12/802,988, dated Apr. 12, 2013, 45 pages.
Non-Final Office Action from U.S. Appl. No. 12/802,988, dated Apr. 17, 2012, 10 pages.
Non-Final Office Action from U.S. Appl. No. 12/802,988, dated Aug. 15, 2016, 19 pages.
Non-Final Office Action from U.S. Appl. No. 12/802,988, dated Jun. 26, 2015, 17 pages.
Non-Final Office Action from U.S. Appl. No. 12/802,988, dated Mar. 24, 2014, 11 pages.
Non-Final Office Action from U.S. Appl. No. 12/802,988, dated Sep. 15, 2017, 11 pages.
Non-Final Office Action from U.S. Appl. No. 12/802,989, dated Jun. 14, 2012, 10 pages.
Non-Final Office Action from U.S. Appl. No. 12/802,989, dated Mar. 30, 2016, 35 pages.
Non-Final Office Action from U.S. Appl. No. 12/802,989, dated Nov. 25, 2014, 17 pages.
Non-Final Office Action from U.S. Appl. No. 12/802,989, dated Nov. 26, 2013, 27 pages.
Non-Final Office Action from U.S. Appl. No. 13/232,996, dated Apr. 11, 2013, 23 pages.
Non-Final Office Action from U.S. Appl. No. 13/232,996, dated Jun. 20, 2016, 30 pages.
Non-Final Office Action from U.S. Appl. No. 13/232,996, dated Jun. 24, 2015, 15 pages.
Non-Final Office Action from U.S. Appl. No. 13/232,996, dated Mar. 21, 2014, 9 pages.
Non-Final Office Action from U.S. Appl. No. 13/232,996, dated Sep. 21, 2017, 15 pages.
Non-Final Office Action from U.S. Appl. No. 13/233,006, dated Apr. 16, 2013, 8 pages.
Non-Final Office Action from U.S. Appl. No. 13/233,006, dated Apr. 28, 2017, 10 pages.
Non-Final Office Action from U.S. Appl. No. 13/233,006, dated Jun. 4, 2015, 12 pages.
Non-Final Office Action from U.S. Appl. No. 13/233,006, dated Sep. 12, 2013, 6 pages.
Non-Final Office Action from U.S. Appl. No. 13/233,006, dated Sep. 24, 2014, 9 pages.
Non-Final Office Action from U.S. Appl. No. 13/233,006, dated Apr. 1, 2016, 9 pages.
Non-Final Office Action from U.S. Appl. No. 13/461,682, dated Feb. 25, 2014, 37 pages.

(56) References Cited

OTHER PUBLICATIONS

Non-Final Office Action from U.S. Appl. No. 13/464,648, dated Feb. 12, 2013, 12 pages.
Non-Final Office Action from U.S. Appl. No. 13/464,648, dated Feb. 14, 2014, 11 pages.
Non-Final Office Action from U.S. Appl. No. 13/475,598, dated Dec. 30, 2013, 16 pages.
Non-Final Office Action from U.S. Appl. No. 13/475,598, dated Mar. 23, 2015, 14 pages.
Non-Final Office Action from U.S. Appl. No. 13/633,702, dated Dec. 17, 2013, 21 pages.
Non-Final Office Action from U.S. Appl. No. 13/797,950, dated Jan. 11, 2017, 65 pages.
Non-Final Office Action from U.S. Appl. No. 13/797,950, dated May 11, 2015, 61 pages.
Non-Final Office Action from U.S. Appl. No. 13/797,971, dated May 11, 2015, 52 pages.
Non-Final Office Action from U.S. Appl. No. 13/797,971, dated Oct. 4, 2016, 56 pages.
Non-Final Office Action from U.S. Appl. No. 13/797,984, dated Jan. 14, 2016, 14 pages.
Non-Final Office Action from U.S. Appl. No. 13/797,984, dated Jan. 29, 2015, 15 pages.
Non-Final Office Action from U.S. Appl. No. 13/844,355, dated Apr. 18, 2016, 21 pages.
Non-Final Office Action from U.S. Appl. No. 13/844,355, dated Jun. 30, 2017, 159 pages.
Non-Final Office Action from U.S. Appl. No. 14/023,302, dated Jul. 17, 2014, 37 pages.
Non-Final Office Action from U.S. Appl. No. 14/023,302, dated Jun. 11, 2015, 8 pages.
Non-Final Office Action from U.S. Appl. No. 14/086,700, dated Apr. 2, 2015, 12 pages.
Non-Final Office Action from U.S. Appl. No. 14/086,700, dated Mar. 4, 2016, 10 pages.
Non-Final Office Action from U.S. Appl. No. 14/086,700, dated May 25, 2017, 12 pages.
Non-Final Office Action from U.S. Appl. No. 14/156,254, dated Sep. 11, 2014, 44 pages.
Non-Final Office Action from U.S. Appl. No. 14/611,565, dated Aug. 31, 2015, 21 pages.
Non-Final Office Action from U.S. Appl. No. 14/611,565, dated Mar. 14, 2017, 23 pages.
Non-Final Office Action from U.S. Appl. No. 14/672,014, dated Dec. 30, 2016, 7 pages.
Non-Final office action from U.S. Appl. No. 15/057,002, dated Oct. 23, 2017, 60 pages.
Non-Final Office Action from U.S. Appl. No. 15/181,383, dated May 22, 2017, 48 pages.
Non-Final Office Action from U.S. Appl. No. 15/201,276, dated Mar. 1, 2017, 107 pages.
Non-Final Office Action from U.S. Appl. No. 15/340,914, dated Jul. 21, 2017, 114 pages.
Notice of Acceptance for Foreign counterpart Australia Patent Application No. 2006249578, dated Jan. 3, 2012, 3 pages.
Notice of Acceptance from foreign counterpart Australian Patent Application No. 2013327697, dated Feb. 15, 2017, 4 pages.
Notice of Acceptance from foreign counterpart Australian Patent Application No. 2014248533, dated Jun. 28, 2017, 4 pages.
Notice of Acceptance from foreign counterpart Australian Patent Application No. 20160219662, dated May 5, 2017, 3 pages.
Notice of Acceptance from foreign counterpart Australian Patent Application No. AU20140200745, dated Sep. 19, 2016, 3 page.
Notice of Acceptance from foreign counterpart New Zealand Patent Application No. 610463, dated Aug. 5, 2015, 1 page.
Notice of Acceptance from Foreign Counterpart Patent Application No. 2012308632, dated Sep. 13, 2017, 4 pages.
Notice of Allowance and Search Report from foreign counterpart Taiwan Patent Application No. 102134408, dated Feb. 17, 2017, 9 pages.
Notice of Allowance from counterpart Australian Patent Application No. 2011323559, dated May 13, 2016, 2 pages.
Notice of Allowance from counterpart Mexican Patent Application No. MX/a/2014/002900, dated Nov. 26, 2015, 4 pages. Translation attached.
Notice of Allowance from counterpart U.S. Appl. No. 12/917,257, dated Dec. 6, 2012, 8 pages.
Notice of Allowance from foreign counterpart Canadian Patent Application No. 2695799, dated Feb. 9, 2016, 1 page.
Notice of Allowance from foreign counterpart Canadian Patent Application No. P14906, dated Jun. 1, 2015, 1 page.
Notice of Allowance from foreign counterpart Korean Patent Application No. 2015-7002560, dated Feb. 4, 2016, 2 Pages.
Notice of Allowance from U.S. Appl. No. 12/802,976, dated Mar. 14, 2011, 9 pages.
Notice of Allowance from U.S. Appl. No. 13/232,996, dated Oct. 12, 2016, 5 pages.
Notice of Allowance from U.S. Appl. No. 10/758,475, dated May 11, 2009, 4 pages.
Notice of Allowance from U.S. Appl. No. 10/817,731, dated Sep. 30, 2010, 6 pages.
Notice of Allowance from U.S. Appl. No. 10/902,978, dated Apr. 16, 2008, 7 pages.
Notice of Allowance from U.S. Appl. No. 10/902,978, dated Jun. 27, 2008, 7 pages.
Notice of Allowance from U.S. Appl. No. 11/136,946, dated Jul. 14, 2008, 7 pages.
Notice of Allowance from U.S. Appl. No. 11/256,478, dated Jan. 26, 2010, 9 pages.
Notice of Allowance from U.S. Appl. No. 11/256,478, dated Jul. 30, 2009, 9 pages.
Notice of Allowance from U.S. Appl. No. 11/256,478, dated Oct. 29, 2009, 16 pages.
Notice of Allowance from U.S. Appl. No. 11/894,362, dated Mar. 23, 2009, 10 pages.
Notice of Allowance from U.S. Appl. No. 11/894,362, dated Nov. 10, 2009, 5 pages.
Notice of Allowance from U.S. Appl. No. 11/894,362, dated Sep. 3, 2009, 12 pages.
Notice of Allowance from U.S. Appl. No. 11/894,394, dated Jul. 30, 2009, 14 pages.
Notice of Allowance from U.S. Appl. No. 11/894,394, dated Jun. 26, 2009, 7 pages.
Notice of Allowance from U.S. Appl. No. 11/894,394, dated Mar. 6, 2009, 11 pages.
Notice of Allowance from U.S. Appl. No. 11/894,540, dated Nov. 9, 2009, 5 pages.
Notice of Allowance from U.S. Appl. No. 11/894,540, dated Sep. 14, 2009, 13 pages.
Notice of Allowance from U.S. Appl. No. 12/143,503, dated Apr. 11, 2011, 9 pages.
Notice of Allowance from U.S. Appl. No. 12/143,503, dated Aug. 18, 2011, 12 pages.
Notice of Allowance from U.S. Appl. No. 12/143,503, dated Dec. 9, 2011, 11 pages.
Notice of Allowance from U.S. Appl. No. 12/291,856, dated Jun. 28, 2012, 8 pages.
Notice of Allowance from U.S. Appl. No. 12/291,858, dated Feb. 25, 2013, pages.
Notice of Allowance from U.S. Appl. No. 12/291,858, dated Oct. 15, 2012, 8 pages.
Notice of Allowance from U.S. Appl. No. 12/630,627, dated Sep. 25, 2013, 11 pages.
Notice of Allowance from U.S. Appl. No. 12/637,643, dated Jan. 17, 2013, 11 pages.
Notice of Allowance from U.S. Appl. No. 12/802,938, dated Apr. 4, 2013, 16 pages.
Notice of Allowance from U.S. Appl. No. 12/802,938, dated Dec. 6, 2012, 37 pages.
Notice of Allowance from U.S. Appl. No. 12/802,938, dated May 24, 2013, 10 pages.
Notice of Allowance from U.S. Appl. No. 12/802,938, dated Sep. 19, 2012, 8 pages.

(56) References Cited

OTHER PUBLICATIONS

Notice of Allowance from U.S. Appl. No. 12/802,974, dated Sep. 29, 2016, 5 pages.
Notice of Allowance from U.S. Appl. No. 12/802,974, dated Feb. 28, 2017, 15 pages.
Notice of Allowance from U.S. Appl. No. 12/802,974, dated Jun. 30, 2017, 89 pages.
Notice of Allowance from U.S. Appl. No. 12/802,974, dated Oct. 4, 2017, 17 pages.
Notice of Allowance from U.S. Appl. No. 12/802,974, dated Sep. 13, 2016, 43 pages.
Notice of Allowance from U.S. Appl. No. 12/802,976, dated Apr. 14, 2011, 16 pages.
Notice of Allowance from U.S. Appl. No. 12/802,976, dated Aug. 22, 2011, 8 pages.
Notice of Allowance from U.S. Appl. No. 12/802,976, dated Dec. 9, 2011, 11 pages.
Notice of Allowance from U.S. Appl. No. 12/802,976, dated Nov. 29, 2010, 7 pages.
Notice of Allowance from U.S. Appl. No. 12/802,989, dated Jun. 27, 2017, 121 pages.
Notice of Allowance from U.S. Appl. No. 12/917,257, dated May 31, 2013, 12 pages.
Notice of Allowance from U.S. Appl. No. 13/232,996, dated Oct. 26, 2016, 4 pages.
Notice of Allowance from U.S. Appl. No. 13/461,682, dated Oct. 2, 2014, 10 pages.
Notice of Allowance from U.S. Appl. No. 13/464,648, dated Apr. 24, 2015, 23 pages.
Notice of Allowance from U.S. Appl. No. 13/464,648, dated Aug. 14, 2015, 21 pages.
Notice of Allowance from U.S. Appl. No. 13/464,648, dated Aug. 25, 2015, 4 pages.
Notice of Allowance from U.S. Appl. No. 13/464,648, dated Feb. 23, 2016, 15 pages.
Notice of Allowance from U.S. Appl. No. 13/464,648, dated Jan. 9, 2015, 11 pages.
Notice of Allowance from U.S. Appl. No. 13/464,648, dated Nov. 30, 2015, 12 pages.
Notice of Allowance from U.S. Appl. No. 13/464,648, dated Sep. 19, 2014, 5 pages.
Notice of Allowance from U.S. Appl. No. 13/475,598, dated Feb. 14, 2017, 41 pages.
Notice of Allowance from U.S. Appl. No. 13/475,598, dated Oct. 19, 2015, 29 pages.
Notice of Allowance from U.S. Appl. No. 13/633,702, dated Jan. 6, 2015, 27 pages.
Notice of Allowance from U.S. Appl. No. 13/633,702, dated Aug. 15, 2014, 11 pages.
Notice of Allowance from U.S. Appl. No. 13/797,971, dated May 4, 2017, 8 pages.
Notice of Allowance from U.S. Appl. No. 13/797,971, dated Oct. 18, 2017, 144 pages.
Notice of Allowance from U.S. Appl. No. 13/797,984, dated Oct. 19, 2017, 10 pages.
Notice of Allowance from U.S. Appl. No. 14/023,302, dated May 17, 2016 5 pages.
Notice of Allowance from U.S. Appl. No. 14/023,302, dated Oct. 9, 2015, 5 pages.
Notice of Allowance from U.S. Appl. No. 14/023,302, dated Apr. 27, 2016, 3 pages.
Notice of Allowance from U.S. Appl. No. 14/023,302, dated Feb. 5, 2016, 27 pages.
Notice of Allowance from U.S. Appl. No. 14/156,254, dated Feb. 26, 2016, 21 pages.
Notice of Allowance from U.S. Appl. No. 14/156,254, dated Jul. 8, 2015, 7 pages.
Notice of Allowance from U.S. Appl. No. 14/156,254, dated Mar. 12, 2015, 5 pages.
Notice of Allowance from U.S. Appl. No. 14/156,254, dated Nov. 3, 2015, 29 pages.
Notice of Allowance mailed for U.S. Appl. No. 12/917,257, dated Feb. 15, 2013, 18 pages.
Notice of Grant for Foreign counterpart China Patent Application No. 200680021909.9, dated Mar. 5, 2012, 3 pages.
Notice of Grant for Foreign counterpart Russian Patent Application No. 2007148006/11(052608), dated Mar. 17, 2010, 12 pages.
Notice of Grant from foreign counterpart China Patent Application No. 201210464974.6 dated Jul. 1, 2015, 3 pages.
Notice of Reasons for Rejection from foreign counterpart Japanese Patent Application No. 20150510498, dated Sep. 26, 2016, 21 pages.
Notification for Granting Patent Right from foreign counterpart China Patent Application No. 201180061132.X, dated Apr. 6, 2017, 6 pages.
Notification of Reason for Rejection office action from foreign counterpart for Japan Patent Application No. 2008-513486, dated Dec. 6, 2010, 2 pages.
Notification on Grant of Patent Right for Invention from foreign counterpart China Patent Application No. 201210466082.X, dated Jan. 26, 2017, 3 pages.
Oberli C., et al., "Maximum likelihood tracking algorithms for MIMOOFDM, in Communications," IEEE International Conference on Networking, Jun. 20-24, 2004, vol. 4, pp. 2468-2472.
Oda Y., "Measured Path Loss and Multipath Propagation Characteristics in UHF and Microwave Frequency Bands for Urban Mobile Communications," IEEE, 2001, pp. 337-341.
Office Action and Search Report from foreign counterpart China Patent Application No. CN201380035543, dated Jan. 3, 2017, 22 pages.
Office Action and Search Report from foreign counterpart Russian Patent Application No. 2014148791/28(078479), dated Apr. 13, 2017, 14 pages.
Office Action for foreign counterpart China Patent Application No. 20051008867.1, dated Oct. 26, 2010, 4 pages.
Office Action from foreign counterpart Australian Patent Application No. 2004203336, dated Jun. 5, 2009, 2 pages.
Office Action from foreign counterpart Canada Patent Application No. 2514383, dated Jul. 26, 2012, 3 pages.
Office Action from foreign counterpart China Patent Application No. 200510088676 dated Jan. 25, 2011, 8 pages.
Office Action from foreign counterpart China Patent Application No. 200510088676.1 dated Feb. 5, 2010,18 pages.
Office Action from foreign counterpart China Patent Application No. 200510088676.1 dated Mar. 20, 2009, 24 pages.
Office Action from foreign counterpart China Patent Application No. 201180061132.X, dated May 27, 2015, 6 pages.
Office Action from foreign counterpart China Patent Application No. 201180061132.X, dated Oct. 10, 2016, 11 pages.
Office Action from foreign counterpart for Japan Patent Application No. 2007-506302, dated Jan. 11, 2011, 5 pages.
Office Action from foreign counterpart Japan Patent Application No. 2013-537753, dated Sep. 7, 2015, 9 pages.
Office Action from foreign counterpart Japanese Patent Application No. 2012-057351, dated Jul. 1, 2013, 6 pages.
Office Action from foreign counterpart Japanese Patent Application No. 2012-057351, dated Mar. 10, 2014, 2 pages.
Office Action from foreign counterpart Japanese Patent Application No. 2013-156855 dated Apr. 22, 2015, 6 pages.
Office Action from foreign counterpart Japanese Patent Application No. 2014-140413, dated Jun. 27, 2015, 6 pages.
Office Action from foreign counterpart Japanese Patent Application No. 20150162819, dated Oct. 3, 2016, 6 pages.
Office Action from foreign counterpart Korean Patent Application No. 1020107006265, dated Jul. 29, 2014, 10 pages.
Office Action from foreign counterpart Korean Patent Application No. 20050070079, dated Jul. 29, 2011, 3 pages.
Office Action from foreign counterpart Korean Patent Application No. 2015-7002560, dated May 21, 2015, 10 pages.
Office Action from foreign counterpart mailed for New Zealand Patent Application No. 610463 dated Jan. 22, 2014, 2 pages.

(56) References Cited

OTHER PUBLICATIONS

Office Action from foreign counterpart Mexican Patent Application No. MX/a/2014/013377, dated Mar. 22, 2016, 20 pages.
Office Action from foreign counterpart Mexican Patent Application No. Mx/a/2015/002992, dated Nov. 8, 2016, 4 pages.
Office Action from foreign counterpart Mexico Patent Application No. MX/a/2014/002900, dated May 25, 2015, 7 pages.
Office Action from foreign counterpart Russian Patent Application No. 2014151216, dated Sep. 30, 2016, 12 pages.
Office Action from foreign counterpart Russian Patent Application No. 2016144927, dated Dec. 21, 2016, 6 pages.
Office Action from foreign counterpart Taiwan Application No. 100139880, dated Jan. 26, 2017, 7 pages.
Office Action from Foreign Counterpart Taiwan Patent Application No. 094125985, dated Jan. 6, 2012, 7 pages.
Office Action from foreign counterpart Taiwan Patent Application No. 101133865, dated Oct. 28, 2016, 5 pages.
Office Action from foreign counterpart Taiwan Patent Application No. 102116145, dated Mar. 31, 2017, 7 pages.
Office Action from foreign counterpart Taiwan Patent Application No. 102117728, dated Nov. 29, 2016, 6 pages.
Office Action from U.S. Appl. No. 13/844,355, dated Jan. 8, 2015, 23 pages.
Oman H, et al., "Eventful Developments in Energy Conversion", Conference Report, IEEE AESS Systems Magazine, Jan. 2002, pp. 34-40.
Onggosanusi E. N., et al., High Rate Space—Time Block Coded Scheme: Performance and Improvement in Correlated Fading Channels, Proc. IEEE Wireless Comm. and Net. Conf, Mar. 2002, vol. 1, pp. 194-199.
Optimized Markov Chain Monte Carlo for Signal Detection in MIMO Systems: An Analysis of the Stationary Distribution and Mixing Time, Signal Processing, vol. 62, No. 17, Sep. 2014.
Ozgur A., et al., "Spatial Degrees of Freedom of Large Distributed MIMO Systems and Wireless Ad Hoc Networks", Institute of Electrical and Electronics Engineers Journal on Selected Areas in Communications, 2013, vol. 31 (2), pp. 202-214.
Pan, et al, "Precoding and Power allocation for Cooperative MIMO systems", International Conference on Wireless Communications, Networking and Mobile Computing, IEEE, 2006, 4 pages.
Papadogiannis A., et al "Efficient Selective Feedback Design for Multicell Cooperative Networks," Institute of Electrical and Electronics Engineers Transactions on Vehicular Technology, 2010, vol. 60 (1), pp. 196-205.
Papadopoulos H.C., et al., Achieving Large Spectral Efficiencies from MU-MIMO with Tens of Antennas: Location-Adaptive TDD MU-MIMO Design and User Scheduling, in Proc. IEEE Asilomar Conf. on Signals, Systems, and Computers (ACSSC), Pacific Grove, CA, Nov. 2010, pp. 636-643.
Parvall, et al., "LTE Advanced-Evolving LTE Towards IMT-Advanced," IEEE VTC 2008, 978-1-4244-1722-3/08/$25.00, 5 pages.
Paulraj A., et al., "Introduction to Space-Time Wireless Communications", 2003, 33 Pages.
Paulraj, "Is OFDMA, MIMO and OS the right stuff for mobile broad-band?" 63 pages, http://www.ieeevtc.org/vtc2005fall/presentations/paulraj.pdf, Sep. 2005.
Payami S., et al., Channel Measurements and Analysis for Very Large Array Systems at 2.6 GHz, in Proc. 6th European Conference on Antennas and Propagation, EuCAP 2012, Prague, Czech Republic, Mar. 26, 2012, 5 pages.
Per-Erik ., et al., "VDSL2: Next Important Broadband Technology", Ericsson Review No. 1, 2006, pp. 36-47.
Perlman, et al., Distributed-Input Distributed-Output (Dido), Wireless Technology: A New Approach to Multiuser Wireless, Aug. 2011, Retrieved from the Internet: http://www.rearden.com/DIDO/DIDO White Paper 110727.pdf.
Perlman et al., "Distributed-Input Distributed-Output (Dido), Wireless Technology: A New Approach to Multiuser Wireless", Rearden Labs White Paper, 19 pages, Jul. 2011, Retrieved from the Internet: http://www.reardenwireless.com11 0727-DIDOA %20New%20Approach%20to%20Multiuser%20Wireless.pdf.
Piazza D., et al., "Design and Evaluation of a Reconfigurable Antenna Array for MIMO Systems", IEEE Transactions on Antennas and Propagation, 2008, vol. 56 (3), pp. 869-881.
Ping-Heng., et al., "Compressive Sensing Based Channel Feedback Protocols for Spatially-Correlated Massive Antenna Arrays", in Proc. IEEE Wireless Communications and Networking Conference (WCNC 2012), Apr. 2012, pp. 492-497.
Pitarokoilis A. et al., "On the Optimality of Single-Carrier Transmission in Large-Scale Antenna Systems," IEEE Wireless Commun. Lett., Aug. 2012, vol. 1, No. 4, pp. 276-279.
Pitarokoilis, "Effect of Oscillator Phase Noise on Uplink Performance of Large MU-MIMO Systems," in Proc. of the 50th Annual Allerton Conference on Communication, Control, and Computing, Oct. 2012, 9 pages.
Pohl V., et al., "Antenna spacing in MIMO indoor channels," IEEE Proc. Veh. Technol. Conf, 2002, vol. 2, pp. 749-753.
Pollock et al., "Antenna Saturation Effects on MIMO Capacity," IEEE International Conference on Communications, 2003, vol. 4, pp. 2301-2305.
Post-quantum Cryptography [Web], Retrieved on Nov. 14, 2014, 3 pages. Retrieved from the Internet: http://pqcrypto.org/.
Preliminary Report on Patentability and Written Opinion for Application No. PCT/US2014/025105, dated Sep. 24, 2015, 10 pages.
Proakis J., "Digital Communications Fourth edition," 2001, pp. 9, Department of Electrical and Computer Engineering, Northeastern University, ISBN 0-07-232111-3, Cover page, Title page, Table of Contents.
Proakis J.G., "Communication System Engineering," Prentice Hall, Table of Contents, 1994, 11 pages.
Propagation, 2 pages, printed Oct. 21, 2005, http://home.planet.nl/~alphe078/propagat1.htm.
Qian, "Partially Adaptive Beamforming for Correlated Interference Rejection", IEEE Trans. on Sign. Proc., 1995, vol. 43 (2), pp. 506-515.
Qibi, "A Forward Link Performance Study of the 1 xEV-DO Rev. 0 System Using Field Measurements and Simulations," Lucent Technologies. Retrieved from the Internet: http:www.cdg.orgresourceswhite_papersfilesLucent%201xEVD0%20Rev%200%20Mar%2004.pdf, 2004, 19 pages.
QUALCOMM, "The 1000x Data Challenge, the Latest on Wireless, Voice, Services and Chipset Evolution," 4G World, Oct. 31, 2012, 61 pages, Submitted as Parts 1-3.
Quantum Cryptography. Wikipedia: The Free Encyclopedia. Wikimedia Foundation, Inc. Jul. 26, 2014 [Web], Retrieved on Nov. 14, 2014, 5 pages [online] Retrieved from the Internet: https://en.wikipedia.org/wiki/Quantum_cryptography.
Radio Frequency Identification Tag Application for Tracking Vehicle Refueling, Maintenance, and Theft, IBM Technical disclosure Bulletin, vol. 40 (3), Mar. 1997, p. 81/82.
Rao R., et al., "I/Q mismatch cancellation for MIMO-OFDM systems in Personal, Indoor and Mobile Radio Communication," PIMRC, vol. 4, 2004, pp. 2710-2714.
Rao R.M., et al., "Multi-antenna testbeds for research and education in wireless communications," IEEE Communications Magazine, 2004, vol. 42 (12), pp. 72-81.
Rapajic P., et al., Information Capacity of Random Signature Multiple-Input Multiple Output Channel, IEEE Trans. Commun., 2000, vol. 48 (8), pp. 1245-1248.
Rappaport T., "Wireless Communications Principles and Practice," 2002, 13 pages, Prentice Hall.
Ravindran N., et al., "MIMO Broadcast Channels with Block Diagonalization and Finite Rate Feedback," IEEE, ICASSP Apr. 2007, pp. III-13-III-16.
Reconfigurable Radio Systems (RRS),; Radio Base Station (RBS), Software Defined Radio (SDR), status implementations and costs aspects including future possibilities, Technical Report, ETSI, No. V1.1.1, 2009, 24 pages.
Regenerative Power and Motion, "Electric Highway Vehicles", Aug. 2015, 10 pages, http://home.earthlink.net/~fradella/car.htm.
Rejection Decision from foreign counterpart Japan Patent Application No. JP2014264325, dated Oct. 3, 2016, 7 pages.

(56) References Cited

OTHER PUBLICATIONS

Riegler, et al., "Asymptotic Statistics of the Mutual Information for Spatially Correlated Rician Fading MIMO Channels with Interference", IEEE Trans. Inform. Theory, 2010, vol. 56 (4), pp. 1542-1559.
Robert K., et al. "Unconditional Security from Noisy Quantum Storage," IEEE Transactions on Information Theory, Mar. 2012, vol. 58 (3), pp. 1962-1984.
Robinson S., "Toward an Optimal Algorithm for Matrix Multiplication," Nov. 2005, vol. 38 (9), 3 pages.
Ruckus wireless, "Long-range 802.11n (5GHz) Wi-Fi Point-to-Point/Multipoint backhaul," Sep. 4, 2015, 2 pages, Retrieved from the Internet: URL: http://www.ruckuswireless.com/products/ZoneFlex-outdoor7731.
Rusek, et al., "Scaling up MIMO: Opportunities and Challenges with Very Large Arrays", IEEE Signal Proces. Mag., Jan. 2012, vol. 30 (1), pp. 1-30.
Rysavy P., "No silver bullets for FCC, NTIA spectrum challenge", Daily report for executives, Bloomberg BNA, Aug. 2012, pp. 1-4, http://www.rysavy.com/Articles/2012 09 No Spectrum Silver Bullets.pdf.
Saleh A.A.M., et al.,"A Statistical Model for Indoor Multipath Propagation ", Institute of Electrical and Electronics Engineers Journal on Selected Areas in Communications, 1987, vol. SAC-5 (2), pp. 128-137.
Samsung: "Discussion on open-loop CoMP schemes", 3GPP Draft; R1-093377 Open-Loop Comp, 3rd Generation Partnership Project (3GPP), Mobile Competence Centre; 650, Route Des Lucioles ; F-06921 Sophia-Antipolis Cedex, France, Aug. 19, 2009, 4 pages.
Sasako M., et al., "Device for Detecting Abnormality on Wheel Tread of Railcar," Abstract, 1993, 1 page.
Schafhuber D et al., "MMSE and Adaptive Prediction of Time-Varying Channels for OFDM Systems", IEEE Trans. Wireless Commun., 2005, vol. 4 (2), pp. 593-602.
Schmidl T.M., et al., "Robust frequency and timing synchronization for OFDM," IEEE Trans. Commun, 1997, vol. 45 (12), pp. 1613-1621.
Schubert M., et al., "Joint Dirty Paper' Pre-Coding and Downlink Beamforming," Spread Spectrum Techniques and Applications, 2002 IEEE Seventh International Symposium, Dec. 2002, vol. 2, pp. 536-540.
Schuchert S., et al., "A novel I/Q imbalance compensation scheme for the reception of OFDM signals," IEEE Transaction on Consumer Electronics, 2001, pp. 313-318.
Second Office Action and Search Report from foreign counterpart China Patent Application No. 201180061132.X dated Mar. 11, 2016, 11 pages.
Second Office Action and Search report from foreign counterpart China Patent Application No. 201280044869.5, dated Jan. 17, 2017, 19 pages.
Second Office Action from counterpart Mexican Patent Application No. MX/a/2014/013795, dated Feb. 3, 2016, 7 pages.
Second office action from foreign counterpart China Patent Application No. 200680021909.9 dated Sep. 5, 2011, 4 pages.
Serpedin E., et al., "Blind channel and carrier frequency offset estimation using periodic modulation precoders," IEEE Signal Processing, IEEE Transactions on [see also Acoustics, Speech, and Signal Processing, IEEE Transactions on], 2000, vol. 48 (8), pp. 2389-2405.
Sharif M., et al., "On the capacity of MIMO broadcast channel with partial side information," IEEE Trans. Info. Th, Feb. 2005, vol. 51 (2), pp. 506-522.
Shen Z., et al., "Low complexity user selection algorithms for multiuser MIMO systems with block diagonalization," IEEE Transactions on Signal Processing, 2005, pp. 1-12.
Shen Z., et al., "Sum capacity of multiuser MIMO broadcast channels with block diagonalization," IEEE Trans. Wireless Comm, 2005, 5 pages.
Shepard C., Argos: Practical Many-Antenna Base Stations, in Proc. ACM Int. Conf. Mobile Computing and Networking (MobiCom), Aug. 2012, 12 pages.
Shepard C., ArgosV2: A Flexible Many-Antenna Research Platform, Extended Abstract for demonstration in Proc. ACM Int. Conf. Mobile Computing and Networking (MobiCom), Oct. 2013, 3 pages.
Shi K., et al., "Coarse frame and carrier synchronization of OFDM systems: a new metric and comparison," IEEE Trans. Wireless Commun, 2004, vol. 3 (4), pp. 1271-1284.
Shiu D., et al., "Fading correlation and its effect on the capacity of multielement antenna systems," IEEE Trans. Comm, 2000, vol. 48 (3), pp. 502-513.
Shuangqing Wei., et al., "On the Asymptotic capacity of MIMO Systems with Fixed Length Linear Antenna Arrays," IEEE International Conference on Communications, 2003, vol. 4, pp. 2633-2637.
Simon, M, K., et al., "Digital Communication over Fading Channels" A Unified Approach to Performance Analysis, Wiley Series in Telecommunications and Signal Processing, 2000, 10 pages.
Simon S.H., et al., "Optimizing MIMO Antenna Systems with Channel Covariance Feedback," IEEE Journal on Selected Areas in Communications, 2003, vol. 2003, pp. 406-417.
Spencer Q H., et at, "Adaptive Antennas and MIMO Systems for Wireless Communications—An Introduction to the Multi-User MIMI Downlink," IEEE Communications Magazine, 2004, pp. 60-67.
Spencer Q H., et al., "Zero-forcing methods for downlink spatial multiplexing in multiuser MIMO channels," IEEE Trans. Sig. Proc, 2004, vol. 52, pp. 461-471.
Srinidhi N., et al., "Layered Tabu Search Algorithm for Large-MIMO Detection and a Lower Bound on ML Performance", IEEE Trans. Commun, 2010, 5 pages.
Srinidhi N., et al., "Layered Tabu Search Algorithm for Large-MIMO Detection and a Lower Bound on ML Performance", IEEE Trans. Commun, vol. 59, No. 11, pp. 2955-2963, Nov. 2011.
Stancil D.D., et al., "Doubling wireless channel capacity using co-polarised, co-located electric and magnetic dipoles", Electronics Letters, 2002, vol. 38 (14), pp. 746-747.
Stanford Tech Report CTSR Feb. 2005, "Light Field Photography with a Hand-held Plenoptic Camera," 11 pages.
Stanley M., "Mobile Data Wave: Who Dares to Invest, Wins," Jun. 13, 2012, 23 pages.
Sternad M., et al., "Channel Estimation and Prediction for Adaptive OFDM Downlinks [Vehicular Applications]," in Proceeding IEEE Vehicular Technology Conference, vol. 2, Oct. 2003, pp. 1283-1287.
Stoytchev M., et al., "Compact antenna arrays for MIMO applications," IEEE Proc. IEEE Antennas and Prop. Symp., 2001, vol. 3, pp. 708-711.
Strangways H.J., "Investigation of signal correlation for spaced and co-located antennas on multipath HF links and implications for the design of SIMO and MIMO system," IEEE First European Conf. on Antennas and Propagation (EuCAP 2006), Nov. 2006, pp. 1-6.
Strohmer T., "Application of Time-Reversal with MMSE Equalizer to UWB Communication," Proc. of IEEE Globecom, 2004, vol. 5, pp. 3123-3127.
Studer C., et al., "PAR-Aware Large-Scale Multi-User MIMO-OFDM Downlink", IEEE J. Sel. Areas Commun., Sep. 4, 2012, vol. 31 (2), pp. 303-313.
Sulonen K., et al. "Comparison of MIMO Antenna Configurations in Picocell and Microcell Environments," IEEE Journal on Selected Areas in Communications, 2003, vol. 21 (5), pp. 703-712.
Supplementary European Search Report for Application No. EP05733294 dated Apr. 5, 2012, 4 pages.
Supplementary Partial European Search Report for Application No. EP11838640.8, dated Mar. 2, 2017, 13 pages.
Supplementary Partial European Search Report for Application No. EP14770916, dated Oct. 21, 2016, 6 pages.
Suraweera H.A., et al., Multi-Pair Amplify-and-Forward Relaying with Very Large Antenna Arrays, Proceedings in IEEE International Conference on Communications (ICC), Budapest, Hungary, Jun. 2013, 7 pages.

(56) References Cited

OTHER PUBLICATIONS

Suthisopapan P., et al., "Near Capacity Approaching Capacity of Large MIMO Systems by Non-Binary LDPC Codes and MMSE Detection", in Proc. of the IEEE International Symposium on Information Theory, Mar. 2012, 7 pages.
Suzuki H., et al., Highly Spectrally Efficient Ngara Rural Wireless Broadband Access Demonstrator, Proceedings in IEEE International Symposium on Communications and Information Technologies (ISCIT), Oct. 2012, 6 pages.
Suzuki H., et al., Large-scale multiple antenna fixed wireless systems for rural areas, Proceedings in IEEE PIMRC, Sep. 2012, 6 pages.
Svac P., et al., Soft-Heuristic Detectors for Large MIMO Systems, IEEE Trans. Signal Processing, 2013, vol. 61 (18), pp. 4573-4586.
Svantesson T., et al., "Analysis of Electromagnetic Field Polarizations in Multiantenna Systems", IEEE Transactions on Wireless Communications, vol. 3 (2), Mar. 2004, pp. 641-646.
Svantesson T., et al., "On Capacity and Correlation of Multi-Antenna Systems Employing Multiple Polarizations," IEEE Antennas and Propagation Society, 2002, vol. 3, pp. 202-205.
Takeuchi K., et al. "On an Achievable Rate of Large Rayleigh Block-Fading MIMO Channels with No CSI," IEEE Transactions on Information Theory, 2011, 47 pages.
Taluja P S., et al., Diversity Limits of Compact Broadband Multi-Antenna Systems, IEEE J. Sel. Areas Communication, 2013, vol. 31 (2), pp. 326-337.
Tanaka T., et al., "Power Supply System of Electric Automobile Electric Automobile used for its System and the Same Power Supply Device," Patent Abstract, 2005, 1 page.
Tang T., et al., "Joint frequency offset estimation and interference cancellation for MIMO-OFDM systems [mobile radio]," 2004 IEEE 60th Vehicular Technology Conference, VTC2004-Fal, 2004, vol. 3, pp. 1553-1557.
Tanumay Datta., et al., "A Novel Monte-Carlo-Sampling-Based Receiver for Large-Scale Uplink Multiuser MIMO Systems," IEEE Transactions on Vehicular Technology, 2013, vol. 62(7), pp. 3019-3038.
Taricco G., et al., "Asymptotic Mutual Information Statistics of Separately-Correlated Rician Fading MIMO Channels," IEEE Trans. Inform. Theory, Aug. 2008, vol. 54 (8), pp. 3490-3504.
Tarighat A., et al., "Compensation schemes and performance analysis of IQ imbalances in OFDM receivers," IEEE Signal Processing, Transactions on [see also Acoustics, Speech, and Signal Processing, IEEE Transactions on], 2005, vol. 53, pp. 3257-3268.
Tarighat, et al., "MIMO OFDM receivers for systems with IQ imbalances," IEEE Trans. Sig. Pro, for orthogonal space-time block codes (OSTBC), 2005, vol. 53, pp. 3583-3596.
Tarokh V., et al., "Space-time block codes from orthogonal designs," IEEE Trans. Info, 1999, vol. 45, pp. 1456-1467.
Tarokh V., et al., "Space-Time Codes for High Data Rate Wireless Communication: Performance Criterion and Code Construction," IEEE Transactions on Information Theory, 1998, vol. 44, pp. 744-765.
Teletar I.E., "Capacity of Multi-antenna Gaussian Channels", European Transactions on Telecommunications, vol. 10, Nov. 1999, pp. 1-28.
Tesla's Experiments With Electric Cars, Teslas FAQ No. 15, Interesting Facts About Nik, Twenty First Century Books, Could you write something about Tesla's experiments with electric cars?, downloaded from http://www.tfcbooks.com/teslafaq/q&a_015.htm on Apr. 17, 2006, 1 page.
Teukolsky S.A., Numerical Recipes in C: The Art of Scientific Computing, Cambridge University Press, 1992, 949 pages.
The White House, "Presidential Memorandum: Unleashing the Wireless Broadband Revolution", [retrieved on Jun. 28, 2010] Retrieved from the Internet: URL: http://www.whitehouse.gov/the-press-office/presidential-memorandum-unleashing-wireless-broadband-revolution.
Third Office Action from counterpart Mexican Patent Application No. MXa/2014/013795 dated Jul. 27, 2016, 6 pages.

Third Office Action from foreign counterpart China Patent Application No. 201280044869.5, dated Aug. 31, 2017, 15 pages.
Tomlinson M., "New Automatic Equaliser Employing Modulo Arithmetic," Electronics Letters, 1971, vol. 7 (5/6), pp. 138-139.
Toyota Special Reports, Toyota FCHV- The First Step Toward the Hydrogen Society of Tomorrow, "Accelerating Towards a Hydrogen Society through Fuel Cell Vehicles", 2003, pp. 1-8.
Tran L.N., et al. "A Conic Quadratic Programming Approach to Physical Layer Multicasting for Large-Scale Antenna Arrays," IEEE Signal Processing Letters, 2014, vol. 21 (1), pp. 114-117.
Truong K.T., et al. "Effects of Channel Aging in Massive MIMO Systems," Journal of Communications and Networks, Special Issue on Massive MIMO, 2013, vol. 15 (4), pp. 338-351.
Truong K.T., et al., "The Viability of Distributed Antennas for Massive MIMO Systems," Proceedings of the Asilomar Conference on Signals, Systems, and Computers, Pacific Grove, CA, Nov. 3-6, 2013, pp. 1318-1323.
Tsakalaki E. P., et al., On the Beamforming Performance of Large-Scale Antenna Arrays , Proc. Loughborough Antennas and Propagation Conference (LAPC), Nov. 12-13, 2012, 4 pages.
Tse D et al., "Diversity-multiplexing tradeoff in multiple-access channels", IEEE Trans. Info. Th., 2004, vol. 50 (9), pp. 1859-1874.
Tse et al., "Performance Tradeoffs between Maximum Ratio Transmission and Switched-Transmit Diversity", in Proc. 11.sup.th IEEE International Symposium on Personal, Indoor and Mobile Radio Communication, vol. 2, Sep. 2000, pp. 1485-1489.
Tureli U., et al., "OFDM blind carrier offset estimation: ESPRIT," IEEE Trans. Commun, 2000, vol. 48 (9), pp. 1459-1461.
Tyler N., et al., "Adaptive antennas: the Calibration Problem", IEEE Comm. Mag., pp. 114-122, Dec. 2004.
Ubuquiti, "airFiber", downloaded from http://www.ubnt.com/airfiber on Sep. 4, 2015, 10 pages.
Ubuquiti, "airMAX", [online], Retrieved from the Internet: http:www.ubnt.comairmax, 2015, 10 pages.
Uthansakul P., et al., MIMO antenna selection using CSI from reciprocal channel, Int. Journal of Elect. and Info. Eng., 2010, vol. 4 (10), pp. 482-491.
Valkama M., et al., "Advanced methods for I/Q imbalance compensation in communication receivers," IEEE Transactions on Signal Processing, vol. 49, No. 10, 2001, pp. 2335-2344.
Vallet P., et al., Improved Subspace Estimation for Multivariate Observations of High Dimension: The Deterministic Signals Case, IEEE Trans. Inform. Theory, Feb. 2012, vol. 58 (2), pp. 1043-1068.
Van B.D. et al.,"Beamforming: A Versatile Approach to Spatial Filtering," IEEE ASSP Magazine, 1988, pp. 4-24.
Van De Beek J., et al., "ML estimation of time and frequency offset in OFDM systems," IEEE Transactions, Signal Processing, 1997, vol. 45 (7), pp. 1800-1805.
Vance, "Steve Perlman's wireless fix", BusinessWeek, Jul. 2011, 10 pages [online], retrieved from the Internet: URL:http://www.businessweek.com/magazine/the-edison-of-silicon-valley-07272011.html.
Vaughan R.G., "On Optimum Combining at the Mobile," IEEE Transactions on Vehicular Technology, Nov. 1988, vol. 37(4), pp. 181-188.
Vaughn R., et al., "Switched parasitic elements for antenna diversity," IEEE Transactions on Antennas and Propagation, 1999, vol. 47, pp. 399-405.
Venkatesan et al., "Network MIMO: Overcoming InterCell Interference in Indoor Wireless Systems," Asilomar Conference on Signals, 2007, vol. 2007, pp. 83-87.
Venkatesan S., et al., "A WiMAX-Based Implementation of Network MIMO for Indoor Wireless Systems," EURASIP Journal on Advances in Signal Processing, 2009, vol. 2009, 11 pages.
Vieira J., et al., "A flexible 100-antenna testbed for Massive MIMO," in Proc IEEE Globecom 2014 Workshop—Massive MIMO: From Theory to Practice, Austin, Texas, USA, Dec. 2014, pp. 287-293.
Vishwanath S., "Duality, Achievable Rates, and Sum-Rate Capacity of Gaussian MIMO Broadcast Channels," IEEE Trans. Info. Th, 2003, vol. 49 (10), pp. 2658-2668.

(56) References Cited

OTHER PUBLICATIONS

Visotsky E., et al., "Space-Time Transmit Precoding with Imperfect Feedback," IEEE Transactions on Information Theory, 2001, vol. 47, pp. 2632-2639.
Visuri et al "Colocated Antenna Arrays: Design Desiderata for Wireless Communications," 2002, vol. 2002, pp. 580-584.
Viswanath P., et al., "Opportunistic beamforming using dump antennas," IEEE Transactions on Information Theory, 2002, vol. 48, pp. 1277-1294.
Viswanath, "Sum Capacity of the Vector Gaussian Broadcast Channel and Uplink-Downlink Duality," IEEE Transactions on Information Theory, 2003, vol. 49 (8), pp. 1912-1921.
Vivato—Homepage, http://www.vivato.net/, printed Apr. 9, 2004, 1 page.
Wagner et al., "Large System Analysis of Linear Precoding in MISO Broadcast Channels with Limited Feedback," IEEE Transactions on Information Theory, 2012, vol. 58(7), pp. 4509-4537.
Waldschmidt C., et al., "Compact MIMO-arrays based on polarisation-diversity", Proc. IEEE Antennas and Prop. Symp., 2003, vol. 2, pp. 499-502.
Waldschmidt C., et al., "Complete RF system model for analysis of compact MIMO arrays," IEEE Trans. on Vehicular Technologies, 2004, vol. 53, pp. 579-586.
Wallace J W., et al., "Termination-dependent diversity performance of coupled antennas: Network theory analysis," IEEE Transactions on Antennas and Propagation, 2004, vol. 52, pp. 98-105.
Wallace J.W., et al., "Statistical Characteristics of Measured MIMO Wireless Channel Data and Comparison to Conventional Models," Proceedings IEEE Vehicular Technology Conference, Oct. 2001, vol. 2 (7-11), pp. 1078-1082.
Wampfler, Inc., Home page, Wampfler, Inc., KY, USA—Wampfler Group, 1 page, printed on Apr. 17, 2006, http://www.wampfler.us/.
Wang Z., et al., "Enhanced downlink MU-Comp schemes for TD-LTE-Advanced," Wireless Communications and Networking Conference (WCNC), IEEE, 2010, 6 pages.
Wang Z., Performance of uplink multiuser massive MIMO system, International Conference on Acoustics Speech, and Signal Processing, Florence, Italy, 2014, 5 pages.
Wannstrom J., "Carrier Aggregation Explained," 3GPP, Jun. 2013, 6 pages, Retrieved from the Internet: URL: http://www.3gpp.org/Carrier-Aggregation-explained.
Warrington et al., "Measurement and Modeling of HF Channel Directional Spread Characteristics for Northerly Path," Radio Science, RS2006, 2006, vol. 41, pp. 1-13.
Watrous, et al., "Zero-Knowledge against Quantum Attacks," SIAM Journal on Scientific Computing, 2009, vol. 2009, pp. 25-58.
Webpass, Buildings online, printed on Sep. 4, 2015, Retrieved from the Internet: http://www.webpass.net/buildings?city=san+francisco&column=address&order=asc, 3 pages.
Weedon W.H., et al., "MEMS—switched reconfigurable antennas", IEEE Antennas and Propagation Society, AP-S International Symposium (Digest), vol. 3, 2001, pp. 654-657.
Well-to-Wheels Analysis of Advanced Fuel/Vehicle Systems—A North American Study of Energy Use, Greenhouse Gas Emission, and Criteria Pollutant Emissions, May 2005, 238 pages.
Wen C K., et al., "Asymptotic Mutual Information for Rician MIMO-MA Channels with Arbitrary Inputs: A Replica Analysis", IEEE Trans. Commun., 2010, vol. 58 (10), pp. 2782-2788.
Wen C K., et al., "On the Sum-Rate of Multiuser MIMO Uplink Channels with Jointly-Correlated Rician fading", IEEE Trans. Commun., 2011, vol. 59 (10), pp. 2883-2895.
Wenger J., et al., "The Intelligent Highway: A Smart Idea?", Strategy+Business, Booz & Co., Feb. 26, 2008, http://www.strategy-business.com/media/file/leading.ideas-20080226.pdf, pp. 5 total.
Wennestrom et al., "An Antenna Solution for MIMO Channels: The Switched Parasitic Antenna", IEEE International Symposium on Personal, Indoor and Mobile Radio Communications, PIMRC, vol. 1, 2001, pp. 159-163.
Wheeler H A., et al., "Small antennas," IEEE Transactions on Antennas and Propagation, 1975, vol. AP-23 (4), pp. 462-469.

Wi-Fi alliance, homepage, pp. 1-3, printed on Aug. 14, 2014, Retrieved from the Internet: URL: www.wi-fi.org.
Wi-Fi alliance, "Wi-Fi certified makes it Wi-Fi: What Retailers and Consumers Need to Know" pp. 1-8, Sep. 2009, Retrieved from the Internet: URL: http://www.wi-fi.org/files/WFA_Certification_Overview_WP_en.pdf.
Wikipedia, 2014, 6 pages [online]. "IS-95" Retrieved from the Internet: URL: http:en.wikipedia.orgwikiIS-95.
Wikipedia, Advanced Mobile Phone System. 2014, 6 pages [online]. Retrieved from the Internet: URL: https://en.wikipedia.org/wiki/AdvancedMobilePhoneSystem.
Wikipedia, "List of ad hoc routing protocols", printed on Mar. 8, 2011, 1 page, http://en.wikipedia.org/wiki/List_of_ad-hoc_routing_protocols.
Wikipedia, "Mobile ad hoc network," 2011, pp. 1-3, https://en.wikipedia.org/wiki/Mobile_ad_hoc_network.
WiMAX forum, 1 page, Aug. 14, 2014 http://www.wimaxforum.org/.
Wired, Has OnLive's Steve Perlman Discovered Holy Grail of Wireless?, Jun. 30, 2011 Retrieved from the Internet: http:www.wired.comepicenter201106per1man-holy-grail-wireless.
Wong I., et al., "Long Range Channel Prediction for Adaptive OFDM Systems," Proceedings IEEE Asilomar Conf. on Signals, Systems, and Computers, vol. 1,pp. 723-736, Pacific Grove, CA, USA, Nov. 7-10, 2004.
Wong I.C., et al., "Exploiting Spatia-Temporal Correlations in MIMO Wireless Channel Prediction," Dec. 2006, IEEE GLOBECOM Conference, 5 pages.
Wong, I.C., et al., "Joint Channel Estimation and Prediction for OFDM Systems," Proceedings in IEEE Global Telecommunications Conference, St. Louis, MO, 2005, pp. 2255-2259.
Wong K., et al., "A Joint-Channel Diagonalization for Multiuser MIMO Antenna Systems," IEEE Transactions on Wireless Communications, 2003, vol. 2 (4), pp. 773-786.
Wong, "Performance Enhancement of Multiuser MIMO Wireless Communication Systems," IEEE Transactions on Communications, 2002, vol. 50 (12), pp. 1960-1970.
Written Opinion for Application No. PCT/US06/14854, dated May 8, 2008, 3 pages.
Wu M., et al., "Approximate Matrix Inversion for High-Throughput Data Detection in the Large-scale MIMO Uplink," IEEE International Symposium on Circuits and Systems (ISCAS), May 2013, pp. 2155-2158.
Xiao L., et al., "A Comparative Study of MIMO Capacity with Different Antenna Topologies," IEEE ICCS'02, vol. 1, Nov. 2002, pp. 431-435.
Xu J., "LTE-Advanced Signal Generation and Measurements using SystemVue," Agilent Technologies, Dec. 23, 2010, 46 pages.
Yang W., et al., "On the Capacity of Large-MIMO Block-Fading Channels," IEEE Journal on Selected Areas in Communications, Sep. 30, 2012, vol. 31(2), pp. 1-16.
Yin B., et al., "Full-Duplex in Large-Scale Wireless System," Proceeding of the Asilomar Conference on Signals, Systems and Computers, 2013, 5 pages.
Yin B., et al., "Implementation trade-offs for linear detection in large-scale MIMO systems," Proceeding Institute of Electrical and Electronics Engineers International Conference on Acoustics Speech, and Signal Processing, 2013, 5 pages.
Yin H., et al., A Coordinated Approach to Channel Estimation in Large-scale Multiple-antenna Systems, IEEE Journal on Selected Areas in Communications, Sep. 2, 2012, vol. 31 (2), pp. 1-10.
Yoo, et al., "Multi-antenna broadcast channels with limited feedback and user selection," Draft Version, 36 pages, dated Jun. 8, 2006 of IEEE Journal on Sel. Areas in Communications, vol. 25, pp. 1478-91, Jul. 2007.
Yoo, "Multi-Antenna Downlink Channels with Limited Feedback and User Selection," IEEE Journal on Selected Areas in Communications, Sep. 2007, vol. 25 (7), pp. 1478-1491.
Yu, "Sum Capacity of Gaussian Vector Broadcast Channels," IEEE Transactions on Information Theory, 2004, vol. 50 (9), pp. 1875-1892.
Yu W., et al., "Trellis Precoding for the Broadcast Channel," IEEE GLOBECOM, 2001, vol. 2, pp. 1344-1348.

(56) References Cited

OTHER PUBLICATIONS

Zaidel B., et al., "Vector Precoding for Gaussian MIMO Broadcast Channels: Impact of Replica Symmetry Breaking", Institute of Electrical and Electronics Engineers Transactions on Information Theory, Mar. 2012, vol. 58 (3), pp. 1413-1440.
Zakhour R., et al., "Min-Max Fair Coordinated Beamforming via Large Systems Analysis,", in Proc. of the IEEE International Symposium on Information Theory, St. Petersburg, Jul. 2011.
Zamir R ., et al., "Capacity and lattice-strategies for cancelling known interference," Proceedings of International Symposium on Information Theory, Honolulu, Hawaii, Nov. 2000, pp. 1-32.
Zetterberg P., "Experimental Investigation of TDD Reciprocity based Zero-Forcing Transmit Precoding", EURASIP, Jun. 2010.
Zhang, "Coordinated Multi-Cell MIMO Systems with Cellular Block Diagonalization," IEEE, 2007, pp. 1669-1673.
Zhang H., et al., Cochannel Interference Mitigation and Cooperative Processing in Downlink Multicell Multiuser MIMO Networks, EURASIP Journal on Wireless Communications and Networking, vol. 2004 (2), 2004, pp. 222-235.
Zhang J., et al., "Hermitian Precoding for Distributed MIMO Systems with Individual Channel State Information," IEEE Journal on Selected Areas in Communications, 2013, vol. 31 (2), pp. 241-250.
Zhang J., et al. "On Capacity of Large-Scale MIMO Multiple Access Channels with Distributed Sets of Correlated Antennas," IEEE Journal on Selected Areas in Communications, Sep. 26, 2012, vol. 31 (2), pp. 1-52.
Zhang, "Networked MIMO with Clustered Linear," IEEE Transactions on Wireless Communications, 2009, vol. 8 (4), pp. 1910-1921.
Zhang R., et al. Electromagnetic Lens-focusing Antenna Enabled Massive MIMO, Jun. 6, 2013, pp. 1-7.
Zheng L., et al., "Diversity and multiplexing: a fundamental tradeoff in multiple antenna channels," IEEE Trans. Info. Th., 2003, vol. 49 (5), pp. 1073-1096.
Zhou Q., et al., "An Improved LR-aided K-Best Algorithm for MIMO Detection," in Proc. IEEE International Conference on Wireless Communications and Signal Processing (WCSP), Oct. 2012, 5 pages.
Zhuang X., et al., "Channel models for link and system level simulations," IEEE 802.16 Broadband Wireless Access Working Group, 2004, 15 pages.
Zogg, "Multipath Delay Spread in a Hilly Region at 210 MHz," IEEE Transactions on Vehicular Technology, 1987, vol. VT-36 (4), pp. 184-187.
Zou R., et al., "Li Reducing the Complexity of Quasi-Maximum—Likelihood Detectors Through Companding for Coded MIMO Systems," IEEE Transactions on Vehicular Technology, Mar. 2012, vol. 2012, pp. 1109-1123.
Zyren J., "Overview on the 3GPP Long Term Evolution Physical Layer," Freescale White Paper, Jul. 2007, 27 pages.
Busboom A., "Arrays and Rekonstruktions—algortihmen fur bildgebende System emit codierter Apertur," Relevant Chapters 1-5, 1999, pp. 128, Translation Included: Busboom, A., "Arrays and reconstruction algorithms for coded aperture imaging systems", vol. 10, No. 572, Translated Chapters, Ch.1-5, pp. 36.
Communication pursuant to Article 94(3) EPC for European Application No. 06718208.9, dated May 10, 2017, 4 pages.
Dicke R.H., "Scatter-Hole Cameras for X-Rays and Gamma Rays," Astrophysical Journal, 1968, vol. 153, pp. L101-L106.
Extended European Search Report from European Patent Application No. 06718208.9, dated Jan. 22, 2015, 6 pages.
Fenimore E.E., "Coded Aperture Imaging: Predicted Performance of Uniformly Redundant Arrays," Applied Optics, 1978, vol. 17 (22), pp. 3562-3570.
Fenimore E.E., et al., "Coded Aperture Imaging: The Modulation Transfer Function for Uniformly Redundant Arrays," Applied Optics, 1980, vol. 19(14), pp. 2465-2471.
Fenimore E.E., et al., "Coded Aperture Imaging with Uniformly Redundant Arrays," Applied Optics, 1978, vol. 17(3), pp. 337-347.
Fenimore E.E., et al., "Comparison of Fresnel Zone Plates and Uniformly Redundant Arrays," SPIE, Applications of Digital Image Processing, 1978, vol. 149, pp. 232-236.
Fenimore E.E., et al., "Fast Delta Hadamard Transform," Applied Optics, 1981, vol. 20(17), pp. 3058-3067.
Fenimore E.E., et al., "Tomographical Imaging Using Uniformly Redundant Arrays," Applied Optics, 1979, vol. 18(7), pp. 1052-1057.
Fenimore E.E., et al., "Uniformly Redundant Array Imaging of Laser Driven Compressions: Preliminary Results," Applied Optics, 1979, vol. 18(7), pp. 945-947.
Fenimore E.E., et al., "Uniformly Redundant Arrays: Digital Reconstruction Methods," Applied Optics, 1981, vol. 20(10), pp. 1858-1864.
Fenimore E.E., et al., "Uniformly Redundant Arrays," Digital Signal Processing Symposium, 1977, pp. 1-14.
Fenimore E.E., "Large Symmetric π Transformations for Hadamard Transforms," Applied Optics, 1983, vol. 22(6), pp. 826-829.
Fenimore E.E., "Time-Resolved and Energy-Resolved Coded Aperture Images with URA Tagging," Applied Optics, 1987, vol. 26 (14), pp. 2760-2769.
Fenimore E.E., "X-Ray Imaging Using Uniformly Redundant Arrays," 1979, pp. 1-4.
Final Office Action from U.S. Appl. No. 11/039,029, dated Dec. 15, 2006, 10 pages.
Final Office Action from U.S. Appl. No. 11/039,029, dated Mar. 3, 2009, 9 pages.
Final Office Action from U.S. Appl. No. 11/039,029, dated Nov. 6, 2007, 11 pages.
Final Office Action from U.S. Appl. No. 11/039,029, dated Nov. 6, 2008, 7 pages.
Final Office Action from U.S. Appl. No. 11/210,098, dated Aug. 21, 2008, 10 pages.
Final Office Action from U.S. Appl. No. 11/210,098, dated Jan. 13, 2009, 7 pages.
Final Office Action from U.S. Appl. No. 11/210,098, dated Jan. 29, 2007, 9 pages.
Final Office Action from U.S. Appl. No. 11/210,098, dated Mar. 31, 2008, 8 pages.
Final Office Action from U.S. Appl. No. 11/899,814, dated Jul. 29, 2008, 8 pages.
Final Office Action from U.S. Appl. No. 11/899,814, dated Mar. 3, 2009, 8 pages.
Final Office Action from U.S. Appl. No. 13/652,259, dated Aug. 4, 2016, 7 pages.
Final Office Action from U.S. Appl. No. 13/652,259 dated Oct. 28, 2014, 9 pages.
Final Office Action from U.S. Appl. No. 13/652,259 dated Sep. 23, 2015, 6 pages.
Gottesman S., et al., "New Family of Binary Arrays for Coded Aperture imaging," Applied Optics, 1989, vol. 28(20), pp. 4344-4392.
Gunson J., et al., "Optimum Design of a Coded Mask X-Ray Telescope for Rocket Applications," Monthly Notices of the Royal Astronomical Society, 1976, vol. 177, pp. 485-497.
Hendriks B., et al., "Through a Lens Sharply," IEEE Spectrum, Dec. 2004, pp. 32-36.
International Preliminary Report on Patentability and Written Opinion for Application No. PCT/US2014/025109, dated Oct. 1, 2015, 5 pages.
International Preliminary Report on Patentability for PCT Application No. PCT/US06/01111, dated Jul. 24, 2007, 8 pages.
International Search Report and Written opinion for Application No. PCT/US06/01111, dated Aug. 3, 2006, 13 pages.
International Search Report from International Application No. PCT/US2000/019613, dated Nov. 14, 2000, 1 page.
Lytro User Manual, 2012, 25 pages, www.lytro.com.
Lytro, "What are the specs on the First Generation Lytro Light Field Camera?," Lytro Support, Jan. 27, 2016, 2 pages.
Ng R., et al., "Light Field Photography with a Hand-held Plenoptic Camera," Stanford Tech Report CTSR Feb. 2005, Apr. 2005, 11 pages.

(56) References Cited

OTHER PUBLICATIONS

Non-Final Office Action from U.S. Appl. No. 11/039,029, dated Apr. 12, 2007, 5 pages.
Non-Final Office Action from U.S. Appl. No. 11/039,029, dated Aug. 14, 2009, 13 pages.
Non-Final Office Action from U.S. Appl. No. 11/039,029, dated Jun. 27, 2006, 9 pages.
Non-Final Office Action from U.S. Appl. No. 11/039,029, dated Mar. 17, 2008, 9 pages.
Non-Final Office Action from U.S. Appl. No. 11/210,098, dated Jun. 22, 2006, 8 pages.
Non-Final Office Action from U.S. Appl. No. 11/210,098, dated Sep. 26, 2007, 8 pages.
Non-Final Office Action from U.S. Appl. No. 11/899,814, dated Aug. 17, 2009, 10 pages.
Non-Final Office Action from U.S. Appl. No. 11/899,814, dated Mar. 7, 2008, 13 pages.
Non-Final Office Action from U.S. Appl. No. 12/691,500, dated Aug. 23, 2010, 9 pages.
Non-Final Office Action from U.S. Appl. No. 13/226,461, dated Dec. 27, 2011, 10 pages.
Non-Final Office Action from U.S. Appl. No. 13/652,259, dated Apr. 10, 2014, 13 pages.
Non-Final Office Action from U.S. Appl. No. 13/652,259 dated Feb. 18, 2016, 8 pages.
Non-Final Office Action from U.S. Appl. No. 13/652,259, dated Mar. 31, 2017, 7 pages.
Non-Final Office Action from U.S. Appl. No. 13/652,259 dated May 14, 2015, 9 pages.
Notice of Allowance from U.S. Appl. No. 11/039,029, dated Mar. 24, 2010, 5 pages.
Notice of Allowance from U.S. Appl. No. 11/210,098, dated Oct. 21, 2009, 8 pages.
Notice of Allowance from U.S. Appl. No. 11/210,098, dated Oct. 21, 2009, 7 pages.
Notice of Allowance from U.S. Appl. No. 11/899,814, dated Mar. 23, 2010, 5 pages.
Notice of Allowance from U.S. Appl. No. 12/691,500, dated Apr. 29, 2011, 7 pages.
Notice of Allowance from U.S. Appl. No. 12/691,500, dated Dec. 27, 2010, 5 pages.
Notice of Allowance from U.S. Appl. No. 13/226,461, dated Jun. 12, 2012, 7 pages.
Notice to File a Response from foreign counterpart Korea Patent Application No. 10-2007-7028402, dated Jul. 31, 2012, 13 pages.
Notification of Reason for Rejection for counterpart Japan Patent Application No. 2007552179, dated Oct. 28, 2010, 2 pages.
NuCORE Technology, "CleanCapture NDX-1260 Analog Image Processor," 2004, 12 pages.
Paul Carlisle "Coded Aperture Imaging," 1998, pp. 1-6, printed on Mar. 15, 2007 Internet: http://paulcarlisle.net/old/codedaperature.html.
Renner E., "Pinhole Photography," 2000, pp. 1-5.
Restriction Requirement for U.S. Appl. No. 11/039,029 dated Apr. 12, 2006, 5 pages.

* cited by examiner

APPARATUS AND METHOD FOR CAPTURING STILL IMAGES AND VIDEO USING DIFFRACTION CODED IMAGING TECHNIQUES

INCORPORATION BY REFERENCE

This application incorporates by reference the following U.S. Patents, Patent Applications and Provisional Applications, all assigned to the assignee of this application: U.S. patent application Ser. No. 13/652,259 entitled, "Apparatus And Method For Capturing Still Images And Video Using Coded Lens Imaging Techniques"; U.S. patent application Ser. No. 13/226,461 entitled, "Apparatus And Method For Capturing Still Images And Video Using Coded Lens Imaging Techniques", now U.S. Pat. No. 8,228,704; U.S. patent application Ser. No. 12/691,500 entitled, "Apparatus And Method For Capturing Still Images And Video Using Coded Lens Imaging Techniques", now U.S. Pat. No. 8,013,285, filed Jan. 21, 2010; U.S. patent application Ser. No. 11/210,098 entitled "Apparatus And Method For Capturing Still Images And Video Using Coded Lens Imaging Technique" filed on Aug. 22, 2005, now U.S. Pat. No. 7,671,321; U.S. patent application Ser. No. 11/039,029, entitled, "Apparatus And Method For Capturing Still Images And Video Using Coded Aperture Techniques" filed on Jan. 18, 2005, now U.S. Pat. No. 7,767,949; and U.S. Provisional Application No. 60/701,435 entitled, "Apparatus And Method For Capturing Still Images And Video Using Coded Lens Imaging Techniques", filed on Jul. 20, 2005.

BACKGROUND OF THE INVENTION

Field of the Invention

This invention relates generally to the field of image capture and image processing. More particularly, the invention relates to an apparatus and method for capturing still images and video using coded lens techniques.

Description of the Related Art

Photographic imaging is commonly done by focusing the light coming from a scene using a single glass lens which is placed in front of a light sensitive detector such as a photographic film or a semiconductor sensor including CCD and CMOS sensors.

For imaging high-energy radiation such as x-ray or gamma rays, other techniques must be used because such radiation cannot be diffracted using glass lenses. A number of techniques have been proposed including single pinhole cameras and multi-hole collimator systems. A particularly beneficial technique is "coded aperture imaging" wherein a structured aperture, consisting of a suitably-chosen pattern of transparent and opaque elements, is placed in front of a detector sensitive to the radiation to be imaged. When the aperture pattern is suitably chosen, the imaged scene can be digitally reconstructed from the detector signal. Coded aperture imaging has the advantage of combining high spatial resolution with high light efficiency. Coded aperture imaging of x-ray and gamma ray radiation using structured arrays of rectangular or hexagonal elements is known from R. H. DICKE: SCATTER-HOLE CAMERA FOR X-RAYS AND GAMMA RAYS. ASTROHYS. J., 153:L101-L106, 1968 (hereinafter "Dicke"), and has been extensively applied in astronomical imaging and nuclear medicine.

A particularly useful class of coded imaging systems is known from E. E. FENIMORE AND T. M. CANNON: CODED APERTURE IMAGING WITH UNIFORMLY REDUNDANT ARRAYS. APPL. OPT., 17:337-347, 1978 (hereinafter "Fenimore"). In this class of systems, a basic aperture pattern is cyclically repeated such that the aperture pattern is a 2×2 mosaic of the basic pattern. The detector has at least the same size as the basic aperture pattern. In such a system, the "fully coded FOV" ("FOV" shall be used herein to refer to "field-of-view") is defined as the area within the FOV, within which a point source would cast a complete shadow of a cyclically shifted version of the basic aperture pattern onto the aperture. Likewise, the "partially coded FOV" is defined as the area within the FOV, within which a point source would only cast a partial shadow of the basic aperture pattern onto the aperture. According to Dicke, a collimator is placed in front of the detector which limits the FOV to the fully coded FOV, thus allowing an unambiguous reconstruction of the scene from the detector signal.

From J. GUNSON AND B. POLYCHRONOPULOS: OPTIMUM DESIGN OF A CODED MASK X-RAY TELESCOPE FOR ROCKET APPLICATIONS. MON. NOT. R. ASTRON. SOC., 177:485-497, 1976 (hereinafter "Gunson") it is further known to give the opaque elements of the aperture a finite thickness such that the aperture itself acts as a collimator and limits the FOV to the fully coded FOV. Such a "self-collimating aperture" allows the omission of a separate collimator in front of the detector.

It should be noted that besides limiting the FOV, a collimator has the undesired property of only transmitting light without attenuation which is exactly parallel to the optical axis. Any off-axis light passing through the collimator is attenuated, the attenuation increasing towards the limits of the FOV. At the limits of the FOV, the attenuation is 100%, i.e., no light can pass through the collimator at such angles. This effect will be denoted as "collimator attenuation" within this document. Both in the x-direction and in the y-direction, collimator attenuation is proportional to the tangent of the angle between the light and the optical axis.

After reconstructing an image from a sensor signal in a coded aperture imaging system, the effect of collimator attenuation may have to be reversed in order to obtain a photometrically correct image. This involves multiplying each individual pixel value with the inverse of the factor by which light coming from the direction which the pixel pertains to, has been attenuated. It should be noted that close to the limits of the FOV, the attenuation, especially the collimator attenuation, is very high, i.e. this factor approaches zero. Inverting the collimator attenuation in this case involves amplifying the pixel values with a very large factor, approaching infinity at the limits of the FOV. Since any noise in the reconstruction will also be amplified by this factor, pixels close to the limits of the FOV may be very noisy or even unusable.

In a coded aperture system according to Fenimore or Gunson, the basic aperture pattern can be characterized by means of an "aperture array" of zeros and ones wherein a one stands for a transparent and a zero stands for an opaque aperture element. Further, the scene within the FOV can be characterized as a two-dimensional array wherein each array element contains the light intensity emitted from a single pixel within the FOV. When the scene is at infinite distance from the aperture, it is known that the sensor signal can be characterized as the two-dimensional, periodic cross-correlation function between the FOV array and the aperture array. It should be noted that the sensor signal as such has no resemblance with the scene being imaged. However, a "reconstruction filter" can be designed by computing the two-dimensional periodic inverse filter pertaining to the aperture array. The two-dimensional periodic inverse filter is a two-dimensional array which is constructed in such a way that all sidelobes of the two-dimensional, periodic cross-correlation function of the aperture array and the inverse filter are zero. By computing the two-dimensional, periodic cross-correlation function of the sensor signal and the reconstruction filter, an image of the original scene can be reconstructed from the sensor signal.

It is known from Fenimore to use a so-called "Uniformly Redundant Arrays" (URAs) as aperture arrays. URAs have a two-dimensional, periodic cross-correlation function whose sidelobe values are all identical. URAs have an inverse filter which has the same structure as the URA itself, except for a constant offset and constant scaling factor. Such reconstruction filters are optimal in the sense that any noise in the sensor signal will be subject to the lowest possible amplification during the reconstruction filtering. However, URAs can be algebraically constructed only for very few sizes.

It is further known from S. R. GOTTESMAN AND E. E. FENIMORE: NEW FAMILY OF BINARY ARRAYS FOR CODED APERTURE IMAGING. APPL. OPT., 28:4344-4352, 1989 (hereinafter "Gottesman") to use a modified class of aperture arrays called "Modified Uniformly Redundant Arrays" (MURAs) which exist for all sizes p×p where p is an odd prime number. Hence, MURAs exist for many more sizes than URAs. Their correlation properties and noise amplification properties are near-optimal and almost as good as the properties of URAs. MURAs have the additional advantage that, with the exception of a single row and a single column, they can be represented as the product of two one-dimensional sequences, one being a function only of the column index and the other being a function only of the row index to the array. Likewise, with the exception of a single row and a single column, their inverse filter can also be represented as the product of two one-dimensional sequences. This property permits to replace the two-dimensional in-verse filtering by a sequence of two one-dimensional filtering operations, making the reconstruction process much more efficient to compute.

It is further known from A. BUSBOOM: ARRAYS UND REKONSTRUKTIONSALGORITHMEN FUER BILDGEBENDE SYSTEME MIT CODIERTER APERTUR. VDI VERLAG, DUESSELDORF, 1999, ISBN 3-18-357210-9 (hereinafter "Busboom") to use so-called "Perfect Binary Arrays" (PBAs) which exist for all sizes $3^s\ 2^r \times 3^s\ 2^r$ and all sizes $3^s\ 2^{r-1} \times 3^s\ 2^{r+1}$ where s=0, 1, 2 . . . and r=1, 2, 3 . . . . Hence, PBAs also exist for many sizes, especially for many square sizes with an even number of columns and rows. Their correlation properties and noise amplification properties are as good as those of URAs.

If the scene is at a finite distance from the aperture, a geometric magnification of the sensor image occurs. It should be noted that a point source in the scene would cast a shadow of the aperture pattern onto the sensor which is magnified by a factor of f=(o+a)/o compared to the actual aperture size where o is the distance between the scene and the aperture and a is the distance between the aperture and the sensor. Therefore, if the scene is at a finite distance, the sensor image needs to be filtered with an accordingly magnified version of the reconstruction filter.

If the scene is very close to the aperture, so-called near-field effects occur. The "near field" is defined as those ranges which are less than 10 times the sensor size, aperture size or distance between aperture and sensor, whichever of these quantities is the largest. If an object is in the near field, the sensor image can no longer be described as the two-dimensional cross-correlation between the scene and the aperture array. This causes artifacts when attempting to reconstructing the scene using inverse filtering. In Lanza, et al., U.S. Pat. No. 6,737,652, methods for reducing such near-field artifacts are disclosed. These methods involve imaging the scene using two separate coded apertures where the second aperture array is the inverse of the first aperture array (i.e. transparent elements are replaced by opaque elements and vice versa). The reconstruction is then computed from two sensor signals acquired with the two different apertures in such a manner that near-field artifacts are reduced in the process of combining the two sensor images.

Coded aperture imaging to date has been limited to industrial, medical, and scientific applications, primarily with x-ray or gamma-ray radiation, and systems that have been developed to date are each designed to work within a specific, constrained environment. For one, existing coded aperture imaging systems are each designed with a specific view depth (e.g. effectively at infinity for astronomy, or a specific distance range for nuclear or x-ray imaging). Secondly, to date, coded aperture imaging has been used with either controlled radiation sources (e.g. in nuclear, x-ray, or industrial imaging), or astronomical radiation sources that are relatively stable and effectively at infinity. As a result, existing coded aperture systems have had the benefit of operating within constrained environments, quite unlike, for example, a typical photographic camera using a lens. A typical photographic camera using a single lens (i.e. a single lens per sensor or film frame; stereoscopic cameras have 2 lenses, but utilize a separate sensor or film frame per lens) is designed to simultaneously handle imaging of scenes containing 3-dimensional objects with varying distances from close distances to effective infinite distance; and is designed to image objects reflecting, diffusing, absorbing, refracting, or retro-reflecting multiple ambient radiation sources of unknown origin, angle, and vastly varying intensities. Other than the systems described in the patent applications listed in and incorporated by reference herein, no coded aperture system has ever been designed that can handle these types of unconstrained imaging environments that billions of photographic cameras with single lenses handle every day.

Photographic imaging in the optical spectrum using a single lens has a number of disadvantages and limitations. The main limitation of single lens photography is its finite depth-of-field (DOF), particularly at large aperture settings. Only scenes at a limited DOF can be in focus in a single lens image while any objects closer or farther away from the camera than the DOF will appear blurred in the image.

Further, a single lens camera must be manually or automatically focused before an image can be taken. This is a disadvantage when imaging objects which are moving fast or unexpectedly such as in sports photography or photography of children or animals, particularly at large apertures with a short DOF. In such situations, the images may be out of focus because there was not enough time to focus or because the object moved unexpectedly when acquiring the image. Single lens photography does not allow a photographer to retrospectively change the focus once an image has been acquired.

Still further, focusing a single lens camera involves adjusting the distance between one or more lenses and the sensor. This makes it necessary for a single lens camera to contain mechanically moving parts which makes it prone to mechanical failure. Various alternatives to glass lenses, such as liquid lenses (see, e.g., B. HENDRIKS & STEIN KUIPER: THROUGH A LENS SHARPLY. IEEE SPECTRUM, DECEMBER, 2004), have been proposed in an effort to mitigate the mechanical limitations of a glass lens, but despite the added design complexity and potential limitations (e.g., operating temperature range and aperture size) of such alternatives, they still suffer from the limitation of a limited focus range.

Still further, single lens cameras have a limited dynamic range as a result of their sensors (film or semiconductor sensors) having a limited dynamic range. This is a severe limitation when imaging scenes which contain both very bright areas and very dark areas. Typically, either the bright areas will appear overexposed while the dark areas have sufficient contrast, or the dark areas will appear underexposed while the bright areas have sufficient contrast. To address this issue, specialized semiconductor image sensors (e.g. the D1000 by Pixim, Inc. of Mountain View, Calif.) have been developed that allow each pixel of an image sensor to sampled each with a unique gain so as to accommodate different brightness regions in the image. But such image sensors are much more expensive than conventional CCD or CMOS image sensors, and as such are not cost-competitive for many applications, including mass-market general photography. Another approach to achieve higher dynamic range is for digital cameras to be configured to take successive images at varying gain, and then to post-process the image sequence to assemble a single image from parts of each successive image that are within the dynamic range of the sensor. A disadvantage with this approach is, if the scene or camera is in rapid motion, the successive images will be different and may not combine well to a uniform single image.

Because of the requirement to focus, single lenses can provide a rough estimate of the distance between the lens and a subject object. But since most photographic applications require lenses designed to have as long a range of concurrent focus as possible, using focus for a distance estimate is extremely imprecise. Since a single lens can only be focused to a single distance range at a time, at best, a lens will provide an estimate of the distance to a single object range at a given time.

Visible light photographic Coded Aperture Imaging (CAI) (as disclosed in U.S. Pat. No. 7,767,949 filed Jan. 18, 2005 entitled "Apparatus And Method For Capturing Still Images And Video Using Coded Aperture Techniques,"; hereinafter the "CAI Application" and the technology described as "CAI") addresses many of the limitations of a single lens camera. Relative to a single lens camera, CAI makes it possible to make a thinner camera, a lighter camera, a camera with greater dynamic range (even during fast motion), and also a camera which can reconstruct an image which is in focus throughout a large range of depth in the scene.

A visible light coded aperture camera according to one embodiment described in the CAI Application is illustrated in FIG. 1. The illustrated embodiment includes a coded aperture 101 placed in front of a light sensitive grayscale or color semiconductor sensor 104. The coded aperture 1012 is a pattern of circular, square, hexagonal, rectangular or other tiled elements, some of which are transparent to visible light (e.g. element 102) and some of which are opaque (e.g. element 103). Note that for illustration clarity purposes, coded aperture 101 has very few transparent elements. A typical coded aperture may have significantly more transparent elements (e.g., 50%). Visible light a from 2-dimensional or 3-dimensional scene 100 (which may be illuminated by ambient or artificial lighting) is projected through the coded aperture 101 onto image sensor 104. The camera is capable of limiting the FOV to the fully coded FOV projected onto the sensor. In one embodiment, this is implemented by the use of a self-collimating coded aperture 101 (utilizing baffles for collimation, as explained below). The space between the coded aperture and the sensor is shielded by a light-opaque housing 105 (only the outline of which is shown in FIG. 1), preventing any light from reaching the sensor other than by passing through an open element of the coded aperture.

The camera further includes an image sensor readout subsystem 110 with an interface 109 to the image sensor 104 (which may be similar to those used in prior coded aperture systems). The readout subsystem clocks out the analog image signal from the image sensor 104 and applies analog buffering, amplification and/or filtering as required by the particular image sensor. An example of such a readout subsystem 110 that also incorporates A/D 120 is the NDX-1260 CleanCapture Image Processor by NuCore Technology, Inc. of Sunnyvale, Calif. The ability to adjust the zero offset 112 and gain 111 to analog pixel values read by the readout subsystem 110 (e.g., using at least one operational amplifier (op amp)) will increase the dynamic range of the captured image, but is not essential if the image sensor has a sufficient dynamic range for the desired image quality without a zero-offset and gain adjustment.

In one embodiment, the output of the readout subsystem 110 is coupled by interface 113 to at least one analog-to-digital converter (A/D) 120 which digitizes the analog output. The output of the A/D is coupled via interface 121 to an image reconstruction processor 130, which in one embodiment incorporates a Digital Signal Processor (DSP) 132 and Random Access Memory (RAM) 131. The digitized image from the interface 121 is stored in RAM 131, and the DSP 132 post-processes the image so as to reconstruct the original scene 101 into a grayscale or color image. In accordance with another embodiment, the image reconstruction processor 130 incorporates a general purpose CPU such as an Intel Corporation Pentium 4®, or similar general purpose processor. In yet another embodiment, the image reconstruction processor 130 incorporates an Application-Specific Integrated Circuit ("ASIC") which implements part or all of the reconstruction processing in dedicated digital structures. This grayscale or color image reconstructed by reconstruction processor 130 is output through interface 133 to be displayed on a display device 140.

However, one limitation of CAI is the resolution of the reconstructed image. The resolution of a CAI camera is limited by the larger of two primary factors: (a) the order of the aperture array, and (b) distortion in the projected image caused by diffraction. This is explained further in the following paragraphs.

FIG. 4 shows several representative coded aperture array patterns of MURAs of "order" 101, 61 and 31 (described in more detail in the CAI application). FIG. 4 also shows coded aperture array patterns of PBAs of order 8 and 24. (The PBAs 8 and 24 are shown enlarged relative to the MURAs to better show their patterns.), Note that the coded aperture array patterns are formed from a square array (with horizontal and vertical dimensions of the specified order) that is repeated twice in the horizontal and twice in the vertical dimension. So, for example, the MURA 101 pattern has a total size of 202×202. Note also that each of the aperture elements in the arrays is of the same size. Although it appears that some of the apertures are larger than others, this is simply because adjacent apertures combine to create what appears to be a larger aperture. A CAI camera cannot resolve an image that is higher resolution than the order of its coded aperture array. For example, a MURA 101 CAI camera cannot resolve an image of higher resolution than 101×101 pixels.

For purposes of illustration, FIG. 5 shows one embodiment of the visible light coded aperture camera shown in FIG. 1. The embodiment shown in FIG. 5 is not useful for many applications because the resolution of the reconstructed image is only 3×3 pixels, but it is illustrative of how a camera such as that shown in FIG. 1 works. A MURA order 3 ("MURA 3") aperture array 301 contains 16 open apertures, such as open aperture 302, and 20 closed apertures, such as closed aperture 303. Color or grayscale sensor 304 is the same size as one quadrant (i.e. one 3×3 block of apertures) of the MURA 3 aperture array 301 and in this embodiment it is positioned centered relative to the MURA 3 aperture array 301.

Orthographic View 320 of FIG. 5 reveals more of the structure of the camera. Baffles (referred to as "collimators" in the CAI Application) 317 serve to collimate the light passing through open apertures, such as open aperture 302. This restricts the FOV of each aperture projection onto color or grayscale sensor 304. Closed apertures such as closed aperture 303 are covered with an opaque cover so they do not allow light to pass through. Sensor 304 is separated from MURA 3 aperture array 301 and baffles 317 to allow space for the overlapping projections from each of the open apertures. The entire unit is contained within a light-tight camera body 316, which is shown to be transparent for the purposes of illustration. Note that in this particular example, even if sensor 304 is a very high-resolution sensor, only a 3×3 pixel image can be reconstructed.

FIG. 7 shows a side view diagram of the camera in FIG. 5 that illustrates the upper and lower extent of the projection of the light passing through leftmost column of apertures of the MURA 3 of aperture illustration 300 and reaching light sensor 304 (light sensor 804 in FIG. 7). Diagrams 800a and 800b of FIG. 7 differ only in that the 800a shows the projection range 805 of light for a single aperture (for clarity) in dashed lines, whereas 800b shows the projection range of light for all of the open apertures. Light from the scene is projected through the open apertures, including open aperture 802, and is blocked from passing through closed apertures, including closed aperture 803. The FOV of the projection is restricted by baffles, such as 801. The projection through the open apertures projects across the focal length of the camera and some or all of the light from each open aperture projects onto the sensor 804. The projection 805, as an example, mostly projects onto the sensor, but partially projects over the top of the sensor, and as such, the sensor only detects the part of the projection that is projected onto the sensor. As can be seen in 800b, the projections from multiple open apertures overlap each other.

FIG. 6 illustrates how light is projected through the MURA 3 aperture array. Illustration 400 shows the MURA 3 aperture array 401 delineated by a solid black outline, with exemplary open aperture 402 and closed aperture 403. The position of color or grayscale sensor 404 is delineated by a dotted outline. Open aperture 405 is delineated by a dashed line. The light that passes through aperture 405 projects onto a square area on the sensor plane shown as a gray square 406. Note that because aperture array 401 is shown overlaying the projection in illustration 400, much of projection 406 is obstructed by closed apertures. Nonetheless, the perimeter of projection 406 can be seen delineated by a solid gray outline.

In this embodiment, projection 406 is a square approximately 9 times larger than aperture 405 and centered on aperture 405. Depending on how close or far sensor 404 is to the aperture array, this projection may correspond to a wider or narrower FOV. Baffles around aperture 405 (not shown in this illustration, but visible as baffles 317 in FIG. 5) are used in this embodiment to limit the extent of projection 406 to approximately 9 times larger than the size of aperture 405.

Note that in this embodiment only a small percentage of the area of projection 406 overlaps sensor 404. Part of this overlap is visible through an open aperture 409 and part of it is obscured by closed aperture 408.

Illustration 410 shows the overlaying of the 4 projections from the upper right quadrant of aperture array 401. (For clarity, in illustrations 410 and 420, only the outline of MURA 3 aperture array 401 is shown.) The 4 open apertures 415 in the upper right quadrant are delineated with dashed outlines. The 4 projections 416 from these 4 apertures are shown as overlapping gray areas. Each projection, like the projection 406 shown in illustration 400, is a square approximately 9 times the size of its aperture and is centered on its aperture, and is delineated by a solid gray line. To indicate the number of overlapping projections in each area of the sensor plane, varying levels of gray scale are used to fill each area. The lightest gray indicates 1 projection, the next darker indicates 2 projections overlapping, the next darker indicates 3 projections overlapping, and finally the darkest indicates 4 projections overlapping.

Illustration 420 shows the overlaying of all 16 projections from the entire aperture array 401. The 16 open apertures 425 are delineated by dashed outlines. Each projection, like the projection 406 shown in illustration 400, is a square approximately 9 times the size of its aperture and centered on its aperture, and is delineated by a solid gray line. To indicate the number of overlapping projections in each area of the sensor plane, varying levels of gray scale are used as described in the previous paragraph. Note that in this embodiment each area of sensor 404 is shown covered by 4 overlapping projections. In practice, it is correct that there will be 4 overlapping projections over the vast majority of the sensor area, but because of tolerance variations, diffraction effects, and varying distances to objects in the observed scene, there may be fewer or more overlapping projections near the borders of projections, which are shown as solid gray lines in illustration 420.

Note also that most of the light hitting the MURA 3 aperture array 401 is projected beyond the edges of sensor 404, and as a result this light is not used for the reconstruction. If the area of the rightmost column of the MURA 3 aperture array 401 is disregarded (since all apertures in that column are closed, it does not contribute any light to the camera and can be removed from the system without impacting the image reconstruction), approximately 13% of the light hitting the remaining area of the MURA 3 aperture array 401 is actually projected onto the sensor 404. A conventional single f/2.8 lens transmits approximately 12.7% of the light hitting the lens, so the 13% light transmission performance of this MURA 3 coded aperture array camera can be seen as comparable to a conventional f/2.8 lens.

Generally speaking, f/2.8 is good light transmission performance for a photographic lens, so the description of the MURA 3 coded aperture camera in the last few paragraphs characterizes a camera with potentially desirable light transmission characteristics. Unfortunately, only a 3×3 pixel image can be reconstructed by the system described.

Each element in a CAI camera acts geometrically like a pinhole in a pinhole camera. Light passing through each aperture makes a projection onto the sensor, just as it would in a pinhole camera. And like a pinhole camera, a CAI camera is subject to the diffraction effects of light passing through a pinhole. In a pinhole, these diffraction effects create a point source projected pattern commonly known as the "Airy disk". The primary lobe of the Airy disk roughly defines the smallest resolvable spot size from a given pinhole camera projection. At a given distance from the pinhole to the sensor, the Airy disk increases in size as the pinhole decreases in size. From a geometric point of view, the resolution (i.e. minimum point source projection spot size) of images from a pinhole camera also increases as the pinhole gets smaller. So, for any given distance of pinhole to sensor, there is an optimum pinhole size where the point source projection spot size equals the size of the primary lobe of the Airy disk. If the pinhole is made smaller than this optimum size, resolution decreases because the Airy disk increases in size. If the pinhole is made larger than this optimum size, resolution decreases because a point source projection spot size increases. Since the characterization of resolution of a pinhole camera is subjective, different formulae have been proposed for calculating the optimal pinhole diameter. One such formula is A=SQRT(55F), where A is the pinhole diameter in thousandths of an inch, F is the camera focal length in inches, and SQRT( ) is the square root function.

Note that achievable resolution in a pinhole camera increases as the focal length of the camera increases. Unfortunately, the physical size of the camera typically increases in proportion to the focal length, and as a result, a very large camera is needed for high resolution pinhole images. For example (using the formula A=SQRT(55F)), the optimal pinhole size of a 1" focal length (i.e. 1" thick) pinhole camera is about 0.007". For a "normal" viewing angle of about 53°, this results in about a 134.8 pixel diagonal dimension, or about a 95×95 pixel resolution image. The optimal pinhole size of a 10" focal length (i.e. 10" thick) pinhole camera is about 0.023". With a 53° viewing angle, this results in about a 426.4 diagonal resolution, or about a 301×301 resolution image. (Note that different photographers will use different subjective criteria in assessing the resolvable resolution of a pinhole camera. The resolution calculated here is based on one interpretation of resolvable resolution. Other interpretations may lead higher or lower resolution assessments, but will normally be within a 2× range higher or lower than the numbers presented here.)

Like pinhole cameras, visible light CAI cameras are also subject to diffraction effects which may result in resolution/size trade-offs. The diffraction patterns are more complex than pinhole diffraction patterns because of the complexity of the aperture patterns, and consequently, determining the impact on image resolution and/or camera size requirements is more complex. But because the pixel resolution of the CAI image can be no higher than the order of the aperture array, to achieve a high-resolution image it is necessary to utilize high order aperture arrays which can potentially exhibit worse diffraction effects than lower order aperture arrays or, alternatively, require longer focal lengths (and, as a result, larger camera sizes) to mitigate those diffraction effects.

Another approach to improving the performance of a lens system in a digital camera is a plenoptic camera. The basic concept of a plenoptic camera is described in U.S. Pat. No. 5,076,687. Although the word "plenoptic" is not used in the patent, the device referenced in the patent is called a "plenoptic camera" by its inventor in a paper describing an application of the camera, "Single Lens Stereo with a Plenoptic Camera", by Edward H. Adelson and John Y. A. Wang, IEEE Transactions on Pattern Analysis and Machine Intelligence, Vol 14, No. 2, February 1992, currently found at: http://persci.mit.edu/pub_pdfs/plenoptic.pdf. In 2005, Stanford University researchers published a paper (Stanford Tech Report CTSR 2005-02) describing an application of a plenoptic camera implementation that achieves the DOF of a conventional f/22 lens while capturing the equivalent light from the scene that would be gathered by an f/4 lens. Unfortunately, this increase in light gathering ability comes at a theoretically linear cost of image resolution. The prototype constructed by the team resulted in about 2× beyond the theoretical resolution losses, so with a 4000×4000 pixel sensor they were able to reconstruct only a 296×296 image which exhibited the f/22 DOF with f/4 light capture (i.e. a 16 megapixel sensor yielded a 90 kilopixel image). While such a system might be useful for certain specialized applications, the enormous losses of sensor resolution would likely make such a system non-competitive for general photographic applications. Also, the bulkiness of the conventional lens system that is placed in front of the microlens array results in a very long-lensed camera, which is not suitable for thin devices, such as mobile phones and tablets, which increasingly displacing thick-bodied conventional cameras. A commercial version of the plenoptic camera was released by Lytro, Inc. of Mountain View, Calif. (www.lytro.com), and the advertised dimensions of the camera available at this time is 1.61 inch×1.61 inch×4.41 inch, with the longest dimension of 4.41 inches due to the length of the lens. A typically available mobile phone camera's lens has a length that is only a few millimeters.

SUMMARY

An apparatus and method are described for capturing images in visible light as well as other radiation wavelengths. In one embodiment, the apparatus comprises: a diffraction coded imaging system including a plurality of apertures arranged in a diffraction coded array pattern with opaque material blocking array elements not containing apertures; and a light- or radiation-sensitive sensor coupled to the diffraction coded imaging system array and positioned at a specified distance behind the diffraction coded imaging system array, the radiation-sensitive sensor configured to sense light or radiation transmitted and diffracted through the apertures in the diffraction coded imaging system array.

BRIEF DESCRIPTION OF THE DRAWINGS

A better understanding of the present invention can be obtained from the following detailed description in conjunction with the drawings, in which.

DETAILED DESCRIPTION

A system and method for capturing still images and video using coded lens imaging techniques is described below. In the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Coded Aperture Imaging (CAI) Camera System Architecture

Figure 1:
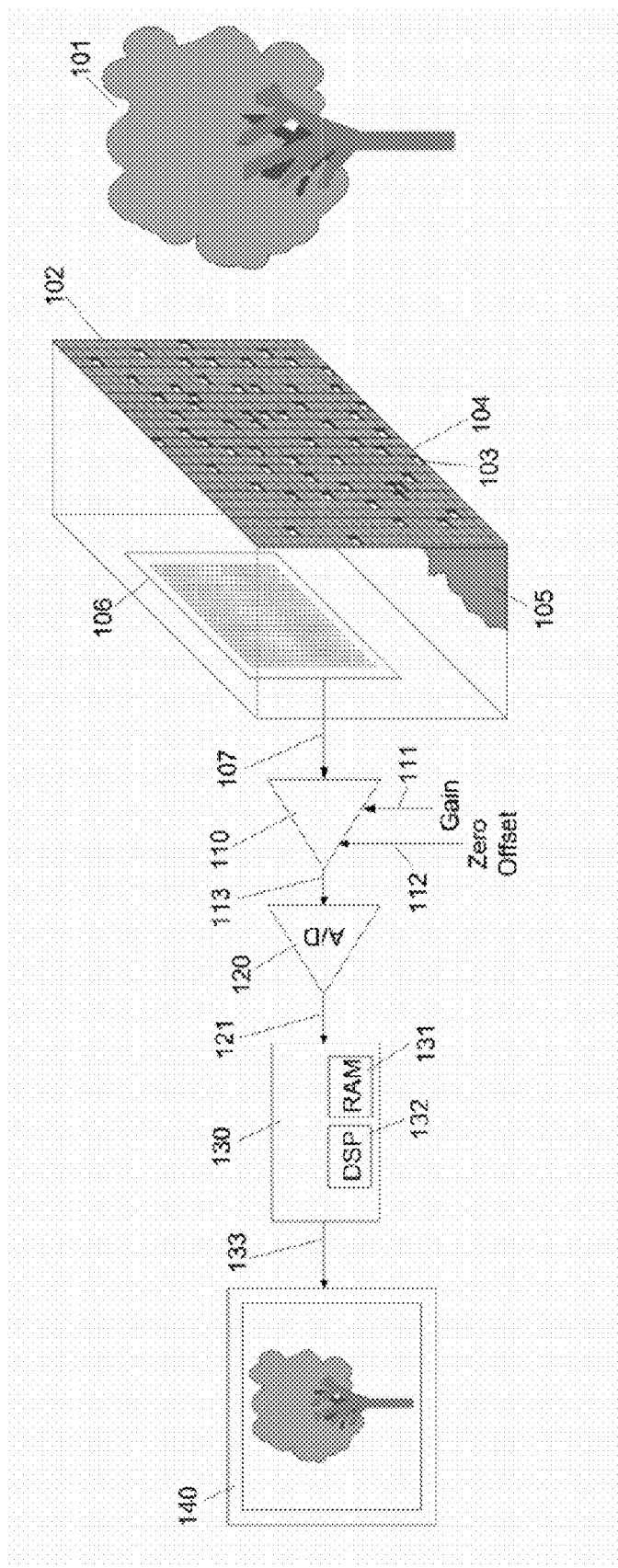
FIG. 1 illustrates a coded aperture camera according to one embodiment of the invention.

A visible light coded aperture camera according to one embodiment of the invention is illustrated in FIG. 1. The illustrated embodiment includes a coded aperture 102 placed in front of a light sensitive grayscale or color semiconductor sensor 106. The coded aperture 102 is a pattern of circular, square or rectangular elements, some of which are transparent to visible light (e.g. element 103) and some of which are opaque (e.g. element 104). Note that for illustration clarity purposes, coded aperture 102 has very few transparent elements. A typical coded aperture may have significantly more transparent elements (e.g., 50%). Visible light a from 2-dimensional or 3-dimensional scene 101 (which may be illuminated by ambient or artificial lighting) is projected through the coded aperture 102 onto image sensor 106. The camera is capable of limiting the field-of-view to the fully coded field-of-view projected onto the sensor. In one embodiment, this is implemented by the use of a self-collimating coded aperture 102 (self-collimation is explained below). The space between the coded aperture and the sensor is shielded by a light-opaque housing 105 (only the outline of which is shown in FIG. 1), preventing any light from reaching the sensor other than by passing through an open element of the coded aperture.

The camera further includes an image sensor readout subsystem 110 with an interface 107 to the image sensor 105 (which may be similar to those used in prior coded aperture systems). The readout subsystem clocks out the analog image signal from the image sensor 106 and applies analog buffering, amplification and/or filtering as required by the particular image sensor. An example of such a readout subsystem 110 that also incorporates A/D 120 is the NDX-1260 CleanCapture Image Processor by NuCore Technology, Inc. of Sunnyvale, Calif. The ability to adjust the zero offset 112 and gain 111 to analog pixel values read by the readout subsystem 110 (e.g., using at least one operational amplifier (op amp)) will increase the dynamic range of the captured image, but is not essential if the image sensor has a sufficient dynamic range for the desired image quality without a zero-offset and gain adjustment.

In one embodiment, the output of the readout subsystem 110 is coupled by interface 113 to at least one analog-to-digital converter (A/D) 120 which digitizes the analog output. The output of the A/D is coupled via interface 121 to an image reconstruction processor 130, which in one embodiment incorporates a Digital Signal Processor (DSP) 132 and Random Access Memory (RAM) 131. The digitized image from the interface 121 is stored in RAM 131, and the DSP 132 post-processes the image so as to reconstruct the original scene 101 into a grayscale or color image. In accordance with another embodiment, the image reconstruction processor 130 incorporates a general purpose CPU such as an Intel Corporation Pentium 4®, or similar general purpose processor. In yet another embodiment, the image reconstruction processor 130 incorporates an Application-Specific Integrated Circuit ("ASIC") which implements part or all of the reconstruction processing in dedicated digital structures. This grayscale or color image reconstructed by reconstruction processor 130 is output through interface 133 to be displayed on a display device 140.

Note that the camera illustrated in FIG. 1 does not require a lens of any sort. Also, no special imaging conditions are required (e.g., no controlled positioning of the camera or objects in the scene nor controlled lighting is required). Further, the camera is capable of imaging 3-dimensional real-world scenes (i.e., scenes containing objects with unknown and varying ranges). In short, the camera illustrated in FIG. 1 can be used in the same way as a conventional lens camera.

Figure 2:
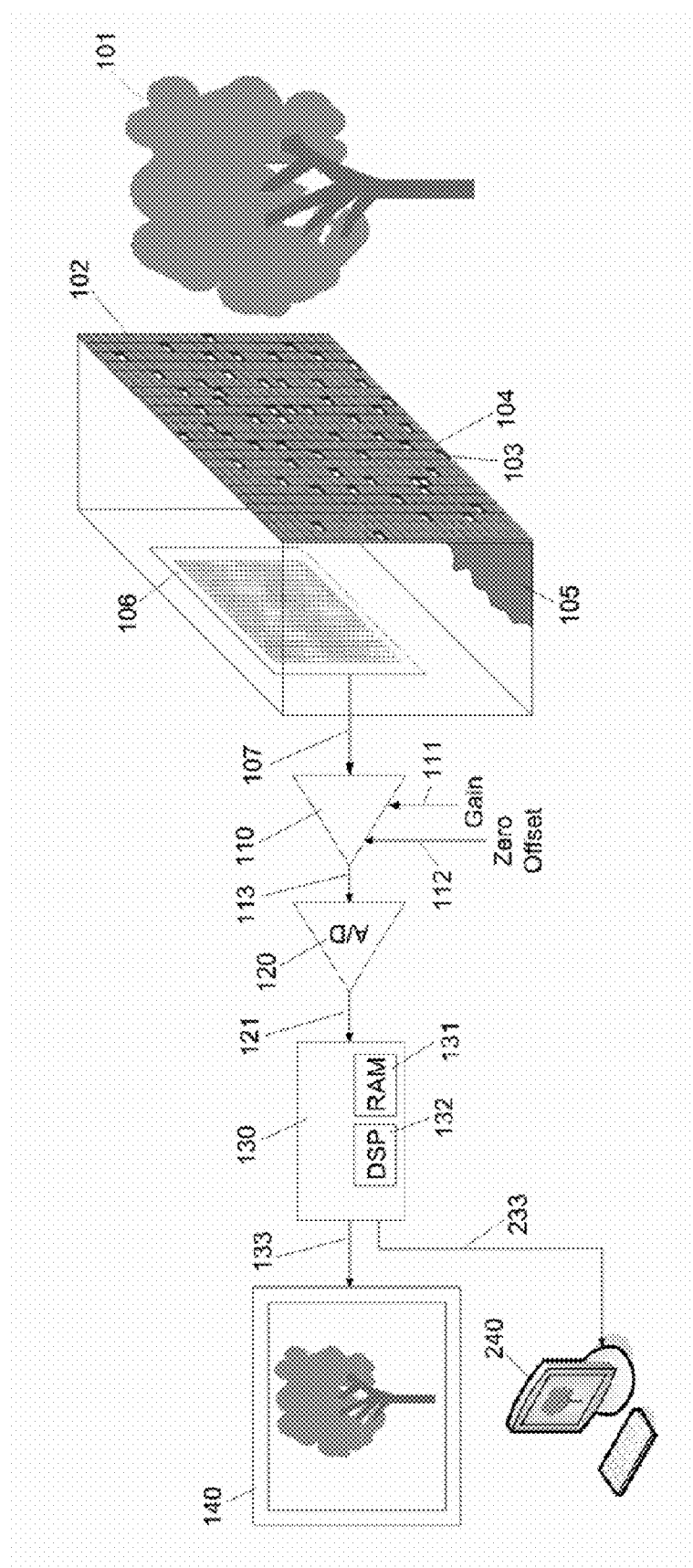
FIG. 2 illustrates a coded aperture camera according to one embodiment of the invention.

According to one embodiment illustrated in FIG. 2, the resulting output 133 from the reconstruction processor is a 2-dimensional array of grayscale or color pixels representing the scene within the field of view of the camera. In one embodiment, the pixel data is transmitted through digital interface 233 to a computer 240 (or other image processing device). Thus, the output of the coded aperture camera will appear to any attached device as if it is the output of a conventional digital camera. Digital interface 233 for transferring the reconstructed image data may be any digital interface capable of handling the bandwidth from the camera for its required application such as for example, a Thunderbolt interface or a USB 3.0 interface (which would be suitable for still and video camera applications). Of course, the underlying principles of the invention are not limited to any particular interface 233. Preferably, the camera includes a display 140 (e.g., an LCD or OLED display), for presenting the reconstructed images to the photographer, but in this embodiment, display device 140 and interface 133 are optional.

Figure 3:
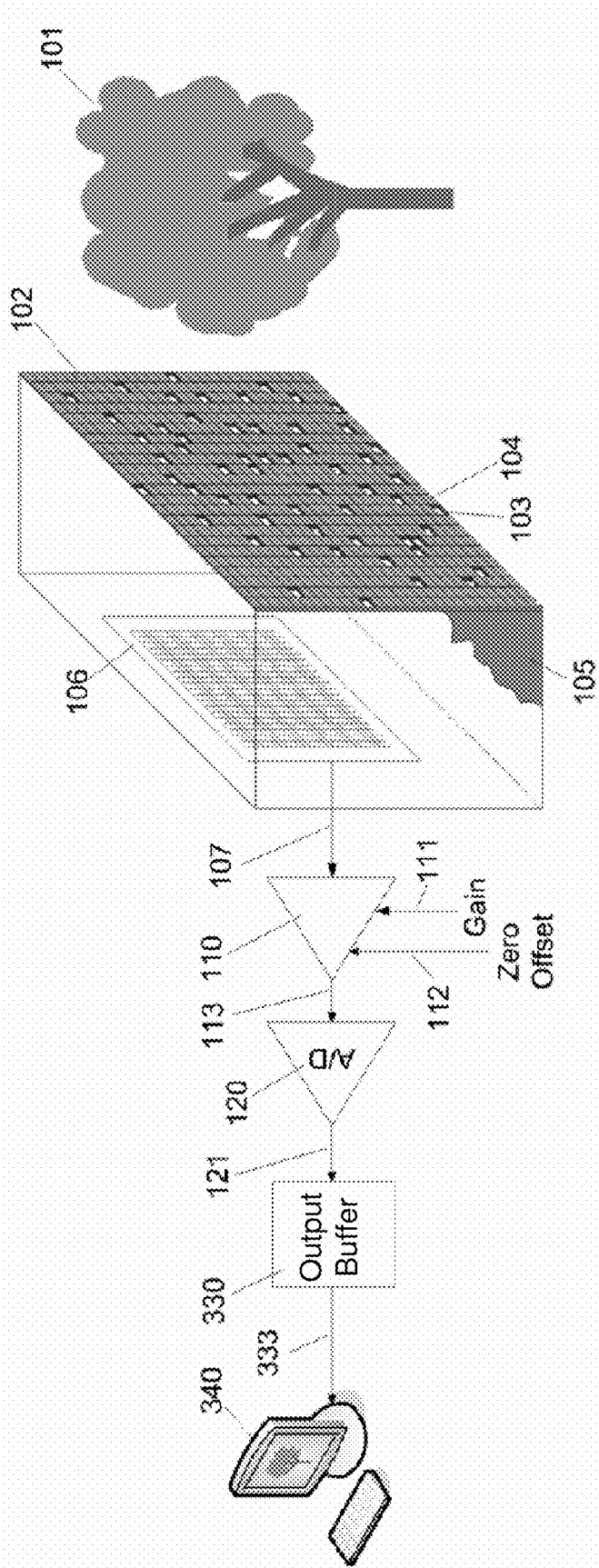
FIG. 3 illustrates a coded aperture camera according to one embodiment of the invention.

According to one embodiment illustrated in FIG. 3, the camera does not include reconstruction processor 130. Instead, the digitized image data from the A/D converter 120 is coupled through interface 121 to output buffer 330 where the image data is packetized and formatted to be output through digital interface 333. Digital interface 333 would typically be coupled to an external computing means such as a personal computer 340, either to be processed and reconstructed immediately, or stored on a mass storage medium (e.g., magnetic or optical disc, semiconductor memory, etc.) for processing and reconstruction at a later time. Preferably, the external computing device 340 has a display for presenting the reconstructed images to the photographer. Alternatively, or in addition, interface 333 is coupled directly to a mass storage medium (e.g., magnetic or optical disc, semiconductor memory, etc.). Digital interface 333 for transferring the reconstructed image data could be any digital interface capable of handling the bandwidth from the camera for its required application (e.g., IEEE1394 ("FireWire") interface or a USB 2.0 interface).

Aperture Pattern Construction

Figure 4:
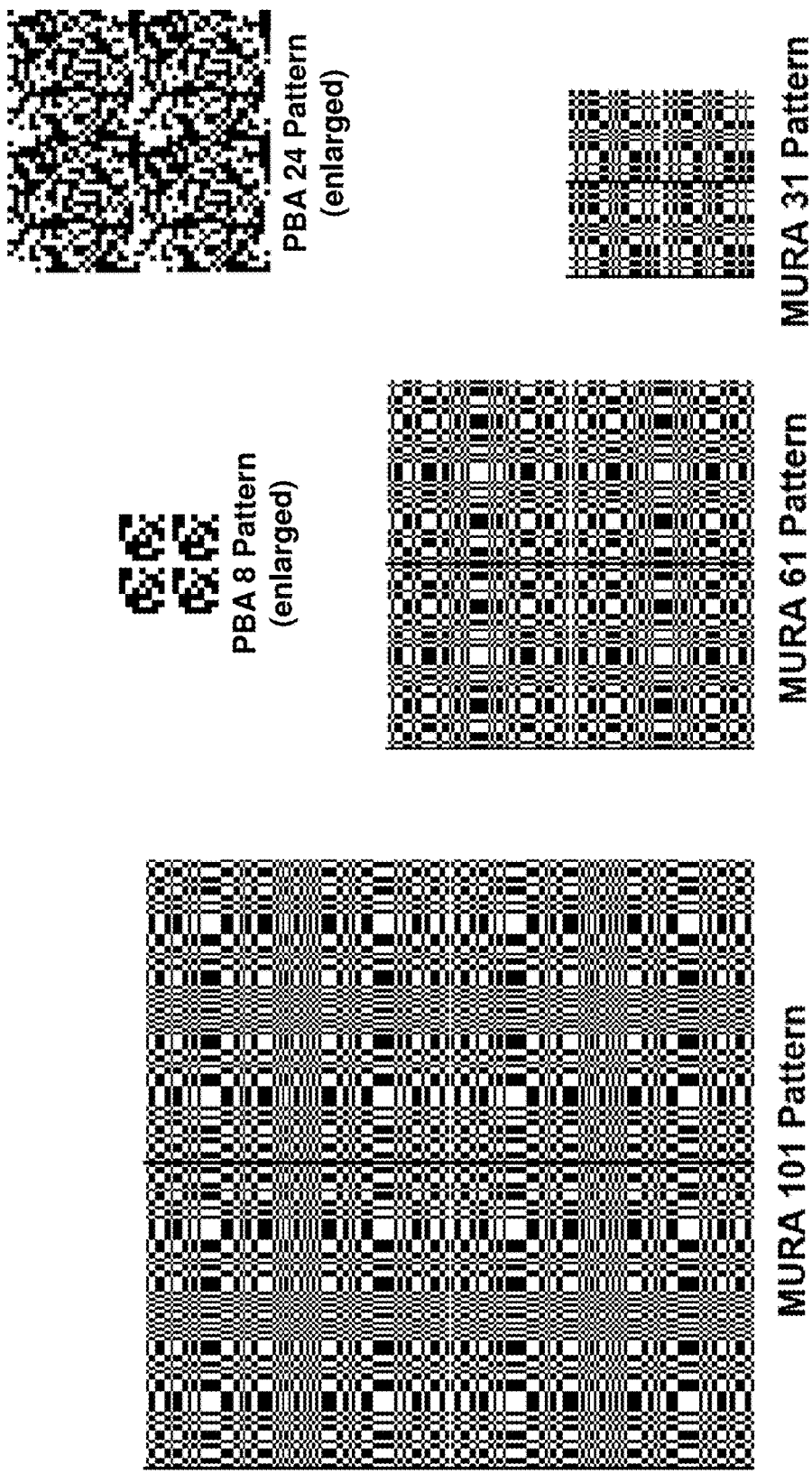
FIG. 4 illustrates MURA and PBA patterns in accordance with one embodiment of the invention.

According to one embodiment of the invention, the aperture pattern 102 is a Modified Uniformly Redundant Array ("MURA") pattern. The basic aperture pattern may be the same size as the sensor, and the overall aperture may be a 2×2 mosaic of this basic aperture pattern. Each transparent or opaque element of the aperture has at least the size of a pixel of the sensor. Three exemplary MURA patterns and two PBA patterns are illustrated in FIG. 4. MURA 101 is a 101×101 element pattern, MURA 61 is a 61×61 element pattern, and MURA 31 is a 31×31 element pattern. PBA 8 is an 8×8 element pattern and PBA 24 is a 24×24 element pattern. Each black area is opaque and each white area is transparent (open).

Aperture Fabrication

In one embodiment, the coded aperture consists of a glass wafer carrying a thin chromium layer. Upon manufacturing, the chromium layer carries a film of varnish which is sensitive to electron beams. The structure of the aperture is created by electron lithography. Specifically, the varnish is removed at the locations of the transparent aperture elements. Next, the chromium layer is cauterized in those locations not covered by varnish. The remaining varnish is then removed.

Aperture Pixel Size

In one embodiment, in order to allow an accurate reconstruction of the scene, an individual pixel of the sensor is no larger than an individual aperture element, magnified by the geometric scaling factor f=(o+a)/o, where o is the distance between the scene and the aperture and a is the distance between the aperture and the sensor. This factor is 1 if the object is at infinity and less than one if the object is at a finite distance. Therefore, if the sensor pixel size is chosen to be the same size as or smaller than an individual aperture element, objects at all distances can be reconstructed accurately.

If the size of an individual aperture element is in the order of magnitude of the wavelength of the light being imaged, the aperture may cause undesired wave-optical interference in addition to the desired effect of selectively blocking and transmitting the light. The wavelength of visible light is in the range between 380 nm and 780 nm. Preferably, the aperture dimensions are at least ten times as large as the longest wavelength to be imaged. Therefore, in one embodiment, the width or height of an individual aperture element is at least 7.8 microns to avoid wave-optical interference or diffraction effects. Note that while larger aperture elements will mitigate some wave-optical interference or diffraction effects there will be always be some wave-optical interference and diffraction effects to a greater or lesser degree.

Diffraction Coded Imaging (DCI) Camera System Architecture

Although wave-optical interference and diffraction effects can be mitigated by utilizing larger apertures, as described in the previous paragraph, in one embodiment of a visible light coded lens array camera, the wave-optical interference or diffraction effects are deliberately utilized, not just to allow for smaller apertures, but also—as examples but not limitations—to accommodate any other properties of the captured wavelengths, the camera, or aperture array that result in wave optical or diffractive effects such as, but not limited to, the shape of aperture, the distance to the sensor, the physical structure of the camera, the size of the camera, changing the image processing required, manufacturing imprecision, or achieving in aperture patterns that are more efficient in their light transmission. A camera so constructed to utilize (and/or accommodate) wave-optical interference and/or diffraction effects is referred herein as a Diffraction Coded Imaging (DCI) camera system (or "DCI camera").

Figure 5:
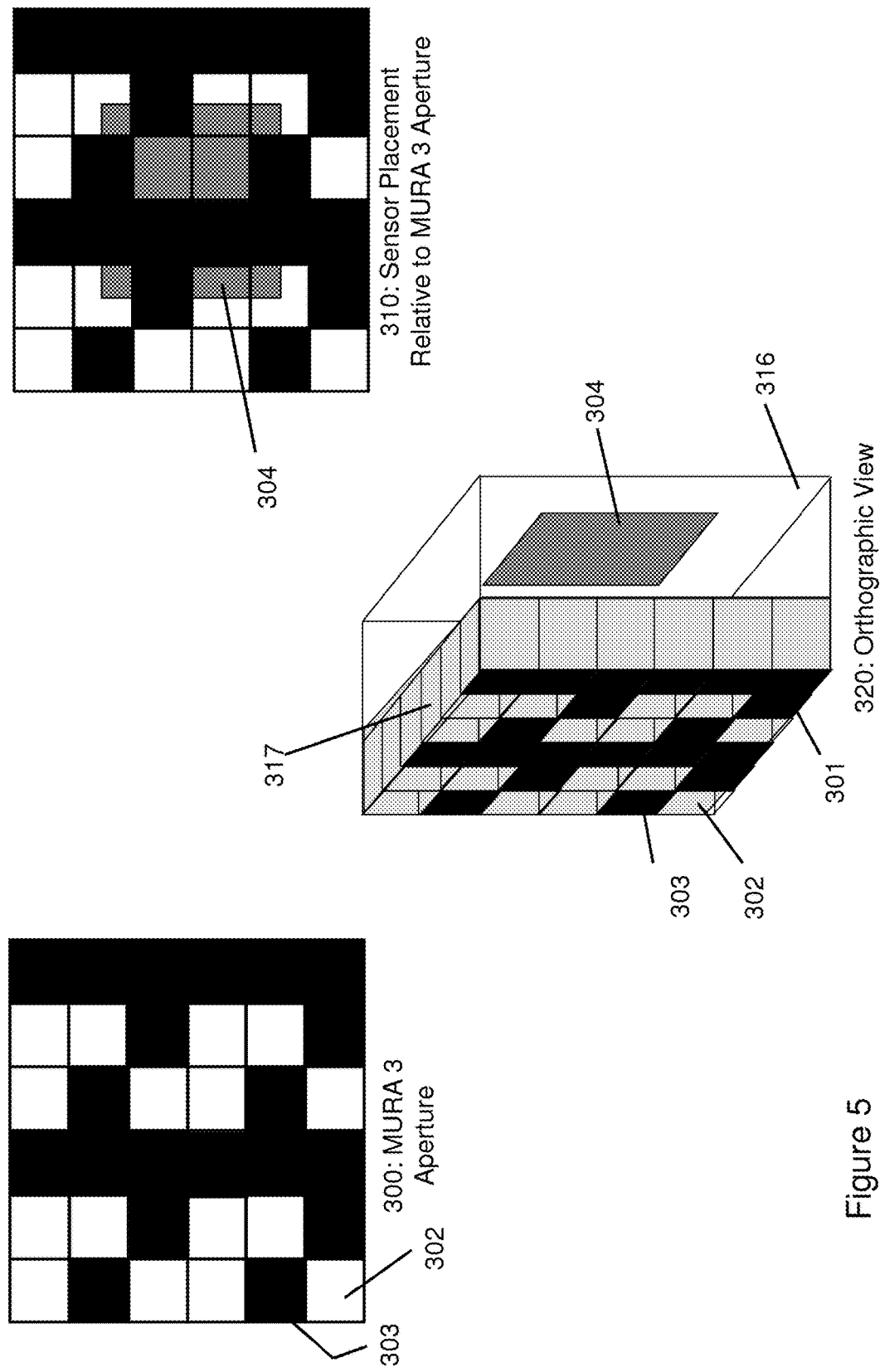
FIG. 5 illustrates the configuration of a MURA order 3 coded aperture array, baffles, sensor, and a camera body in accordance with one embodiment of the invention.

A Coded Aperture Imaging (CAI) camera system ("CAI camera") is described above and in the CAI Applications, and as shown in FIG. 1 light from a scene projects through a coded aperture array 102 onto a sensor 106. As shown in FIG. 5, baffles 317 are used to collimate the light from each aperture to result in the overlapping projections from the apertures shown in 420 of FIG. 6. Further details of implementing a practical CAI system are described above and in the CAI Application as well as in other Patents, Applications and a Provisional Application incorporated by reference in [0001]. Further, a Coded Lens System (CLI), similar to CAI, but using lenses rather than apertures, is described in U.S. patent application Ser. No. 11/210,098 entitled "Apparatus And Method For Capturing Still Images And Video Using Coded Lens Imaging Techniques" filed on Aug. 22, 2005, now U.S. Pat. No. 7,671,321 as well as in other Patents, Applications and a Provisional Application incorporated by referenced in [0001].

In one embodiment, a DCI camera system is configured and operates in a manner very similar to the CAI camera system shown in FIG. 1, with the very significant difference being that, rather than assuming that the radiation passing through the physical aperture pattern 102 is largely unaffected by wave-optical interference and/or diffraction effects, the physical aperture pattern 102 is deliberately chosen to exploit wave-optical interference and/or diffraction effects so that the projected light on the sensor 106 is in a desired overlapping pattern (e.g. such as that shown for a MURA 3 in FIG. 6) that would have resulted if the physical aperture pattern 102 had a desired aperture pattern (e.g. the MURA 3 physical aperture pattern in illustration 300 of FIG. 5) and there had been no wave-optical interference and/or diffraction effects. By way of illustration, if the chosen wavelength is so short (e.g. x-ray or gamma ray radiation) relative to the size of the apertures in physical aperture pattern 102 that there are insignificant wave-optical interference and/or diffraction effects as the radiation passes through the apertures 302, the baffles 317 and reaches the sensor 304 of FIG. 5, then in this degenerate case, the physical aperture pattern 102 would be the same as the aperture pattern for digitally reconstructing the image e.g. the MURA 3 aperture pattern in illustration 300 of FIG. 5), as has been the case in systems described in the Patents, Patent Applications and the Provisional Application incorporated herein by reference in [0001], But, if the radiation wavelength is such that there are significant wave-optical interference and/or diffraction effects as the radiation passes through the apertures 302, the baffles 317 and reaches the sensor 304 of FIG. 5, then the physical aperture pattern 300 of FIG. 5 (a MURA 3 in this example) would be not be the physical aperture pattern used, as shown in this FIG. 5. Instead, a physical aperture pattern would be chosen such that when the radiation (e.g. light, microwaves) from the scene passes through the physical aperture pattern openings 302, any baffles 317, and reaches the sensor 304, the wave-optical and/or diffraction effects result in an overlapping image on the sensor 304 such as that shown in 420 in FIG. 6, as if the desired aperture pattern for reconstruction had been used in the physical aperture 300 of FIG. 5 and there had been no wave-optical interference and/or diffraction effects. Then, the image is reconstructed from this overlapping pattern, such as that shown in 420 of FIG. 6, using the CAI techniques described in the Patents, Patent Applications and the Provisional Application incorporated herein by reference in [0001].

Figure 6:
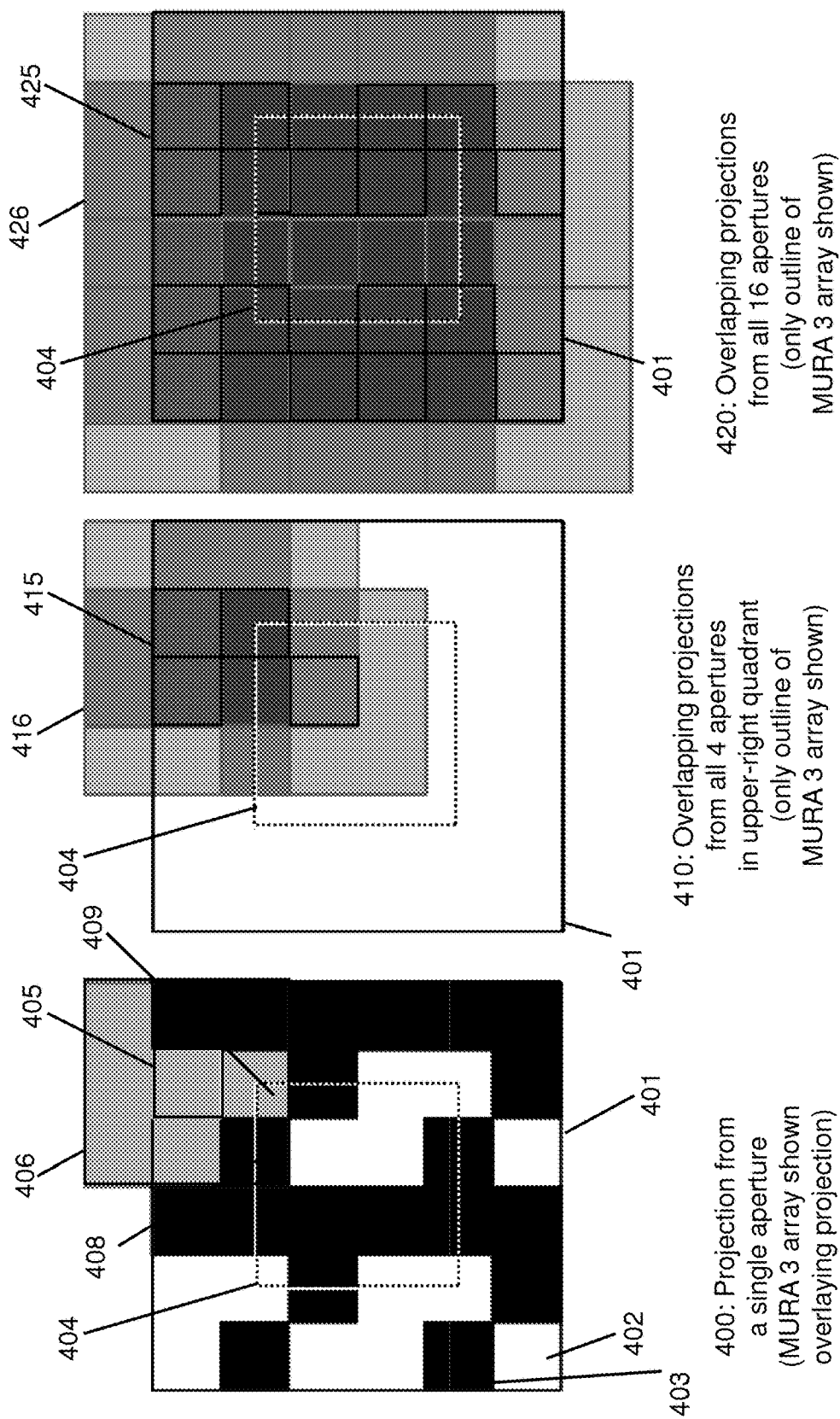
FIG. 6 illustrates the projection of radiation from transparent apertures in a MURA 3 coded aperture array in accordance with one embodiment of the invention.
Figure 7:
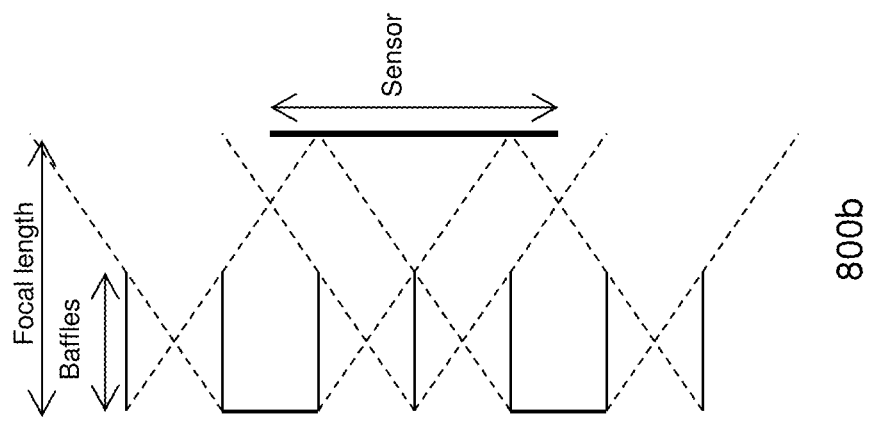
FIG. 7 illustrates a side view of a MURA order 3 coded imaging camera in accordance with one embodiment of the invention.
Figure 7:
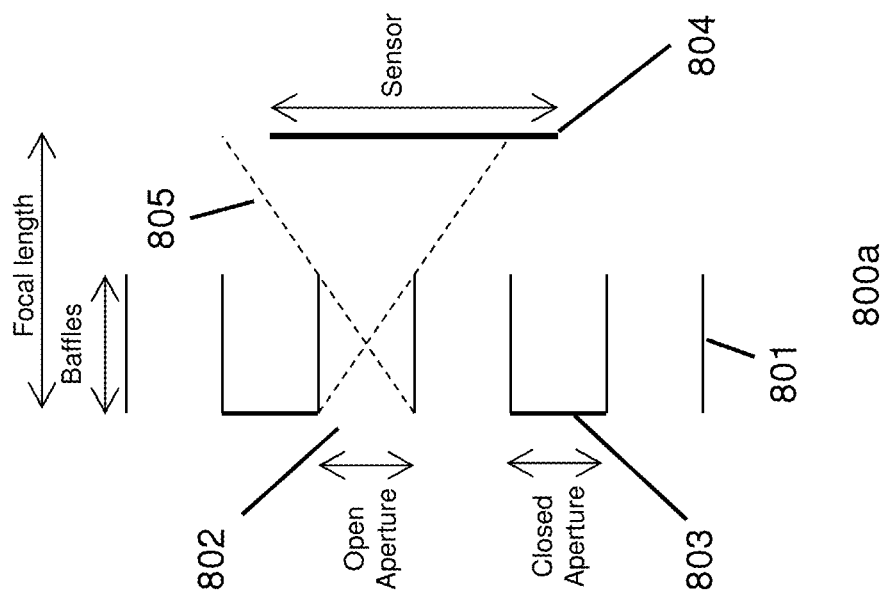

Thus, in the DCI camera preferred embodiment described in the preceding paragraph, the DCI camera is configured as the CAI camera shown in FIGS. 1-3, FIG. 5 and FIG. 7, and the resulting projected overlapping image on the sensor is as it is shown in FIG. 6, and the image is reconstructed using array patterns such as those shown in FIG. 4. But, the physical aperture patterns 102 of FIGS. 1-3 and 300 of FIG. 5 and the leftmost column of 800b in FIG. 7 would not be the same as the physical aperture pattern used for digital reconstruction of the image. Rather, a physical aperture pattern would be chosen that, as a result of wave-optical interference and/or diffraction effects, the resulting projected overlapping image on the sensor is as it is shown in FIG. 6. Effectively, in the preferred embodiment a physical aperture pattern is chosen that precompensates for the effects of wave-optical interference and/or diffraction such that the overlapping projected pattern on the sensor is the desired pattern to be used for digitally reconstructing the image. Thus, depending on the extent of the wave-optical interference and/or diffraction, the physical aperture pattern used may have little or no resemblance to the desired pattern to be used for digitally reconstructing the image. For example, to achieve the MURA 3 overlapping projections illustrated in FIG. 6 420, the physical aperture pattern used for aperture 102 of FIGS. 1 and 2, 300 of FIG. 5, and the leftmost aperture column pattern shown in 800a and 800b of FIG. 7 may have no resemblance whatsoever to a MURA 3.

As is known to practitioners of skill in the art, light that is passing through a small aperture or along edges, such as those of baffles, will demonstrate diffraction effects, as observed by the projection on the sensor. Further, light that is passing through multiple apertures whose projections overlap at a surface (e.g. the surface of sensor 804 in FIG. 7) will show interference effects upon the surface due to the interference (e.g. constructive and destructive combination) of the light waves. These effects are well-understood and can be precisely modeled mathematically for a given geometry of apertures, baffles, focal length, etc. For example, the Wikipedia article section on diffraction of light, http://en.wikipedia.org/wiki/Diffraction#Diffraction_of_light provides formulae and illustrations of diffraction and wave-optical interference. Diffraction and wave-optical interference shall be referred to herein as "diffraction and interference effects of light", and diffraction and wave interference of radiation generally shall be referred to herein as "diffraction and interference effects".

Figure 8:
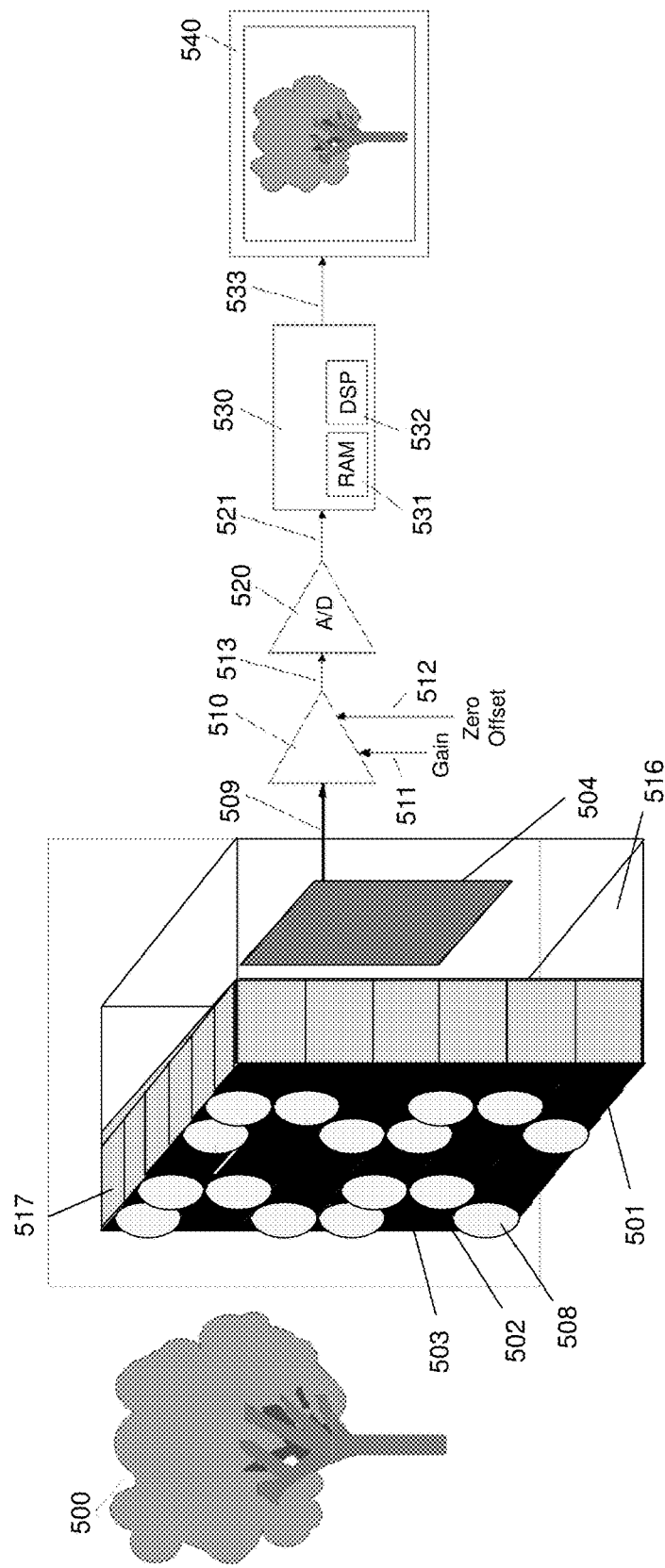
FIG. 8 illustrates a coded lens camera according to one embodiment of the invention.
Figure 9:
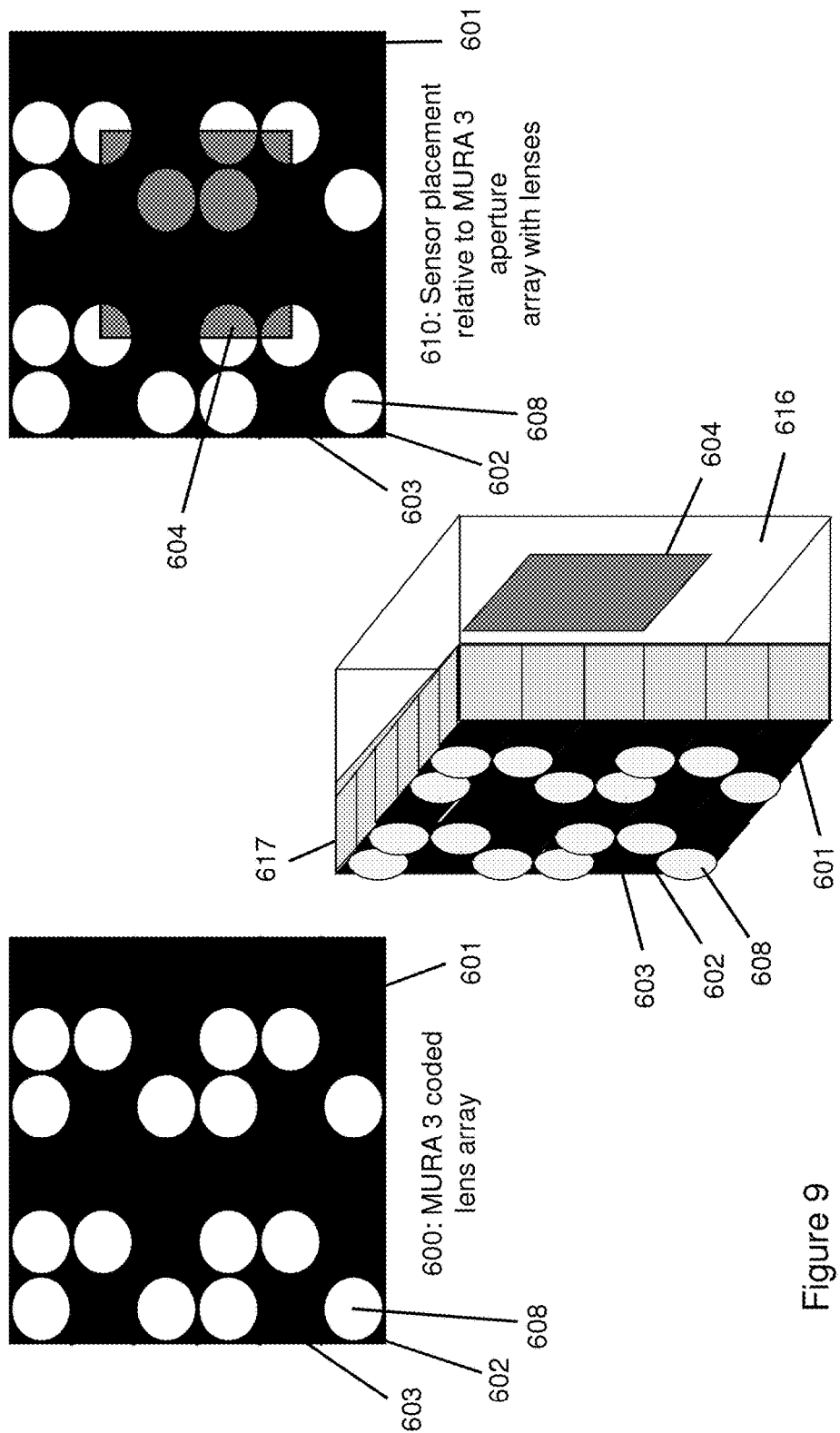
FIG. 9 illustrates the configuration of a MURA order 3 coded lens array, baffles, sensor, and a camera body in accordance with one embodiment of the invention.
Figure 10:
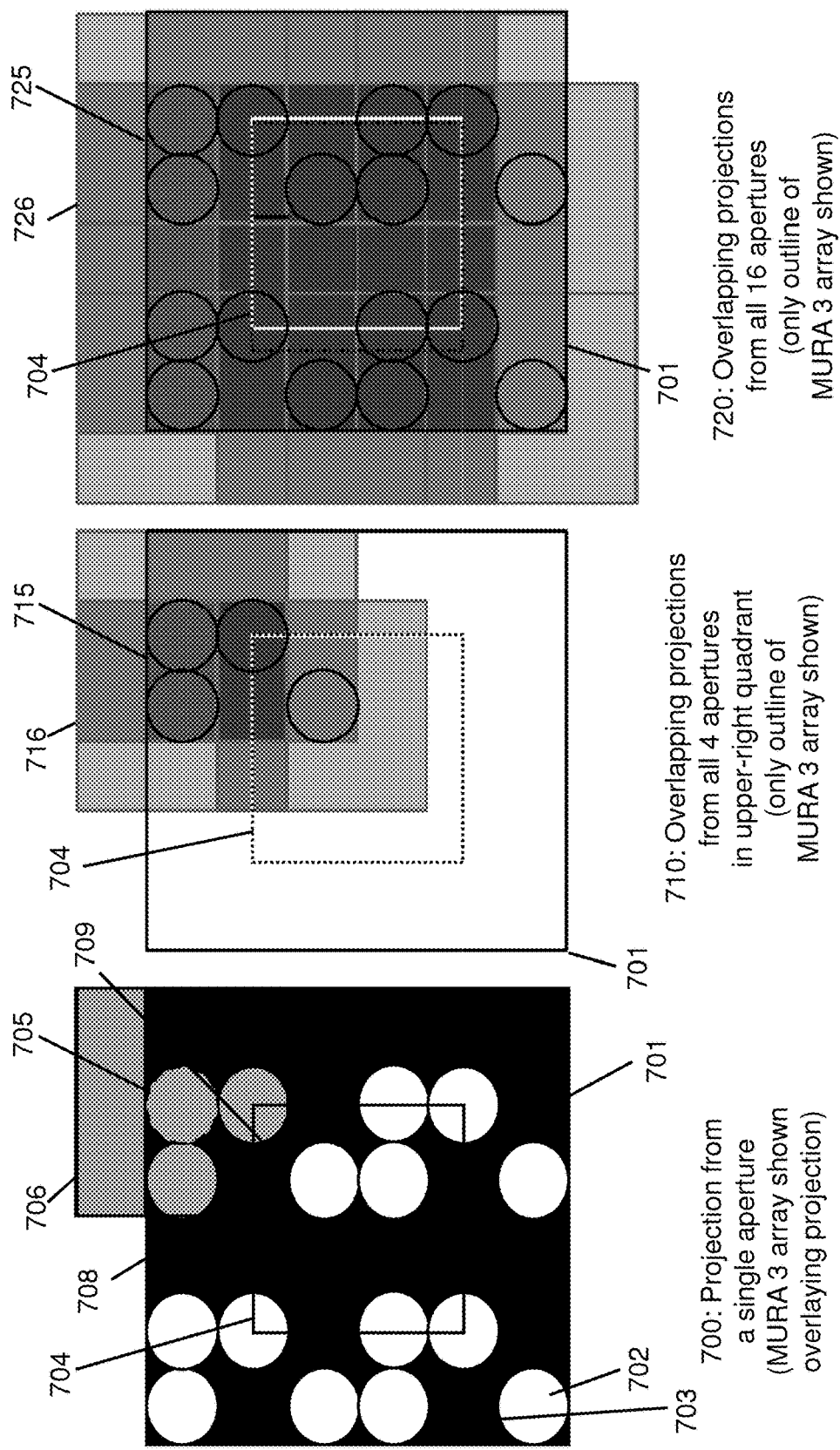
FIG. 10 illustrates the projection of radiation from lenses in a MURA 3 coded lens array in accordance with one embodiment of the invention.
Figure 11:
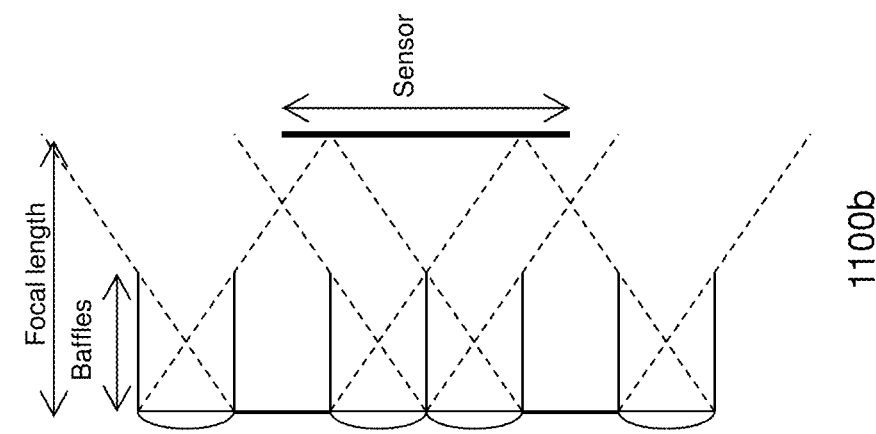
FIG. 11 illustrates a side view of a MURA order 3 coded lens camera in accordance with one embodiment of the invention
Figure 11:
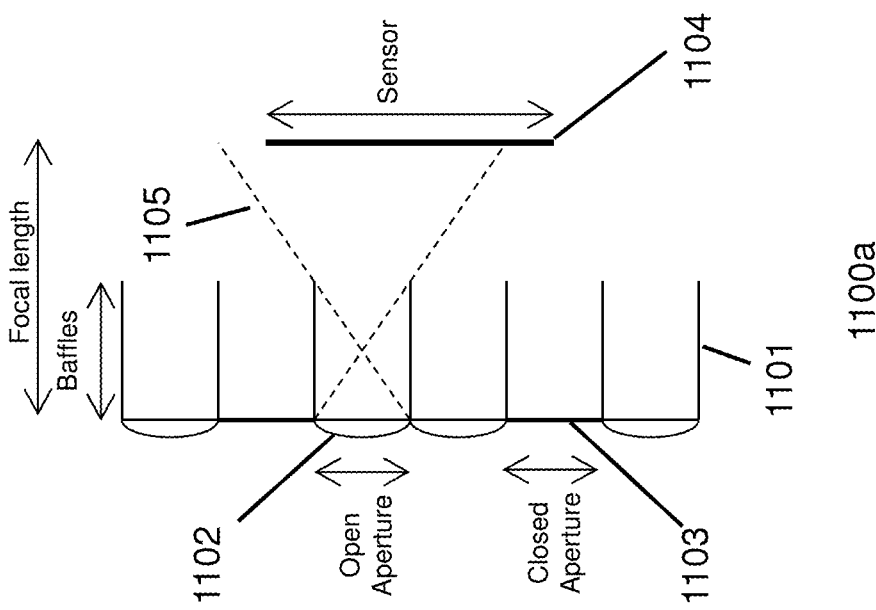

Just as diffraction and interference effects of light through apertures are well-known and well-characterized mathematically by practitioners of skill in the art, so are diffraction and interference effects of light projected through lenses. FIG. 8 illustrates a Coded Lenses Imaging (CLI) system that, like a CAI system, projects light from a scene through a pattern of overlapping projections onto a sensor 504. The notable difference between CAI system and a CLI system is the CAI system projects light through apertures, whereas the CLI system projects light through lenses. This is illustrated in FIGS. 8, 9, 10 and 11, and CLI is described in Patents, Patent Applications and a Provisional Application incorporated by referenced in [0001]. As with apertures in CAI systems, light passing through small lenses or along edges, such as those of baffles, will demonstrate diffraction effects, as observed by the projection on the sensor. Further, light that is passing through multiple lenses whose projections overlap at a surface (e.g. the surface of sensor 1104 in FIG. 11) will show interference effects upon the surface due to the interference (e.g. constructive and destructive combination of the light waves. These effects are well-understood and can be accurately modeled mathematically for a given geometry, structure and refractive characteristics of the lenses, geometry of apertures behind or in front of the lenses, baffles, focal length, etc.

Further just as diffraction and interference effects of light through apertures and lenses are well-known and well-characterized mathematically by practitioners of skill in the art, so are diffraction and interference effects of radiation at non-light wavelengths projected through apertures. While FIGS. 1-3, FIG. 5 and FIG. 7 and the resulting projected overlapping image on the sensor is as it is shown in FIG. 6 illustrate a visible light camera, if the radiation were at a non-visible light wavelength (e.g. nearby wavelengths to visible light such as infrared or ultraviolet, or very distant wavelengths from visible light such as microwaves) and the sensor was responsive to such radiation wavelength and the blocked apertures and baffles were of appropriate materials to block such wavelengths, then the same figures would also illustrate Coded Aperture Imaging cameras for capturing images in non-visible light. While conventional lens-based cameras are commercially available for infrared and ultraviolet imaging, cameras for capturing in other wavelengths are typically not available at all, yet there are a wide range of applications where such cameras could be used. For example, microwaves can pass harmlessly through walls and living tissue and other obstacles (e.g., unlike x-rays which can pass through obstacles, but can be harmful to living tissue). But, microwave wavelengths are so long compared to those of visible light that conventional light imaging techniques (e.g. a small glass lens camera) cannot be used. A CAI camera would require extremely large apertures (impractical for most imaging applications) to be able to image at microwave wavelengths without incurring significant diffraction and interference effects. Smaller apertures could be used (e.g. to create a camera that is of a practical size), but there would be substantial diffraction and interference effects. If a DCI camera is used instead of a CAI camera, then the aperture pattern is chosen so as to precompensate for diffraction and interference effects. Thus, a DCI camera can utilize smaller apertures and still resulting in a desired overlapping pattern of projections on the sensor, and then the image, in the non-visible light wavelength, can be digitally reconstructed, utilizing the CAI techniques described in Patents, Patent Applications and the Provisional Application incorporated by referenced in [0001].

For some radiation wavelengths, lenses may not be a practical option for a camera, because the radiation may penetrate lens material without significant refraction, or the lenses may have to be impractically large. In a DCI camera, a physical aperture pattern can be used that, through diffraction and interference, results in an overlapping pattern on the sensor that would have resulted if physical lenses had been practical. In this way, CLI imaging and digital image reconstruction techniques can be used to reconstruct the image, even in wavelengths are used where lenses would not be feasible for a practical camera.

In all of the CAI and CLI system Figures and descriptions, baffles (or apertures equivalently thick as baffles) are used to collimate the light so that there is a bounded limit to each projected pattern. In the case of a DCI system, baffles can still be used, but also baffles can be eliminated if the diffraction and interference effects are such that the desired overlapping projected pattern on the sensor is achieved without baffles. Thus, with DCI it is possible to create a camera that is even simpler than a CAI or CLI camera because no baffles are necessary, just the physical apertures and/or physical lenses.

Depending on the radiation wavelength and the geometry of a DCI camera (e.g. focal length, size of apertures), there may not be a physical aperture pattern that exists that precompensates the diffraction and interference effects for a particular desired pattern for digital reconstruction of the image. If not, then there may be an alternative pattern for digital reconstruction that can be precompensated for by a physical pattern that does exist. If so, then that physical aperture pattern can be used, and the digital reconstruction will use the projected pattern that results. As noted in the Patents, Patent Applications and the Provisional Application incorporated by referenced in [0001], some digital reconstruction patterns produce better results than others. If physical aperture patterns can be found for more than one digital reconstruction pattern, then in one embodiment the physical aperture pattern that produces the best image reconstruction results is used.

Although the radiation detection sensor 102 in FIG. 1 for visible, infrared and ultraviolet light is typically a CCD or CMOS array, sensors at non-light wavelengths may be in a different form. For example, a sensor of microwave radiation may be in the form of an array of microwave-sensitive antennas, rather than an array of light-sensitive CCD or CMOS pixels.

Embodiments of the invention may include various steps as set forth above. The steps may be embodied in machine-executable instructions which cause a general-purpose or special-purpose processor to perform certain steps. For example, the various operations described above may be software executed by a personal computer or embedded on a PCI card within a personal computer. Alternatively, or in addition, the operations may be implemented by a DSP or ASIC. Moreover, various components which are not relevant to the underlying principles of the invention such as computer memory, hard drive, input devices, etc, have been left out of the figures and description to avoid obscuring the pertinent aspects of the invention.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. For example, while the embodiments of the invention are described above in the context of a "camera," the underlying principles of the invention may be implemented within virtually any type of device including, but not limited to, PDA's, cellular telephones, and notebook computers. Accordingly, the scope and spirit of the present invention should be judged in terms of the claims which follow.

What is claimed is:

1. An apparatus for precompensating for the effects of diffraction and wave-optical interference comprising:
   a sensor;
   a physical aperture pattern constructed to emulate a result of a desired aperture pattern if the desired aperture pattern did not produce wave-optical interference and diffraction effects,
   the physical aperture pattern to receive radiation from a scene within the visible spectrum and pre-compensate for the wave-optical interference and diffraction effects of the desired aperture pattern, taking advantage of wave-optical interference and diffraction effects of the physical aperture pattern to project a radiation pattern, the radiation pattern projected in a desired overlapping pattern that would have resulted if the physical aperture pattern had the desired aperture pattern but without the wave-optical interference and diffraction effects.

2. The apparatus as in claim 1 wherein—the physical aperture pattern is used for more than one frame.

3. The apparatus as in claim 2 wherein the subject is at varying distances from the physical aperture pattern.

4. The apparatus as in claim 1 wherein the radiation includes visible light wavelengths.

5. The apparatus as in claim 1 wherein the radiation includes infrared wavelengths.

6. The apparatus as in claim 1 wherein the radiation includes ultraviolet wavelengths.

7. The apparatus as in claim 1 wherein the radiation includes microwave wavelengths.

8. The apparatus as in claim 1 wherein the radiation pattern is projected upon a sensor sensitive to the wavelength of the radiation.

9. The apparatus as in claim 8 wherein the projected radiation pattern comprises a plurality of overlapping images.

10. The apparatus as in claim 9 wherein the plurality of overlapping images is processed using coded aperture imaging techniques.

11. The apparatus as in claim 9 the pattern incident upon the sensor is an overlapping of the image of a subject positioned in front of the physical aperture pattern as projected through a plurality of Uniformly Redundant Array (URA) patterns if there had been no wave-optical interference and/or diffraction effects.

12. The apparatus as in claim 9 wherein the pattern incident upon the sensor is an overlapping of the image of a subject positioned in front of the physical aperture pattern as projected through a plurality of Modified Uniformly Redundant Array (MURA) patterns if there had been no wave-optical interference and/or diffraction effects.

13. The apparatus as in claim 9 wherein the pattern incident upon the sensor is an overlapping of the image of a subject positioned in front of the physical aperture pattern as projected through a plurality of Perfect Binary Array (PBA) patterns if there had been no wave-optical interference and/or diffraction effects.

14. The apparatus as in claim 9 wherein the pattern incident upon the sensor is an overlapping of the image of a subject positioned in front of the physical aperture pattern as projected through a plurality of random patterns if there had been no wave-optical interference and/or diffraction effects.

\* \* \* \* \*